United States Patent
Jung et al.

(10) Patent No.: US 12,302,201 B2
(45) Date of Patent: May 13, 2025

(54) HANDOVER METHOD AND DEVICE FOR TERMINAL THAT SUPPORTS DUAL ACTIVE PROTOCOL STACK IN MOBILE COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR); Anil Agiwal, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

(21) Appl. No.: 17/634,387

(22) PCT Filed: Aug. 14, 2020

(86) PCT No.: PCT/KR2020/010893
§ 371 (c)(1),
(2) Date: Feb. 10, 2022

(87) PCT Pub. No.: WO2021/029742
PCT Pub. Date: Feb. 18, 2021

(65) Prior Publication Data
US 2022/0338075 A1 Oct. 20, 2022

(30) Foreign Application Priority Data

Aug. 14, 2019 (KR) .................. 10-2019-0099843
Oct. 10, 2019 (KR) .................. 10-2019-0125286
Nov. 7, 2019 (KR) .................. 10-2019-0142011

(51) Int. Cl.
*H04W 36/18* (2009.01)
*H04W 4/40* (2018.01)
*H04W 36/08* (2009.01)
*H04W 36/00* (2009.01)
*H04W 36/24* (2009.01)

(52) U.S. Cl.
CPC .............. *H04W 4/40* (2018.02); *H04W 36/08* (2013.01); *H04W 36/185* (2023.05); *H04W 36/0085* (2018.08); *H04W 36/249* (2023.05)

(58) Field of Classification Search
CPC ............... H04W 36/0069; H04W 4/40; H04W 36/0072; H04W 36/0085; H04W 36/249;
(Continued)

(56) References Cited

U.S. PATENT DOCUMENTS

2011/0255508 A1   10/2011   Iwamura et al.
2018/0227819 A1   8/2018    Lee et al.
(Continued)

FOREIGN PATENT DOCUMENTS

KR   10-2021-0003646 A   1/2021
WO   2018/085049 A1      5/2018
WO   2019/074411 A1      4/2019

OTHER PUBLICATIONS

ETSI TS 138 331 V15.3.0 (Oct. 2018), 5G; NR; Radio Resource Control (RRC); Protocol specification (3G PP TS 38.331 version 15.3.0 Release 15), pp. 1-441. (Year: 2018).*
(Continued)

*Primary Examiner* — Un C Cho
*Assistant Examiner* — Lalita W Pace
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety
(Continued)

services. According to the disclosure, when a dual active protocol stack (DAPS) handover is supported in a next generation mobile communication system, received system information can be readily processed.

12 Claims, 30 Drawing Sheets

(58) Field of Classification Search
CPC ..... H04W 36/08; H04W 36/18; H04W 36/28; H04W 36/00692; H04W 36/00695; H04W 36/00698; H04W 36/185; H04W 48/12; H04W 24/10; H04W 88/02; H04W 36/0027; H04W 48/10
See application file for complete search history.

(56) References Cited

U.S. PATENT DOCUMENTS

| | | | |
|---|---|---|---|
| 2020/0146100 A1* | 5/2020 | Lee | H04W 76/50 |
| 2022/0007250 A1* | 1/2022 | Kim | H04W 36/185 |
| 2022/0014985 A1* | 1/2022 | Da Silva | H04W 36/0058 |
| 2022/0217594 A1* | 7/2022 | Kim | H04W 36/38 |
| 2022/0295370 A1* | 9/2022 | Takada | H04L 5/0032 |
| 2022/0386201 A1* | 12/2022 | Hori | H04W 36/185 |

OTHER PUBLICATIONS

Qualcomm Incorporated, 'Control Plane handling and procedures to support, Dual Connectivity Role Switch (DCRS) based HO', R2-1905783, 3GPP TSG-RAN WG2, Meeting #106, Reno, USA, May 3, 2019.
CMCC, 'DC-based HO/SCG Change Mechanism', R2-1905917, 3GPP TSG-RAN WG2 Meeting #106, Reno, USA, May 3, 2019.
Huawei etc., 'Handover based on DC for 0ms interruption', R2-1907423, 3GPP TSG, RAN WG2 Meeting #106, Reno, USA, May 3, 2019.
OPPO, 'Discussion on single/dual active protocol stack', R2-1905635, 3GPP, TSG-RAN WG2 Meeting #106, Reno, USA, Apr. 30, 2019.
European Search Report dated Jul. 28, 2022, issued in European Application No. 20851867.0.

* cited by examiner

HANDOVER METHOD AND DEVICE FOR TERMINAL THAT SUPPORTS DUAL ACTIVE PROTOCOL STACK IN MOBILE COMMUNICATION SYSTEM

TECHNICAL FIELD

The disclosure relates to operations of a terminal and a base station in a mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, when a next-generation mobile communication system supports a dual active protocol stack (DAPS) handover, there is a need regarding a method for processing received system information.

DISCLOSURE OF INVENTION

Technical Problem

It is an aspect of the disclosure to propose a method for processing received system information when a next-generation mobile communication system supports a dual active protocol stack (DAPS) handover.

It is another aspect of the disclosure to propose a device and a method capable of effectively supporting a V2X service in a wireless communication system.

It is another aspect of the disclosure to propose a device and a method capable of measuring and reporting for Minimization of Drive Test.

Solution to Problem

In order to solve the above-mentioned problems, a method by a terminal in a wireless communication system according to the disclosure includes receiving, from a source base station, a control message including an indicator indicating whether dual active protocol stack (DAPS) handover is configured, obtaining a system information block (SIB), determining whether the obtained SIB is a specific SIB, in case that the obtained SIB is the specific SIB as a result of determination, identifying whether the specific SIB is received through the control message, and in case that the specific SIB is determined to have been received through the control message, performing at least one operation according to the specific SIB when a preconfigured event occurs.

Meanwhile, a terminal in a wireless communication system includes a transceiver and a controller configured to control the transceiver to receive, from a source base station, a control message including an indicator indicating whether dual active protocol stack (DAPS) handover is configured, obtain a system information block (SIB), determine whether the obtained SIB is a specific SIB, in case that the obtained SIB is the specific SIB as a result of determination, identify whether the specific SIB has been received through the control message, and in case that the specific SIB is determined to have been received through the control message, perform at least one operation according to the specific SIB when a preconfigured event occurs.

Advantageous Effects of Invention

According to an embodiment of the disclosure, when a next-generation mobile communication system supports a dual active protocol stack (DAPS) handover, received system information can be processed easily.

According to another embodiment of the disclosure, a V2X service can be performed effectively in a wireless communication system.

According to another embodiment of the disclosure, Minimization of Drive Test can be performed effectively in a mobile communication system.

MODE FOR THE INVENTION

Figure 1A:
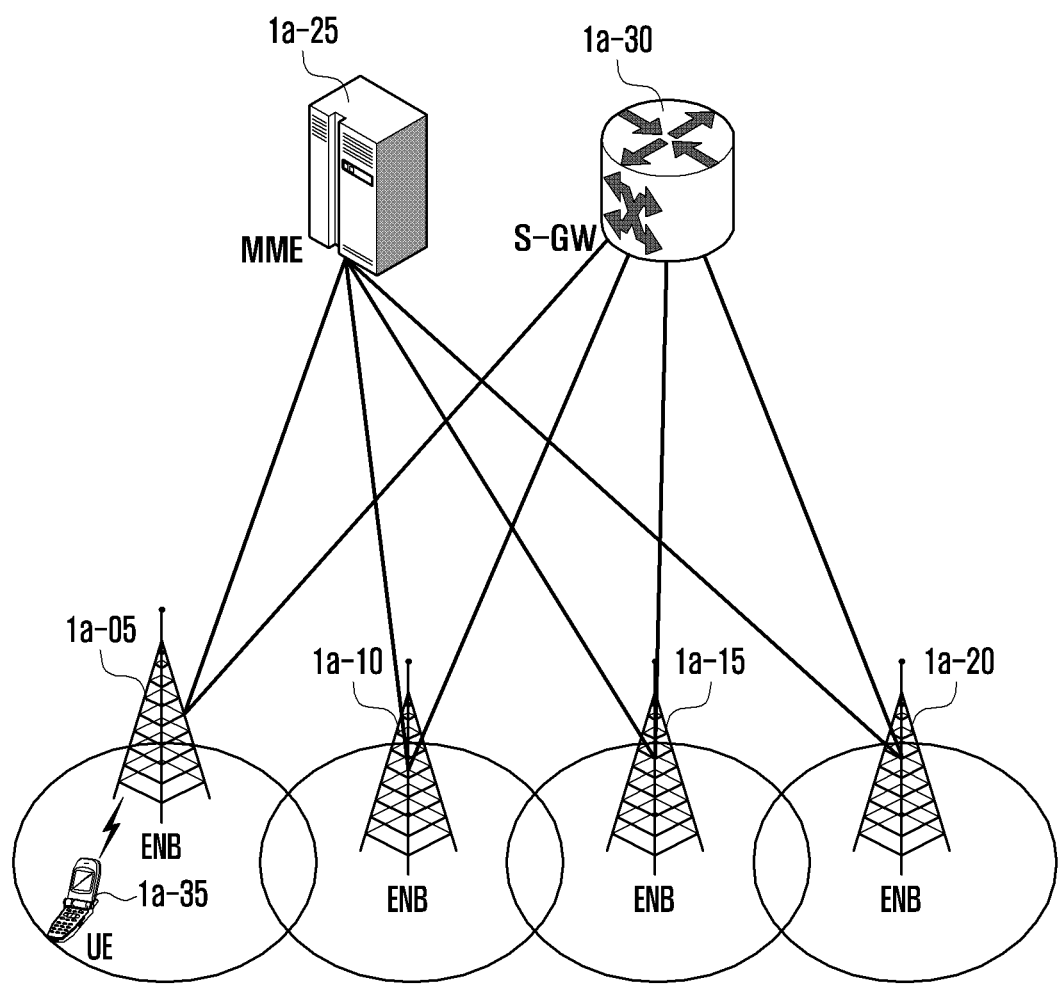
FIG. 1A illustrates the structure of an LTE system according to an embodiment of the disclosure.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standard, which is the latest standard among exiting communication standards, for the convenience of description. However, the disclosure is not limited by these terms and names, and may be applied in the same way to systems that conform other standards. In particular, the disclosure may be applied to 3GPP NR (New Radio: 5th generation mobile communication standard).

First Embodiment

FIG. 1A illustrates the structure of an LTE system according to an embodiment of the disclosure.

Referring to FIG. 1A, a radio access network of an LTE system may include next-generation base stations (evolved node Bs, hereinafter eNBs, node Bs, or base stations) 1a-05, 1a-10, 1a-15, and 1a-20, a mobility management entity (MME) 1a-25, and a serving gateway (S-GW) 1a-30. A user equipment (hereinafter UE or terminal) 1a-35 may access an external network through the eNBs 1a-05 to 1a-20 and S-GW 1a-30.

In FIG. 1A, the eNBs 1a-05 to 1a-20 may correspond to an existing node B of a universal mobile telecommunication system (UMTS). The eNBs may be connected to the UE 1a-35 through a radio channel, and may perform a more complicated role than the existing node B. In the LTE system, since all user traffic pertaining to real-time service, such as voice over IP (VOIP), via the Internet protocol, may be serviced through a shared channel. Therefore, a device that performs scheduling by collecting state information, such as buffer states, available transmit power states, and channel states of UEs, is required, and the eNBs 1a-05 to 1a-20 may be in charge of this function of the device.

One eNB may control multiple cells. For example, in order to implement a transmission rate of 100 Mbps, the LTE system may use orthogonal frequency division multiplexing (OFDM) as a radio access technology in the bandwidth of 20 MHz. In addition, the LTE system may adopt an adaptive modulation and coding (hereinafter referred to as AMC) scheme for determining a modulation scheme and a channel coding rate based on the channel state of the UE. The S-GW 1a-30 is a device for providing a data bearer, and may generate or remove a data bearer under the control of the MME 1a-25. The MME is a device capable of being in charge of various control functions in addition to a mobility management function for the UE, and may be connected to multiple base stations.

Figure 1B:
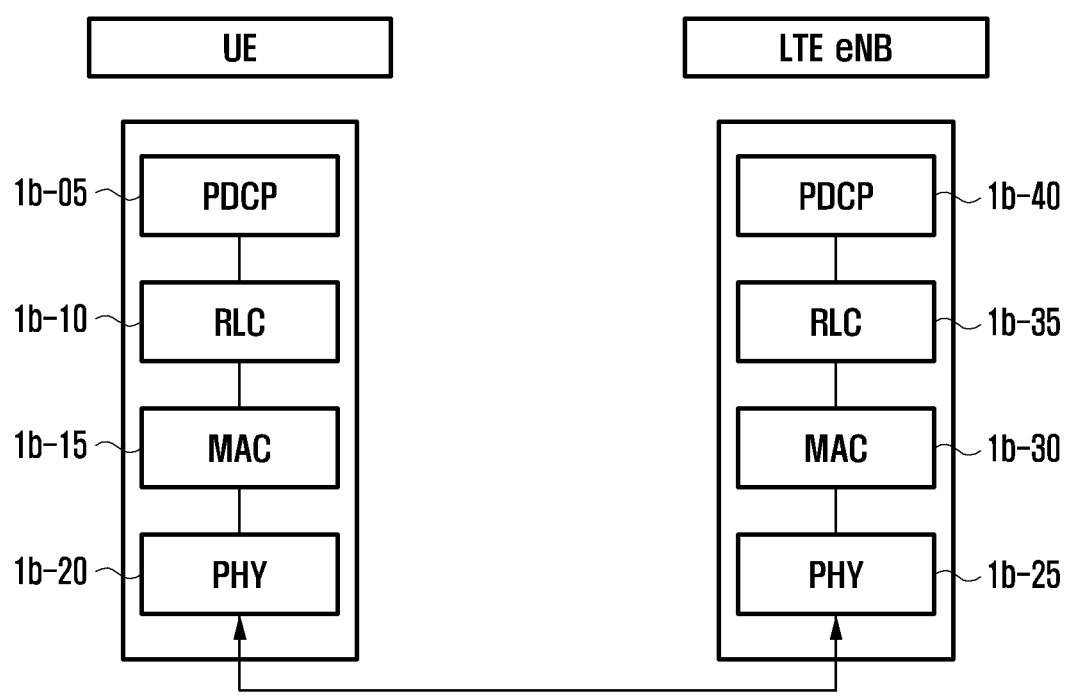
FIG. 1B illustrates a radio protocol structure in an LTE system according to an embodiment of the disclosure.

FIG. 1B illustrates a radio protocol structure in an LTE system according to an embodiment of the disclosure.

Referring to FIG. 1B, the radio protocol of the LTE system may include packet data convergence protocols (PDCPs) 1b-05 and 1b-40, radio link controls (RLCs) 1b-10 and 1b-35, and medium access controls (MACs) 1b-15 and 1b-30, in a UE and an eNB, respectively. The PDCPs may in charge of operations, such as IP header compression/restoration. The main functions of PDCPs are summarized as follows.

Header compression and decompression: ROHC only
    Transfer of user data
    In-sequence delivery of upper layer PDUs at PDCP re-establishment procedure for RLC AM
    Sequence reordering (for split bearers in DC (only support for RLC AM): PDCP PDU routing for transmission and PDCP PDU reordering for reception)
    Duplicate detection of lower layer SDUs at a PDCP re-establishment procedure for RLC AM
    Retransmission of PDCP SDUs at handover and, for split bearers in DC, of PDCP PDUs at PDCP data-recovery procedure, for RLC AM)
    Ciphering and deciphering
    Timer-based SDU discard in uplink The radio link control (RLC) 1b-10 and 1b-35 may perform ARQ operation by reconfiguring a PDCP protocol data unit (PDU) at an appropriate size. The main functions of RLC are summarized below.

Data transfer (Transfer of upper layer PDUs)
    ARQ function (Error correction through ARQ (only for AM data transfer))
    Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MACs 1b-15 and 1b-30 may be connected to multiple RLC layer devices configured in one UE, and may perform an operation of multiplexing RLC PDUs to MAC PDUs and demultiplexing RLC PDUs from MAC PDUs. The main functions of MACs are summarized as follows.

Mapping between logical channels and transport channels

Multiplexing/de-multiplexing of MAC SDUs belonging to one or different logical channels into/from transport blocks (TB) delivered to/from the physical layer on transport channels Scheduling information reporting Error correction through HARQ Priority handling between logical channels of one UE Priority handling between UEs by means of dynamic scheduling MBMS service identification Transport format selection Padding Physical layers 1b-20 and 1b-25 may perform operations of channel coding and modulating upper layer data, forming the upper layer data into an OFDM symbol, transmitting the OFDM symbol through a radio channel, or of demodulating an OFDM symbol received through a radio channel, channel-decoding the OFDM symbol, and transmitting the OFDM symbol to an upper layer.

Figure 1C:
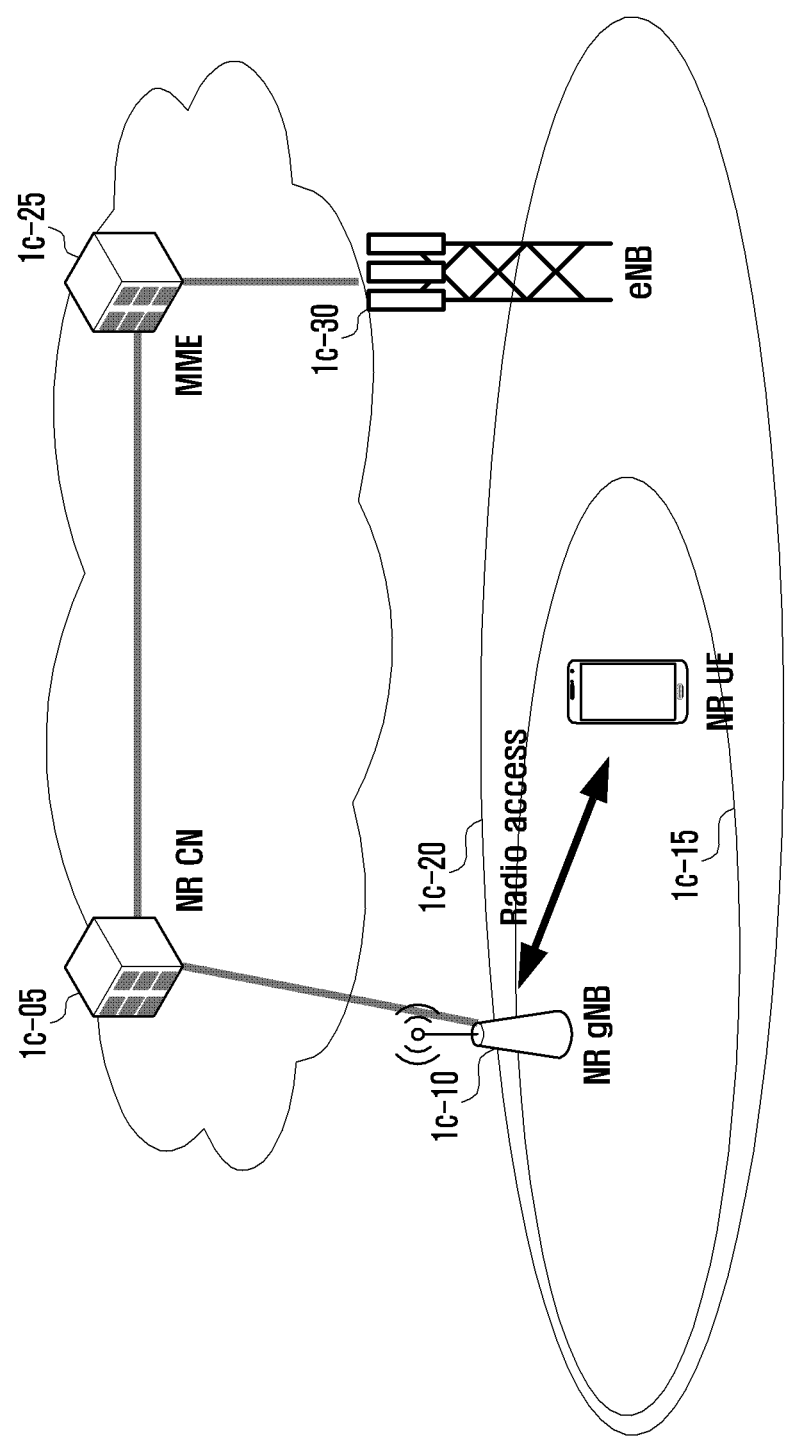
FIG. 1C illustrates the structure of a next-generation mobile communication system according to an embodiment of the disclosure.

FIG. 1C illustrates the structure of a next-generation mobile communication system according to an embodiment of the disclosure.

Referring to FIG. 1C, a radio access network of a next-generation mobile communication system (hereinafter referred to as NR or 5G) may include a new radio node B (hereinafter referred to as an NR gNB, or NR base station) 1c-10 and a new radio core network (NR CN) 1c-05. A next generation user equipment (a new radio user equipment, NR UE, or terminal) 1c-15 may access an external network via an NR gNB 1c-10 and an NR CN 1c-05.

In FIG. 1C, the NR gNB 1c-10 corresponds to an evolved node B (eNB) of the existing LTE system. The NR gNB is connected to the NR UE 1c-15 via a radio channel, and may provide an excellent service as compared to the existing node B. In the next-generation mobile communication system, all types of user traffic may be serviced through a shared channel. Therefore, there is a need for a device for performing scheduling by collecting state information, such as buffer states, available transmission power states, and channel states of UEs, and the NR NB 1c-10 is in charge of this function of the device. One NR gNB may control multiple cells. In order to implement ultra-high speed data transmission as compared to the current LTE, the next-generation mobile communication system may apply the current maximum bandwidth or more. Further, the next-generation mobile communication system may additionally employ beamforming technology using orthogonal frequency division multiplexing (OFDM) as a radio access technology. In addition, the next-generation mobile communication system may adopt an adaptive modulation and coding (hereinafter, referred to as AMC) scheme for determining a modulation scheme and a channel coding rate based on the channel state of a UE.

The NR CN 1c-05 may perform functions, such as mobility support, bearer configuration, QoS configuration, and the like. The NR CN is a device that is in charge of various control functions in addition to a mobility management function for a UE, and may be connected to multiple base stations. In addition, the next-generation mobile communication system may also operate in conjunction with the existing LTE system, and the NR CN may be connected to an MME 1c-25 via a network interface. The MME may be connected to an eNB 1c-30, that is, to the existing base station.

Figure 1D:
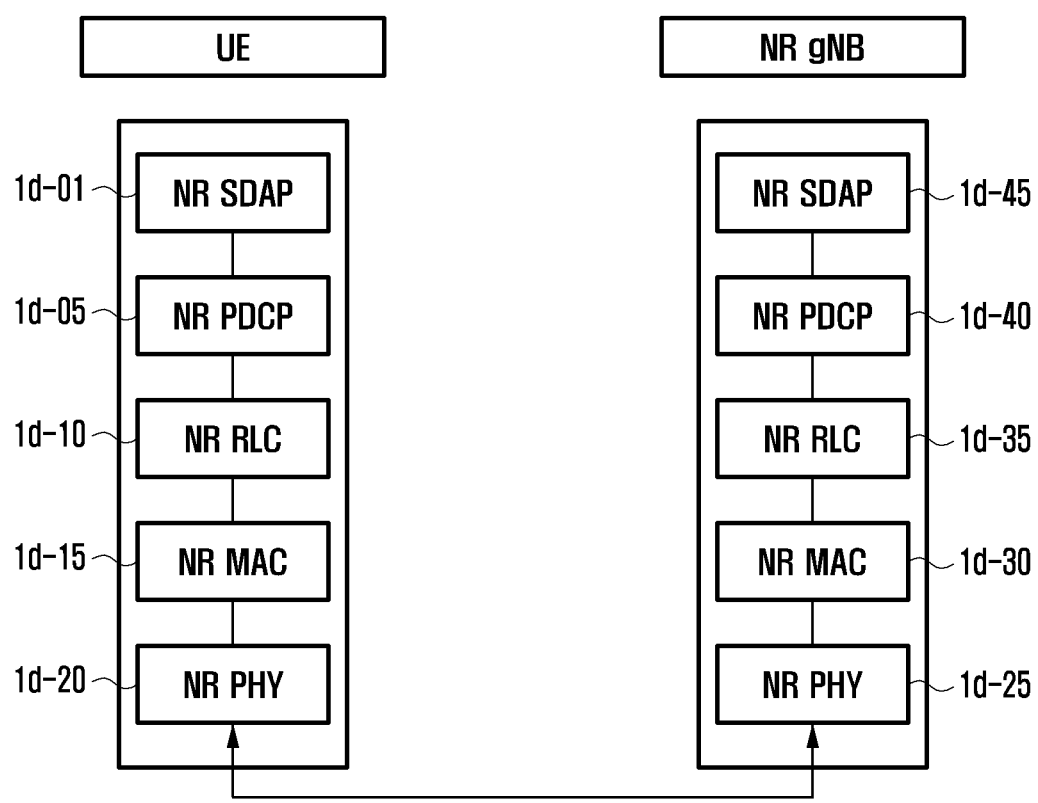
FIG. 1D illustrates a radio protocol structure of a next-generation mobile communication system according to an embodiment of the disclosure.

FIG. 1D illustrates a radio protocol structure of a next-generation mobile communication system according to an embodiment of the disclosure.

Referring to FIG. 1D, the radio protocol of the next-generation mobile communication system includes NR service data adaptation protocol (SDAPs) 1d-01 and 1d-45, NR PDCPs 1d-05 and 1d-40, NR RLCs 1d-10 and 1d-35, NR MACs 1d-15 and 1d-30, and NR PHYs 1d-20 and 1d-25, respectively, in a UE and an NR base station.

The main functions of the NR SDAPs 1d-01 and 1d-45 may include some of the following functions.

Transfer of user plane data

Mapping between a QoS flow and a data bearer (DRB) for both downlink (DL) and uplink (UL)

Marking QoS flow ID in both DL and UL packets

Mapping reflective QoS flow to DRB for the UL SDAP PDUs

For the SDAP layer device, the UE may be configured with as to whether or not use the header of the SDAP layer device or the function of the SDAP layer device (or new layer device) for each PDCP layer device, for each bearer, and for each logical channel through a radio resource control (RRC) message. When the SDAP header is configured, a non-access stratum (NAS) quality of service (QOS) reflective configuration 1-bit indicator (NAS reflective QoS) and an access stratum (AS) QoS reflective configuration 1-bit indicator (AS reflective QoS) of the SDAP header are used to instruct the UE to enable updating or reconfiguration of the mapping information relating to the QoS flow of uplink and downlink and data bearer. The SDAP header may include QoS flow ID information indicating QoS. The QoS information may be used as data processing priority, scheduling information, etc., in order to support a smooth service.

The main functions of the NR PDCPs 1d-05 and 1d-40 may include some of the following functions.

Header compression and decompression (ROHC only)

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

In the description above, the reordering function of the NR PDCP device may refer to a function of sequentially reordering PDCP PDUs, received from a lower layer, based on a PDCP sequence number (SN). The reordering function of the NR PDCP device may include a function of transmitting data to an upper layer in the reordered sequence, a function of directly transmitting data to an upper layer without taking the sequence into consideration, a function of reordering the sequence and recording missing PDCP PDUs, a function of providing a state report on the missing PDCP PDUs to a transmission side, and a function of requesting retransmission of the missing PDCP PDUs.

The main functions of the NR RLCs 1d-10 and 1d-35 may include some of the following functions.
  Transfer of upper layer PDUs
  In-sequence delivery of upper layer PDUs
  Out-of-sequence delivery of upper layer PDUs
  Error Correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment In the description above, the in-sequence delivery function of the NR RLC device may refer to a function of transmitting RLC SDUs, which are received from a lower layer, to an upper layer in a sequence of reception. When one RLC SDU is originally segmented into multiple RLC SDUs and received, the in-sequence delivery function of the NR RLC device may include a function of reassembling and transmitting the multiple RLC SDUs.

The in-sequence delivery function of the NR RLC device may include a function of reordering the received RLC PDUs based on an RLC SN or PDCP SN, reordering the sequence, and recording missing RLC PDUs, providing a state report on the missing RLC PDUs to a transmission side, and requesting retransmission of the missing RLC PDUs.

The in-sequence delivery function of the NR RLC devices 1d-10 and 1d-35 may include a function of sequentially transmitting only RLC SDUs prior to the missing RLC SDU to an upper layer in case that an RLC SDU is missing. Further, the in-sequence delivery function of the NR RLC device may include sequentially transmitting all the RLC SDUs received before a timer starts to an upper layer in case that a predetermined timer has expired even when there is a missing RLC SDU. In addition, the in-sequence delivery function of the NR RLC device may include sequentially transmitting all RLC SDUs received so far to an upper layer in case that a predetermined timer has expired even when there is a missing RLC SDU.

The NR RLC devices 1d-10 and 1d-35 may process the RLC PDUs in a sequence in which the RLC PDUS are received regardless of the order of sequence number (out-of sequence delivery), and may transmit the same to NR PDCP devices 1d-05 and 1d-40.

When the NR RLC devices 1d-10 and 1d-35 receive segments, the NR RLC devices 1d-10 and 1d-35 may receive segments stored in a buffer or segments to be received later, reconfigure the segments as one complete RLC PDU, and then transmit the RLC PDU to the NR PDCP device.

The NR RLC layer may not include a concatenation function, and the concatenation function may be performed by the NR MAC layer, or may be replaced by a multiplexing function of the NR MAC layer.

In the description above, the out-of-sequence delivery function of the NR RLC device may refer to a function of directly transmitting the RLC SDUs, received from the lower layer, to an upper layer regardless of the sequence thereof. The out-of-sequence delivery function of the NR RLC device may include, in case that one RLC SDU has been originally segmented into multiple RLC SDUs and received, a function of reassembling the multiple RLC SDUs and transmitting the same. The out-of-sequence delivery function of the NR RLC device may include a function of storing the RLC SNs or PDCP SNs of the received RLC PDUs, reordering the sequence, and recording the missing RLC PDUs.

The NR MACs 1d-15 and 1d-30 may be connected to multiple NR RLC layer devices configured in one UE, and the main function of the NR MAC may include some of the following functions.
  Mapping between logical channels and transport channels
  Multiplexing/de-multiplexing of MAC SDUs
  Scheduling information reporting
  Error correction through HARQ
  Priority handling between logical channels of one UE
  Priority handling between UEs by means of dynamic scheduling
  MBMS service identification
  Transport format selection
  Padding The NR PHY layers 1d-20 and 1d-25 may perform operations of channel-coding and modulating upper layer data, forming the upper layer data into OFDM symbols, transmitting the OFDM symbols via a radio channel or demodulating and channel decoding of the OFDM symbols received via the radio channel, and transferring the OFDM symbols to an upper layer.

Figure 1E:
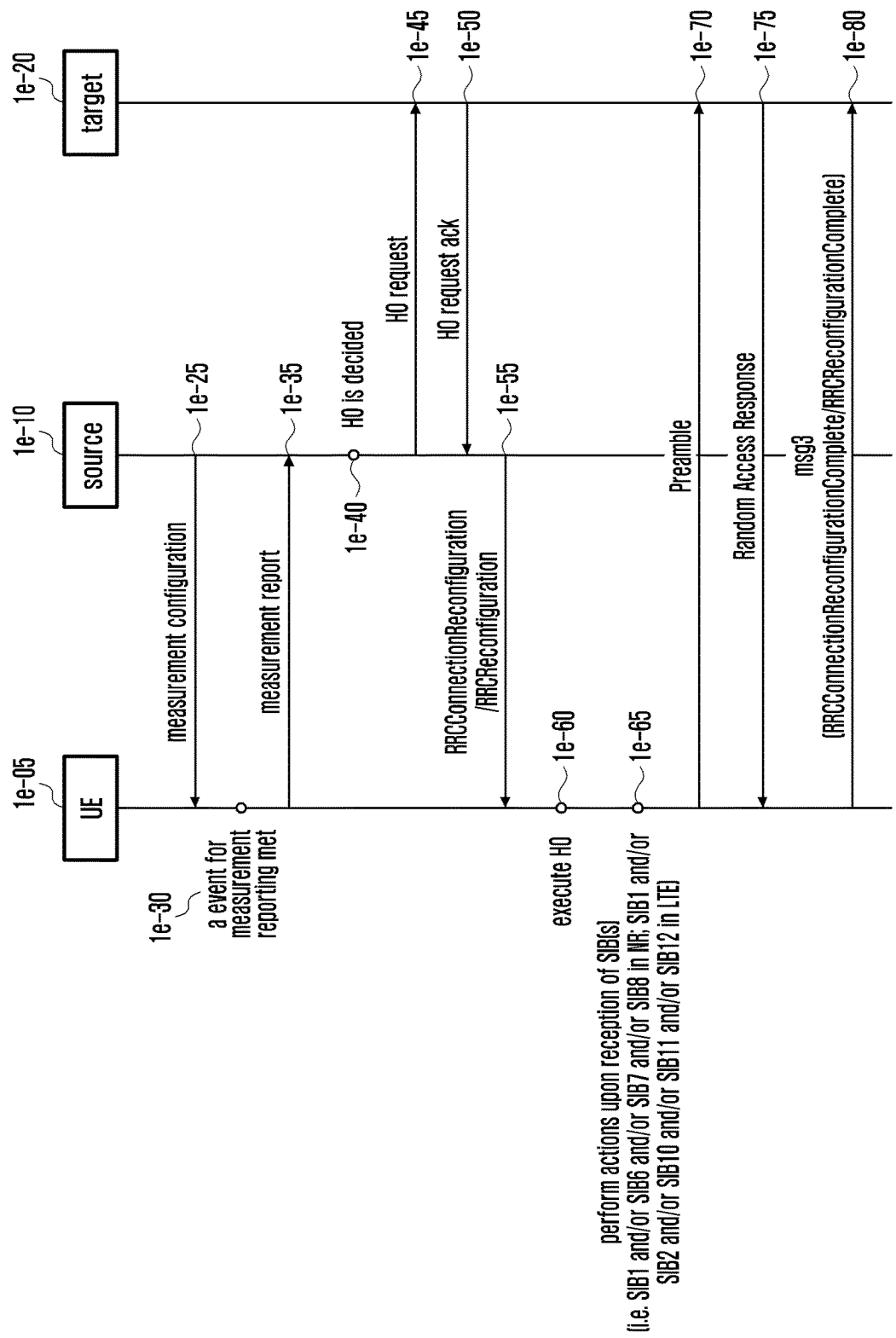
FIG. 1E is a flowchart illustrating a process of performing a general handover operation in a mobile communication system.

FIG. 1E is a sequence diagram illustrating a process of performing a general handover operation in a mobile communication system.

A UE 1e-05 may receive a predetermined RRC message including measurement configuration information from a source cell 1e-10 (indicated by reference numeral 1e-25). The UE 1e-05 may measure the signal quality of a serving cell and neighboring cells by applying the measurement configuration information, and when a periodic or configured event occurs (indicated by reference numeral 1e-30), the UE 1e-05 may report the collected cell measurement information to the source cell (indicated by reference numeral 1e-35). The source cell may determine whether to trigger a general handover operation based on the reported cell measurement information (indicated by reference numeral 1e-40). For example, when event A3 (Neighbor becomes offset better than SpCell) is satisfied and cell measurement information is reported, the source cell 1e-10 may determine a general handover. When it is determined to trigger the general handover, the source cell 1e-10 may request the general handover from one target cell 1e-20 through a predetermined inter-node message (indicated by reference numeral 1e-45). Upon receiving the request, the target cell 1e-20 may accept the handover request, and may transmit handover configuration information necessary for the general handover operation or additional configuration information to the source cell 1e-10 (indicated by reference numeral 1e-50). The source cell 1e-10 includes the handover configuration information or additional configuration information, received from the target cell 1e-20, in a predetermined RRC message, and may transmit the RRC message (an RRCReconfiguration message when the source cell is an NR cell; an RRCConnectionReconfiguration message when the source cell 1e-10 is an LTE cell) to the UE 1e-05 (indicated by reference numeral 1e-55). The handover configuration information (e.g., ReconfigWithSync in NR; MobilityControlInfo in LTE) may include the ID of the target cell 1e-20, frequency information, configuration information (dedicated preamble information, dedicated radio resource information, etc.) necessary for a random access operation to the target cell, transmission power information, C-RNTI information used in the target cell, a T304 timer value, and the like.

Upon receiving the handover configuration information, the UE 1e-05 may immediately start a process of random access to the target cell 1e-20 and drive a T304 timer (indicated by reference numeral 1e-60). At the same time, the UE 1e-05 may stop data transmission or reception to or from the serving cell 1e-10. This is because the UE 1e-05 has a single protocol stack. Additionally, the RRC message received in operation 1e-55 may dedicatedly include some pieces of system information among system information broadcast by the target cell 1e-20. For example, the RRC message may include at least one of SIB1 information, SIB2 information, and/or disaster-related system information (e.g., SIB6, SIB7, and SIB8 in NR; SIB10, SIB11, and SIB12 in LTE) broadcast by the target cell. When receiving the system information of the target cell from the RRC message, the UE 1e-05 may perform the following series of processes (indicated by reference numeral 1e-65).

Case 1: When the source cell is an NR cell, the UE may:
When SIB1 is dedicatedly received
disregard frequencyBandList if received
forward the cellIdentity (cell ID) to upper layer devices
forward the tracking area code (trackingAreaCode) to upper layer devices
apply commonly applied serving cell configuration information (the configuration included in the servingCellConfigCommon)
In case that SIB 6, SIB7, and/or SIB8 are received dedicatedly
In case that SIB6 is received, perform an action corresponding thereto. The action may comply with TS 38.331 standard 5.2.2.4.7.
In case that SIB7 is received, perform an action corresponding thereto. The action may comply with TS 38.331 standard 5.2.2.4.8.
In case that SIB8 is received, perform an action corresponding thereto. The action may comply with TS 38.331 standard 5.2.2.4.9.

Case 2: When the source cell is an LTE cell, the UE may:
In case that SIB1 is received dedicatedly
disregard frequencyBandList and/or multiBandInfoList if received
forward the cellIdentity (cell ID) to upper layer devices
forward the trackingAreaCode to upper layer devices
In case that SIB2 is received dedicatedly,
apply commonly applied radio resource configuration information (apply the configuration included in the radioResourceConfigCommon)
In case that SIB 10, SIB11 and/or SIB12 are received dedicatedly
In case that SIB10 is received, perform an action corresponding thereto. This action may comply with TS 36.331 standard 5.2.2.17.
In case that SIB11 is received, perform an action corresponding thereto. This action may comply with TS 36.331 standard 5.2.2.18.
In case that SIB12 is received, perform an action corresponding thereto. This action may comply with TS 36.331 standard 5.2.2.19.

When a dedicated preamble is provided in operation 1e-55, the UE 1e-05 may transmit the dedicated preamble (indicated by reference numeral 1e-70). When the dedicated preamble is not provided, one of contention-based preambles can be transmitted. Upon receiving the preamble, the target cell 1e-20 may transmit a random access response (RAR) message to the UE 1e-05 (indicated by reference numeral 1e-75). The UE 1e-05 may transmit msg3 to the target cell 1e-20 by using UL grant information included in the RAR (indicated by reference numeral 1e-80). The msg3 may include an RRCConnectionReconfigurationComplete message in a case of an LTE system and include an RRCReconfigurationComplete message in a case of an NR system. When the random access process is successfully completed, the UE 1e-05 may consider that the general handover has been successfully completed and stop the running T304 timer. When the normal handover is not successfully completed before the T304 timer expires, the UE 1e-05 may regard the same as a handover failure and declare an RLF, and may initiate an RRC connection re-establishment procedure with a source cell by reapplying configuration information used in a primary source cell (source PCell) (revert back to the configuration used in the source PCell).

In operation 1e-65, in case that the UE 1e-05 has performed an operation upon receiving SIB1 but fails to successfully perform the above-described random access process before the T304 timer expires, a tracking area update procedure, which has a different understanding or is unnecessary by the specific time point between the access stratum (AS) and non-access stratum (NAS) of the UE 1e-05, may be initiated. For example, When a TAC of the source cell is different from a TAC of the target cell, upper layer devices may initiate a tracking area update procedure and forward a NAS message therefor to the AS layer device. The NAS message may denote a tracking area update request message. In addition, the AS layer device may include the NAS message, which is received from the upper layer device, in ULInformationTransfer that is an RRC message, and may transfer the same to the lower layer device. In addition, the PDCP or RLC layer, which is a lower layer device, may store the same in a buffer. However, when the UE 1e-05 selects a suitable cell during the RRC connection re-establishment procedure with the source cell 1e-10, both the PDCP layer and RLC layer buffers are deleted, and thus the ULInformationTransfer message is not transmitted to the target cell 1e-20. However, this has a disadvantage in that unnecessary tracking area updating is initiated from an upper layer device.

When the UE 1e-05 fails the handover and returns to the existing primary source cell 1e-10, upper layer devices and AS layer devices may have a different understanding by the specific time point in connection with the identity of a cell to which the UE 1e-05 currently belongs and TAC information relating thereto. The specific time point may refer to a time before SIB1 is received and the operation of SIB1 reception is performed when a suitable cell is selected during the RRC connection re-establishment procedure.

Figure 1F:
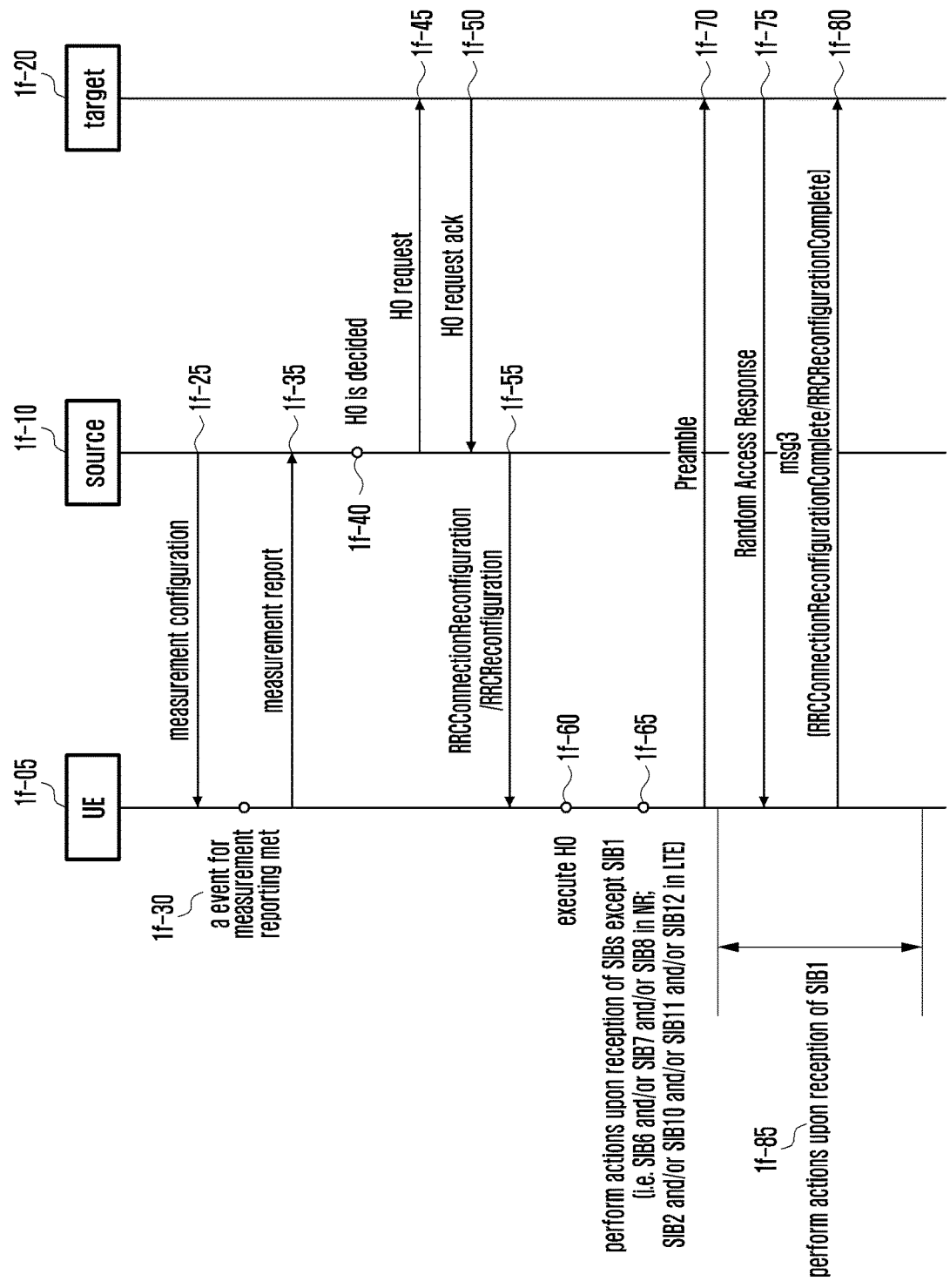
FIG. 1F is a flowchart illustrating a process of performing a general handover operation in a mobile communication system.

FIG. 1F is a sequence diagram illustrating a process of performing a general handover operation in a mobile communication system.

A UE 1f-05 may receive a predetermined RRC message including measurement configuration information from a source cell 1f-10 (indicated by reference numeral 1f-25). The UE 1f-05 may measure the signal quality of a serving cell and neighboring cells by applying the measurement configuration information, and when a periodic or configured event occurs (indicated by reference numeral 1f-30), the UE 1f-05 may report the collected cell measurement information to the source cell 1f-10 (indicated by reference numeral 1f-35). The source cell 1f-10 may determine whether to trigger a general handover operation based on the reported cell measurement information (indicated by reference numeral 1*f*-40). For example, when event A3 (Neighbor becomes offset better than SpCell) is satisfied and cell measurement information is reported, the source cell 1*f*-10 may determine a general handover. When it is determined to trigger the general handover, the source cell 1*f*-10 may request the general handover from one target cell 1*f*-20 through a predetermined inter-node message (indicated by reference numeral 1*f*-45). Upon receiving the request, the target cell 1*f*-20 may accept the handover request, and may transmit handover configuration information required for the general handover operation to the source cell 1*f*-10 (indicated by reference numeral 1*f*-50). The source cell 1*f*-10 may include the handover configuration information or additional configuration information, received from the target cell 1*f*-20, in a predetermined RRC message, and may transmit the RRC message (an RRCReconfiguration message when the source cell is an NR cell; an RRCConnectionReconfiguration message when the source cell 1*f*-10 is an LTE cell) to the UE 1*f*-05 (indicated by reference numeral 1*f*-55). The handover configuration information (e.g., ReconfigWithSync in NR; MobilityControlInfo in LTE) may include the ID of the target cell 1*f*-20, frequency information, configuration information (dedicated preamble information, dedicated radio resource information, etc.) necessary for a random access operation to the target cell, transmission power information, C-RNTI information used in the target cell 1*f*-20, a T304 timer value, and the like.

Upon receiving the handover configuration information, the UE 1*f*-05 may immediately start a process of random access to the target cell 1*f*-20 and drive a T304 timer (indicated by reference numeral 1*f*-60). At the same time, the UE 1*f*-05 may stop data transmission or reception to or from the serving cell 1*f*-10. This is because the UE 1*f*-05 has a single protocol stack. Additionally, the RRC message received in operation 1*f*-55 may dedicatedly include some pieces of system information among system information broadcast by the target cell 1*f*-20. For example, the RRC message may include at least one of SIB1 information, SIB2 information, and/or disaster-related system information (e.g., SIB6, SIB7, and SIB8 in NR; SIB10, SIB11, and SIB12 in LTE) broadcast by the target cell 1*f*-20. The disclosure is to propose an operation time of the UE 1*f*-05 by distinguishing SIB1 from the remaining system information among the system information included in the RRC message. When receiving the system information of the target cell from the RRC message, the UE 1*f*-05 may perform the following series of processes (indicated by reference numeral 1*f*-65).

Case 1: When the source cell is an NR cell, the UE may:
In case that SIB 6, SIB7, and/or SIB8 are received dedicatedly
In case that SIB6 is received, perform an action corresponding thereto. The action may comply with TS 38.331 standard 5.2.2.4.7.
In case that SIB7 is received, perform an action corresponding thereto. The action may comply with TS 38.331 standard 5.2.2.4.8.
In case that SIB8 is received, perform an action corresponding thereto. The action may comply with TS 38.331 standard 5.2.2.4.9.
Case 2: When the source cell is an LTE cell, the UE may:
In case that SIB2 is received dedicatedly,
apply commonly applied radio resource configuration information (apply the configuration included in the radioResourceConfigCommon)
In case that SIB 10, SIB11 and/or SIB12 are received dedicatedly In case that SIB10 is received, perform an action corresponding thereto. This action may comply with TS 36.331 standard 5.2.2.17.
In case that SIB11 is received, perform an action corresponding thereto. This action may comply with TS 36.331 standard 5.2.2.18.
In case that SIB12 is received, perform an action corresponding thereto. This action may comply with TS 36.331 standard 5.2.2.19.

When a dedicated preamble is provided in operation 1*f*-55, the UE 1*f*-05 may transmit the dedicated preamble (indicated by reference numeral 1*f*-70). When the dedicated preamble is not provided, the UE 1*f*-05 may transmit one of contention-based preambles. Upon receiving the preamble, the target cell 1*f*-20 may transmit a random access response (RAR) message to the UE 1*f*-05 (indicated by reference numeral 1*f*-75). The UE 1*f*-05 may transmit msg3 to the target cell 1*f*-20 by using UL grant information included in the RAR (indicated by reference numeral 1*f*-80). The msg3 may include an RRCConnectionReconfigurationComplete message in a case of an LTE system and include an RRCReconfigurationComplete message in a case of an NR system. When the random access process is successfully completed, the UE 1*f*-05 may consider that the general handover has been successfully completed and stop the running T304 timer. When the normal handover is not successfully completed before the T304 timer expires, the UE 1*f*-05 may regard the same as a handover failure and declare an RLF, and may initiate an RRC connection re-establishment procedure.

When SIB1 is dedicatedly included in the RRC message received in operation 1*f*-55, the UE 1*f*-05 may perform the following series of processes (indicated by reference numeral 1*f*-85).

Case 1: When the source cell is an NR cell, the UE may:
disregard the frequencybandList if received
forward the cellIdentity (Cell ID) to upper layer devices
forward the tracking area code (trackingAreaCode) to upper layer devices
apply commonly applied serving cell configuration information (the configuration included in the servingCellConfigCommon)
Case 1: When the source cell is an LTE cell
When SIB1 is received dedicatedly,
disregard the frequencybandlist and multiBandInfoList if received
forward the cellIdentity (Cell ID) to upper layer devices
forward the tracking area code (trackingAreaCode) to upper layer devices The UE 1*f*-05 according to an embodiment of the disclosure is to propose to perform the operation 1*f*-85 at one of the following time points.
After transmission of the preamble to the target cell (indicated by reference numeral 1*f*-70) or after starting the random access process
After reception of the random access response message from the target cell (indicated by reference numeral 1*f*-75)
After stopping the running T304 timer by considering that the handover has been successfully completed
After (successful) transmission of an RRC connection reconfiguration complete message (RRCReconfigurationComplete in NR; RRCConnectionReconfiguration-Complete in LTE)

The reason for proposing the time point for performing the operation 1*f*-85 is that, when handover fails, a tracking area update procedure, which has a different understanding and is unnecessary by the specific time point between the access stratum (AS) and non-access stratum (NAS) of the UE 1*f*-05, may not be initiated.

Alternatively, the UE 1*f*-05 according to an embodiment of the disclosure may perform the following process in operation 1*f*-65, and the following process may be performed because the above-described problem does not occur even when the handover fails.

Figure 1G:
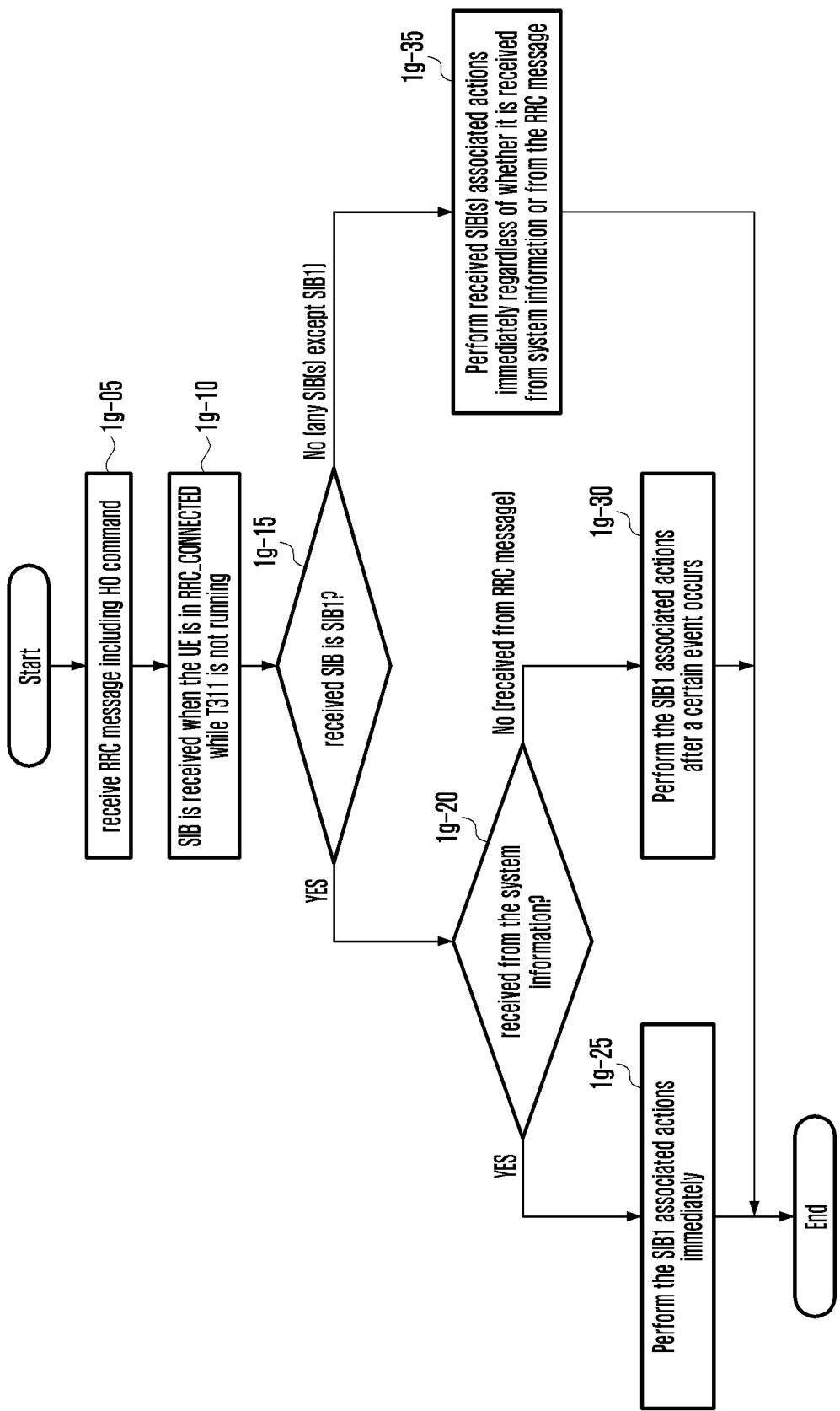
FIG. 1G is a flowchart illustrating a UE operation according to reception of system information of a target cell during a general handover operation.

Case 1: When the source cell is an NR cell, the UE may:
  disregard the frequencybandList if received
  apply commonly applied serving cell configuration information (apply the configuration included in the servingCellConfigCommon)
Case 2: When the source cell is an LTE cell, the UE may:
  disregard the frequencybandList and/or multiBandInfoList, if received FIG. 1G is a flowchart of a UE operation according to reception of system information of a target cell during a general handover operation.

In operation 1*g*-05, a UE may receive a dedicated RRC message including a handover command (HO command) from a source base station. When the source base station is an LTE base station, the HO command may denote mobilityControlInfo, and the dedicated RRC message may denote an RRCConnectionReconfiguration message. When the source base station is an NR base station, the HO command may denote reconfigWithSync, and the dedicated RRC message may denote an RRCReconfiguration message.

In operation 1*g*-10, the UE in an RRC connected mode may receive system information of a target cell when a T311 timer is not driven. The T311 timer is a timer driven when performing an RRC connection re-establishment procedure. The UE may receive the system information from the dedicated RRC message in operation 1*g*-05 or from the system information broadcast by the target cell.

In operation 1*g*-15, the UE may determine whether the system information of the target cell, received in operation 1*g*-10, is SIB1 or system information other than SIB1. System information of the target cell other than SIB1 may include at least one of the following.
  In case that the target cell is an NR cell, the system information thereof may include SIB6, SIB7 or SIB8.
  In case that the target cell is an LTE cell, the system information thereof may include SIB2, SIB10, SIB11, or SIB12.

In operation 1*g*-20, the UE may determine whether the received SIB1 of the target cell is received/obtained from system information broadcast by the target cell or received from the dedicated RRC message received in operation 1*g*-05.

In operation 1*g*-25, when the UE determines that SIB1 is received from system information broadcast by the target cell, the UE may immediately perform an operation upon receiving SIB1 of the target cell.
  Case 1: When the target cell is an NR cell, the UE may:
    disregard the frequencybandlist if received
    forward the cellIdentity (Cell ID) to upper layer devices
    forward the tracking area code (trackingAreaCode) to upper layer devices
    apply commonly applied serving cell configuration information (apply the configuration included in the servingCellConfigCommon)
  Case 2: When the target cell is an LTE cell, the UE may:
    disregard the frequencybandlist and/or multiBandInfoList if received
    forward the cellIdentity (Cell ID) to upper layer devices
    forward the tracking area code (trackingAreaCode) to upper layer devices In operation 1*g*-30, when the UE receives SIB1 of the target cell from the dedicated RRC message received in operation 1*g*-05, the UE may perform the following operation, at the time of receiving SIB1 of the target cell, when a specific event occurs. In the disclosure, a specific event may denote one of the following.
  After transmission of the preamble to the target cell or after starting the random access process
  After reception of the random access response message from the target cell
  After stopping the running T304 timer by considering that the handover has been successfully completed
  After (successful) transmission of the RRC connection reconfiguration complete message (RRCReconfigurationComplete in NR, RRCConnectionReconfigurationComplete in LTE)

In operation 1*g*-15, when the UE determines that the system information of the target cell received in operation 1*g*-10 is system information other than SIB1, the UE may proceed to operation 1*g*-35. Regardless of whether the system information of the target cell is received via broadcast or dedicatedly received in operation 1*g*-35, the following UE operation may be performed immediately.
  Case 1: When the target cell is an NR cell, the UE may:
    In case that SIB6 is received, perform an action corresponding thereto. The action may comply with TS 38.331 standard 5.2.2.4.7.
    In case that SIB7 is received, perform an action corresponding thereto. The action may comply with TS 38.331 standard 5.2.2.4.8.
    In case that SIB8 is received, perform an action corresponding thereto. The action may comply with TS 38.331 standard 5.2.2.4.9.
  Case 2: When the target cell is an LTE cell, the UE may:
    In case that SIB2 is received, apply commonly applied radio resource configuration information (apply the configuration included in the radioResourceConfigCommon)
    In case that SIB10 is received, perform an action corresponding thereto. The action may comply with TS 36.331 standard 5.2.2.17.
    In case that SIB11 is received, perform an action corresponding thereto. The action may comply with TS 36.331 standard 5.2.2.18.
    In case that SIB12 is received, perform an action corresponding thereto. The action may comply with TS 36.331 standard 5.2.2.19.

Figure 1H:
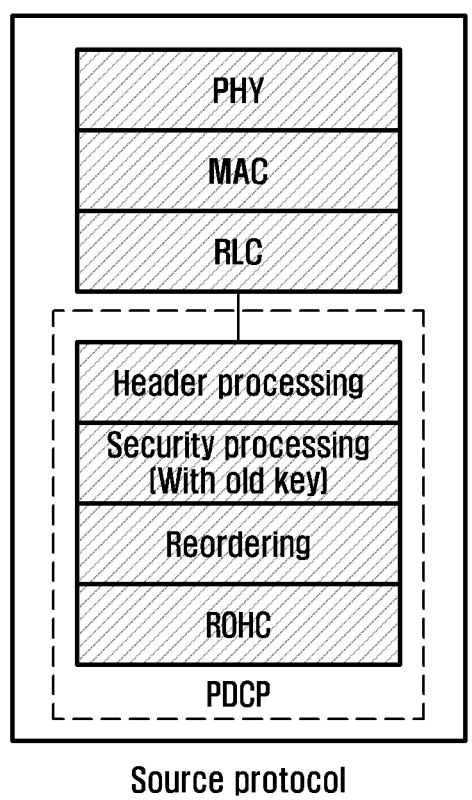
FIG. 1HA to 1HF are diagrams for explaining a process of using a dual active protocol stack in a process of performing a handover.
Figure 1H:
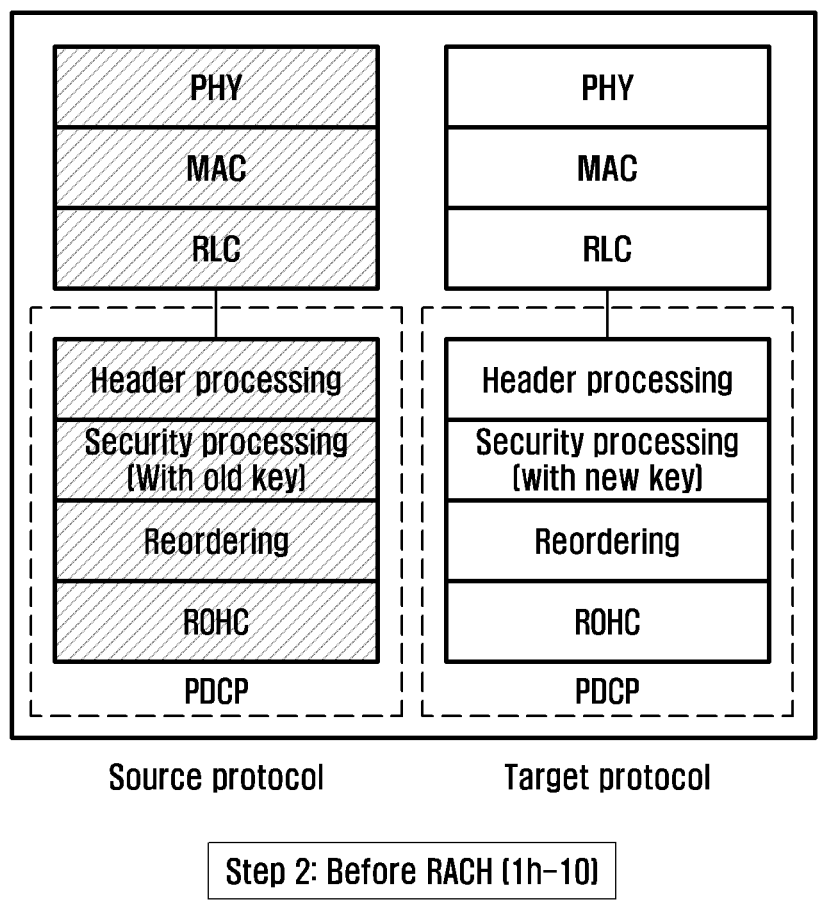
Figure 1H:
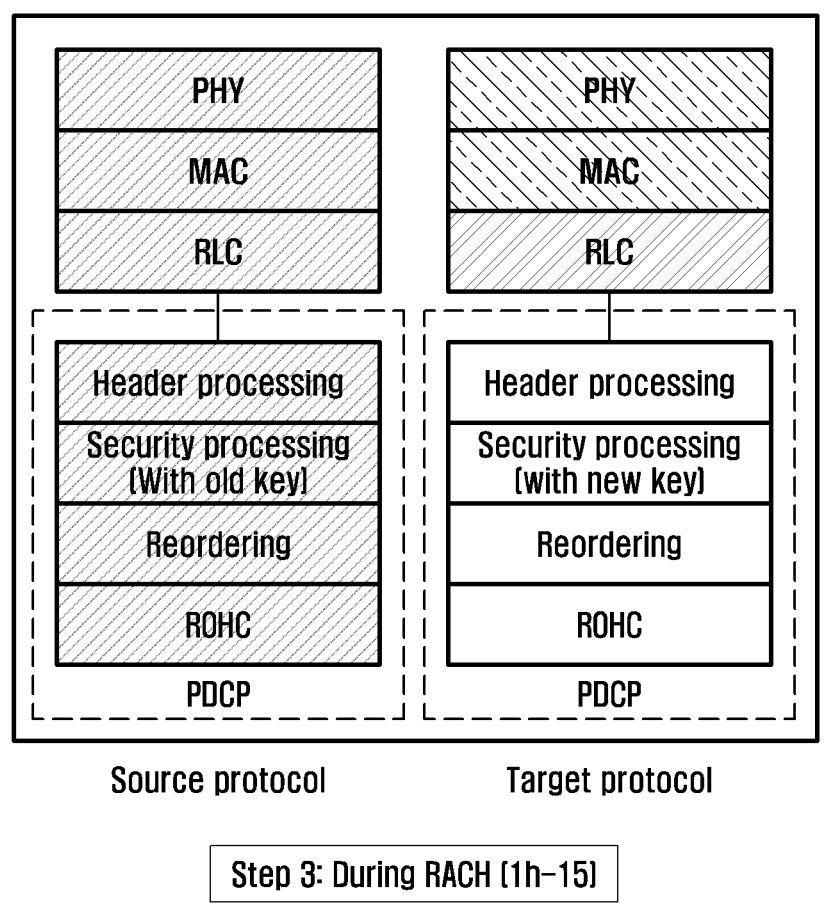
Figure 1H:
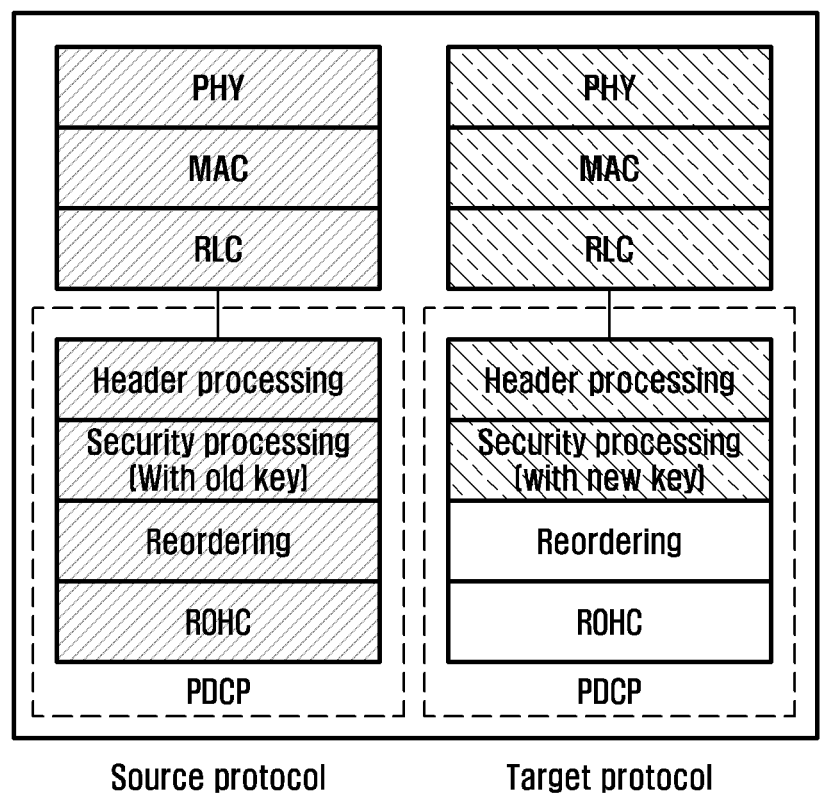
Figure 1H:
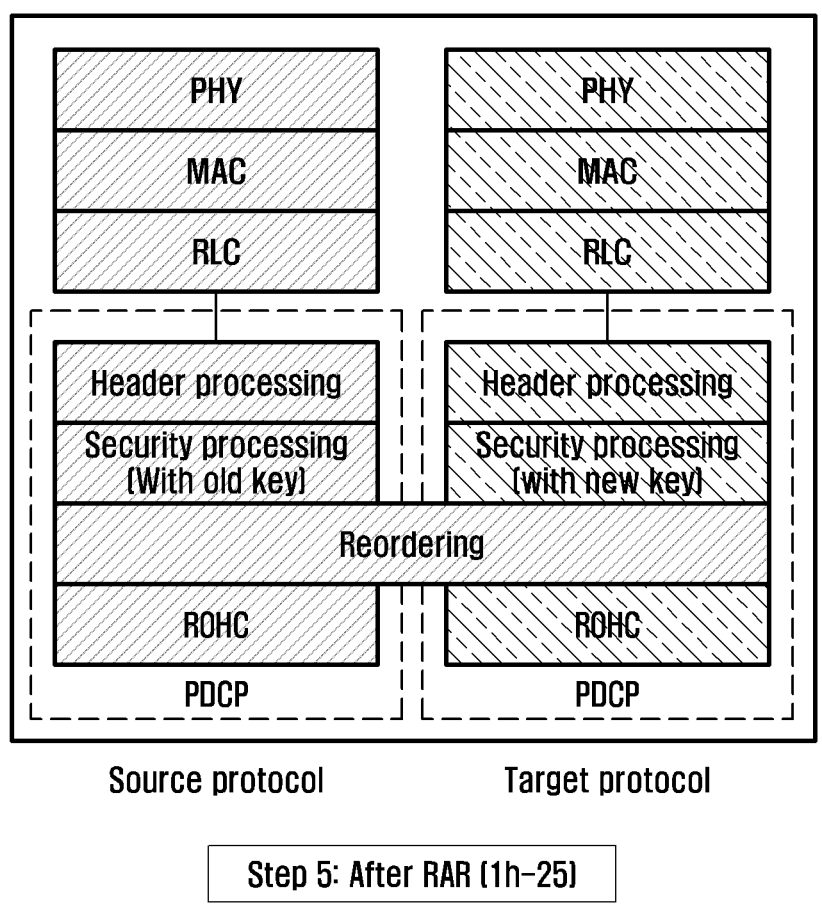
Figure 1H:
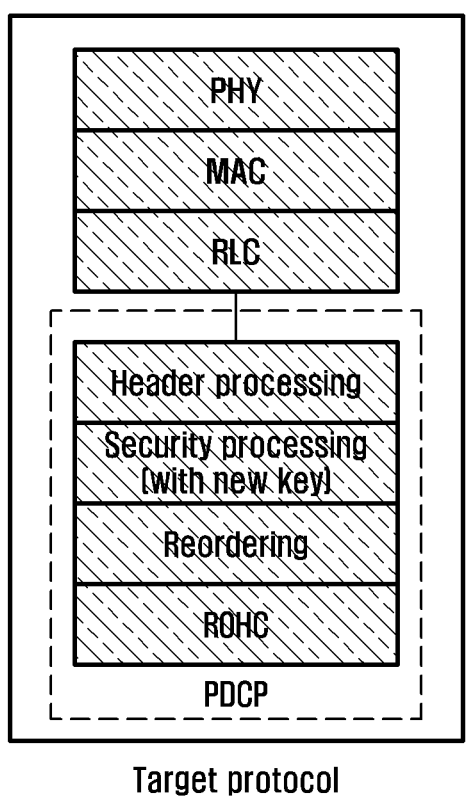

Meanwhile, FIGS. 1HA to 1HF are diagrams for explaining a process of using a dual active protocol stack (DAPS) in a process of performing a handover.

When performing the general handover, the UE may stop data transmission/reception to or from the source cell when receiving handover configuration information, and may start data transmission/reception to or from the target cell after the handover process is successful. Therefore, an interruption time may occur during a time period during which data transmission/reception cannot be performed. When the UE has a dual active protocol stack, data transmission/reception to or from the source cell may be maintained during the time period. In the disclosure, the handover in consideration of the UE capability as described above is referred to as a dual active protocol stack (DAPS) handover. When the DAPS handover is configured, the UE can simultaneously receive downlink data from the source cell and the target cell. However, simultaneous uplink data transmission to the source cell and the target cell may be possible only when a predetermined condition is satisfied due to insufficient UE transmit power or signal interference. In order to minimize the UE complexity, uplink data transmission to only one link is possible during DAPS handover, and the uplink for data transmission may be switched from a source cell to a target cell at a specific time point.

The UE operation and the active state of the dual protocol stack corresponding to the source cell and the target cell may be different at every primary specific time point.

As shown in FIG. 1HA, before handover is performed (indicated by reference numeral 1h-05), the UE may use only a protocol stack corresponding to the source cell.

As shown in FIG. 1HB, before DAPS handover configuration information is provided to the UE and RACH to the target cell is performed (indicated by reference numeral 1h-10), when the DAPS handover configuration information is received through an RRCReconfiguration message, the UE may configure a protocol stack corresponding to the target cell. However, the UE still uses only a protocol stack corresponding to the source cell. The protocol stack corresponding to the target cell may be in an inactive state.

As shown in FIG. 1HC, during an RACH execution period (indicated by reference numeral 1h-15), when a RACH operation is started, at least the PHY layer and the MAC layer are activated in a protocol stack corresponding to a target cell, and the RACH operation can be performed. Here, the UE still maintains data transmission/reception to or from the source cell.

As shown in FIG. 1HD, when a time point at which the UE is to transmit a HO success completion message to the target cell comes (indicated by reference numeral 1h-20), the UE should be able to process the HO successful completion message, which is a signaling radio bearer, due to activation of some functions of the at least PHY layer, MAC layer, RLC layer, and PDCP layer in the protocol stack corresponding to the target cell. The UE may transmit uplink data to the source cell at least before transmitting the HO success completion message to the target cell.

As shown in FIG. 1HE, after the UE receives the RAR from the target cell (indicated by reference numeral 1h-25), all of the dual active protocol stacks may be activated. The UE may maintain data transmission/reception to or from the source cell until a specific time point arrives after RAR reception. In addition, a time point at which the UE can maintain downlink data reception from the source cell and a time point at which the UE can maintain uplink data transmission thereto may be different. The UE may perform uplink data transmission to the source cell before the HO success completion message is transmitted to the target cell, but downlink data reception is possible even thereafter.

As shown in FIG. 1HF, after releasing the source cell (indicated by reference numeral 1h-30), the UE may release the protocol stack corresponding to the source cell. Thereafter, the UE may use only the protocol stack corresponding to the target cell.

Figure 1I:
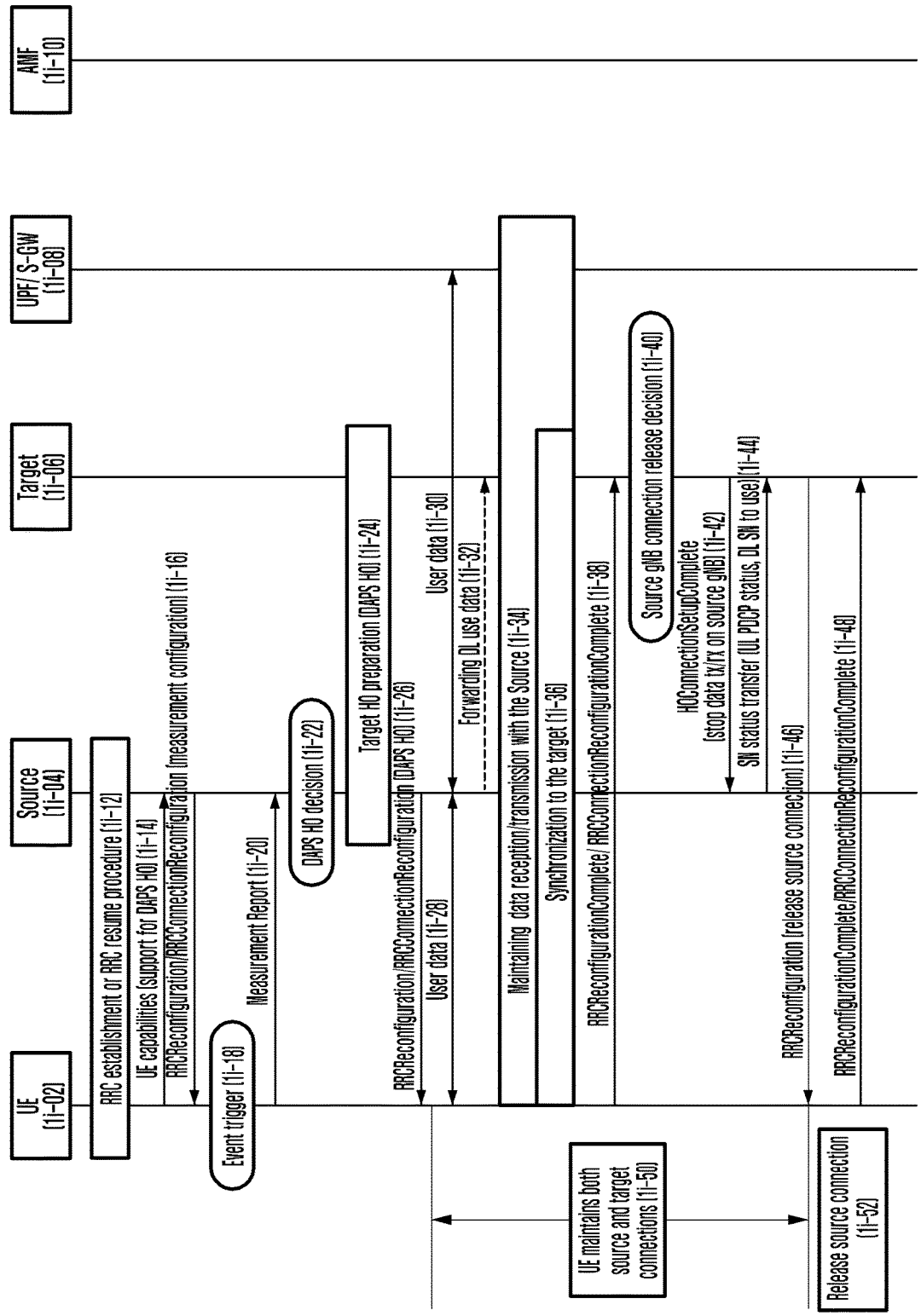
FIG. 1I is a flowchart illustrating a process of performing DAPS handover in the disclosure.

FIG. 1I is a sequence diagram illustrating a process of performing DAPS handover in the disclosure.

A UE 1i-02 may switch to a connected mode with a source base station 1i-04 through an RRC establishment or RRC resume process (indicated by reference numeral 1i-12).

The UE 1i-02 having a DAPS handover support capability may report to the source base station 1i-04 that the UE itself supports the DAPS handover (indicated by reference numeral 1i-14).

The source base station 1i-04 may configure the measurement configuration by using an RRC connection reconfiguration message (RRCReconfiguration in NR, or RRCConnectionReconfiguration in LTE) for the purpose of mobility support to the UE 1i-02 (indicated by reference numeral 1i-16).

When a measurement report event is triggered (indicated by reference numeral 1i-18), the UE 1i-02 may report a measurement report to the base station 1i-04 (indicated by reference numeral 1i-20).

Upon receiving the measurement report, the source base station 1i-04 may determine to perform handover with a specific neighboring base station based on cell measurement information included in the measurement report (indicated by reference numeral 1i-22). In addition, the source base station 1i-04 may transmit a handover request message to a target base station 1i-06, and the target base station 1i-06 may transmit a response message thereto to the source base station 1i-04 (indicated by reference numeral 1i-24). The handover request message may include an indicator indicating that the UE 1i-02 is to perform DAPS handover. The UE 1i-02 may include handover configuration information or additional configuration information in the response message.

The source base station 1i-04 includes the handover configuration information or additional configuration information, received from the target base station 1i-06, in a predetermined RRC message, and may transmit the predetermined RRC message (an RRCReconfiguration message when the source base station is an NR cell; an RRCConnectionReconfiguration message when the source base station is an LTE cell) to the UE 1i-02 (indicated by reference numeral 1i-26). The handover configuration information (e.g., ReconfigWithSync in NR; MobilityControlInfo in LTE) may include the ID of the target cell, frequency information, configuration information (dedicated preamble information, dedicated radio resource information, etc.) necessary for a random access operation to the target cell, transmission power information, C-RNTI information used in the target cell, a T304 timer value, a T304-like timer value, and the like. Upon receiving the handover configuration information, the UE 1i-02 may drive a T304 or T304-like timer and perform random access to the target cell (indicated by reference numeral 1i-36).

When the timer expires, when the RRC connection reconfiguration message is not successfully transmitted to the target cell, the handover may be considered to be failed. When the handover is considered to be failed, the UE 1i-02 may re-apply the configuration information used by the source cell or the source base station (revert back to the configuration used in the source PCell/base station). In this case, the UE may continuously perform data transmission/reception to or from the source base station without initiating the RRC connection re-establishment procedure with the source cell.

In operation 1i-26, some pieces of system information among system information broadcast by the target cell may be included in the RRC connection reconfiguration message.

In operation 1i-26, an indicator indicating handover using DAPS may be included in the RRC connection reconfiguration message. Upon receiving the indicator, the UE 1i-02 may maintain data transmission/reception to or from the source cell 1i-04 until a predetermined time point even after transmitting the first preamble to the target cell 1i-06 (indicated by reference numerals 1i-28 and 1i-34). UE user data transmitted/received to or from the source cell 1i-04 may be transmitted to an end user through a UPF/S-WG 1i-08 (indicated by reference numeral 1i-30). The source cell 1i-04 may forward downlink data of the UE 1i-02 to the target cell 1*i*-06 (indicated by reference numeral 1*i*-32). This may occur because the signal quality of the link with the source cell 1*i*-04 rapidly deteriorates, thus making data transmission or reception difficult.

When the UE 1*i*-02 receives a random access response message from the target cell 1*i*-06, the UE may transmit an RRC connection reconfiguration complete message (RRCReconfiguratonComplete message in NR, or RRCConnectionReconfigurationComplete message in LTE) to the target cell 1*i*-06 (indicated by reference numeral 1*i*-38). When the RRC message is successfully transmitted, it may be understood as that handover to the target cell 1*i*-06 has been successfully completed. The UE 1*i*-02 may perform uplink data transmission to the source cell 1*i*-04 before the RRC message is successfully transmitted.

Upon receiving the UL grant (uplink scheduling information) from the target cell 1*i*-06, the UE 1*i*-02 may perform uplink switching to the target cell 1*i*-06. Upon receiving the RRC connection reconfiguration complete message, the target cell 1*i*-06 may determine to release the connection between the UE 1*i*-02 and the source cell 1*i*-04 (indicated by reference numeral 1*i*-40).

The target cell 1*i*-06 may request the source cell 1*i*-04 to release the connection (indicated by reference numeral 1*i*-42). Upon receiving the request, the source cell 1*i*-04 may stop data transmission/reception to or from the UE 1*i*-02. The source cell 1*i*-04 may provide SN status transfer to the target cell 1*i*-06 (indicated by reference numeral 1*i*-44). The information may be used to smoothly perform data transmission/reception to or from the UE 1*i*-02 in the target cell 1*i*-06. The target cell 1*i*-06 may instruct the UE 1*i*-02 to disconnect from the source cell 1*i*-04 by using a predetermined RRC message (indicated by reference numeral 1*i*-46). Upon receiving the message, the UE 1*i*-02 may release the connection with the source cell 1*i*-04 (indicated by reference numeral 1*i*-52) and transmit a response message to the message (indicated by reference numeral 1*i*-48). As another option, after a predetermined offset time or when the UE 1*i*-02 successfully transmits the RRC connection reconfiguration complete message to the target cell 1*i*-06, the UE may implicitly release connection to the source cell 1*i*-04.

Figure 1J:
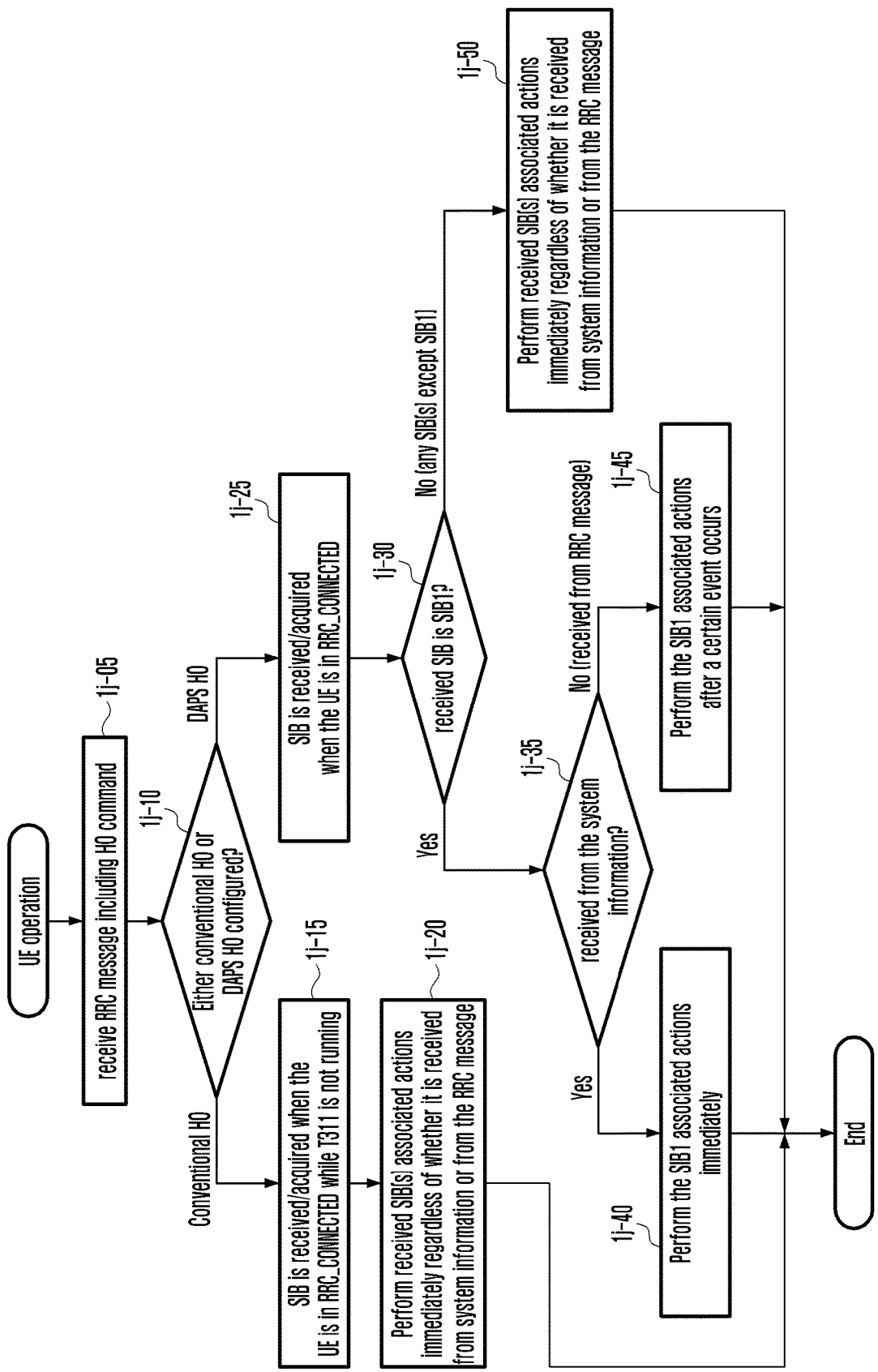
FIG. 1J is a flowchart illustrating a UE operation according to reception of system information of a target cell according to whether DAPS handover is supported.

FIG. 1J is a flowchart of a UE operation according to reception of system information of a target cell according to whether DAPS handover is supported.

In operation 1*j*-05, the UE may receive a dedicated RRC message including a handover command (HO command) from the source base station. When the source base station is an LTE base station, the HO command may denote mobilityControlInfo, and the dedicated RRC message may denote an RRCConnectionReconfiguration message. When the source base station is an NR base station, the HO command may denote reconfigWithSync, and the dedicated RRC message may denote an RRCReconfiguration message.

In operation 1*j*-10, the UE may determine whether DAPS HO is configured. For example, when an indicator indicating DAPS HO is included in the RRC connection reconfiguration message received in operation 1*j*-05, the UE may determine that DAPS HO is configured.

As a result of the determination, in case that the DAPS HO is not configured, the UE may proceed to operation 1*j*-15.

In operation 1*j*-15, the UE in an RRC connected mode may receive system information of the target cell when a T311 timer is not driven. The T311 timer is a timer driven when performing an RRC connection re-establishment procedure. The UE may receive the system information of the target cell from the dedicated RRC message in operation 1*j*-05 or from the system information broadcast by the target cell.

In operation 1*j*-20, regardless of whether the system information of the target cell is received through broadcast signaling or dedicated signaling, the UE may immediately perform the following UE operation when system information is received.

Case 1: When the target cell is an NR cell, the UE may:
  In case that SIB1 is received,
    disregard the frequencybandlist if received
    forward the cellIdentity (Cell ID) to upper layer devices
    forward the tracking area code (trackingAreaCode) to upper layer devices
  In case that SIB6 is received, perform an action corresponding thereto. The action may comply with TS 38.331 standard 5.2.2.4.7.
  In case that SIB7 is received, perform an action corresponding thereto. The action may comply with TS 38.331 standard 5.2.2.4.8.
  In case that SIB8 is received, perform an action corresponding thereto. The action may comply with TS 38.331 standard 5.2.2.4.9.
Case 2: When the target cell is an LTE cell, the UE may:
  In case that SIB1 is received,
    disregard the frequencybandlist and/or multiBandInfoList if received
    forward the cellIdentity (Cell ID) to upper layer devices
    forward the tracking area code (trackingAreaCode) to upper layer devices
  When SIB2 is received, apply commonly applied radio resource configuration information (apply the configuration included in the radioResourceConfigCommon)
  In case that SIB10 is received, perform an action corresponding thereto. The action may comply with TS 36.331 standard 5.2.2.17.
  In case that SIB11 is received, perform an action corresponding thereto. The action may comply with TS 36.331 standard 5.2.2.18.
  In case that SIB12 is received, perform an action corresponding thereto. The action may comply with TS 36.331 standard 5.2.2.19.

As a result of the determination in operation 1*j*-10, in case that DAPS HO is configured, the UE may proceed to operation 1*j*-25. In operation 1*j*-25, the DAPS HO is configured and the UE in the RRC connected mode may receive system information of the target cell. The UE may receive the system information of the target cell from the dedicated RRC message in operation 1*j*-05 or from the system information broadcast by the target cell.

In operation 1*j*-30, the UE having configured with DAPS HO may determine whether the system information of the target cell, received in operation 1*j*-25, is SIB1 or system information other than SIB1. The system information of the target cell other than SIB1 may include at least one of the following.

In case that the target cell is an NR cell, the system information thereof may include SIB6, SIB7 or SIB8.
  When the target cell is an LTE cell, the system information thereof may include SIB2, SIB10, SIB11, SIB12

In operation 1*j*-30, the UE may determine whether the received SIB1 of the target cell is received/obtained from system information broadcast by the target cell or received from the dedicated RRC message received in operation 1*j*-05.

As a result of the determination, when the UE receives/obtains the SIB1 from the system information broadcast by the target cell, the UE may determine whether the received/obtained SIB1 is SIB received from the system information broadcast by the target cell in operation 1*j*-35.

When it is determined that the received/obtained SIB1 is received from system information broadcast by the target cell, the UE may immediately perform an operation upon receiving SIB1 of the target cell in operation 1*j*-40.

Case 1: When the target cell is an NR cell, the UE may:
disregard the frequencybandlist if received
forward the cellIdentity (Cell ID) to upper layer devices
forward the tracking area code (trackingAreaCode) to upper layer devices
apply commonly applied serving cell configuration information (apply the configuration included in the servingCellConfigCommon)

Case 2: When the target cell is an LTE cell, the UE may:
disregard the frequencybandlist and/or multiBandInfoList if received
forward the cellIdentity (Cell ID) to upper layer devices
forward the tracking area code (trackingAreaCode) to upper layer devices In operation 1*j*-35, when it is determined that the received/obtained SIB1 is not received from system information broadcast by the target cell, or when it is determined that the SIB1 of the target cell is received from the dedicated RRC message received in operation 1*j*-05, the UE may perform the following operation upon receiving SIB1 of the target cell when a specific event occurs.

Case 1: When the target cell is an NR cell, the UE may:
In case that SIB1 is received,
disregard the frequencybandlist if received
forward the cellIdentity (Cell ID) to upper layer devices
forward the tracking area code (trackingAreaCode) to upper layer devices Case 2: When the target cell is an LTE cell, the UE may:
In case that SIB1 is received,
disregard the frequencybandlist and/or multiBandInfoList if received
forward the cellIdentity (Cell ID) to upper layer devices
forward the tracking area code (trackingAreaCode) to upper layer devices In the disclosure, a specific event may denote one of the following.

After transmission of the preamble to the target cell or after starting the random access process
After receiving the random access response message from the target cell
After stopping the running T304 timer or T304-liki timer by considering that the handover has been successfully completed
After (successful) transmission of the RRC connection reconfiguration complete message (RRCReconfigurationComplete in NR, RRCConnectionReconfigurationComplete in LTE)
When the target cell instructs the UE to disconnect from the source cell through an RRC connection reconfiguration message In operation 1*j*-30, when it is determined that the system information of the target cell received in operation 1*j*-25 is system information other than SIB1, regardless of whether the system information of the target cell is received through broadcast signaling or dedicated signaling in operation 1*j*-50, the UE may immediately perform the following UE operation.

Case 1: When the target cell is an NR cell, the UE may:
In case that SIB6 is received, perform an action corresponding thereto. The action may comply with TS 38.331 standard 5.2.2.4.7.
In case that SIB7 is received, perform an action corresponding thereto. The action may comply with TS 38.331 standard 5.2.2.4.8.
In case that SIB8 is received, perform an action corresponding thereto. The action may comply with TS 38.331 standard 5.2.2.4.9.

Case 2: When the target cell is an LTE cell, the UE may:
In case that SIB2 is received, apply commonly applied radio resource configuration information (apply the configuration included in the radioResourceConfigCommon)
In case that SIB10 is received, perform an action corresponding thereto. The action may comply with TS 36.331 standard 5.2.2.17.
In case that SIB11 is received, perform an action corresponding thereto. The action may comply with TS 36.331 standard 5.2.2.18.
In case that SIB12 is received, perform an action corresponding thereto. The action may comply with TS 36.331 standard 5.2.2.19.

Alternatively, the UE according to an embodiment of the disclosure may perform the following operation even when SIB1 of the target cell is received in operation 1*j*-05, and this is because an additional problem does not occur even when the handover fails.

Case 1: When the target cell is an NR cell, the UE may:
disregard the frequencybandList if received
apply commonly applied serving cell configuration information (apply the configuration included in the servingCellConfigCommon)

Figure 1K:
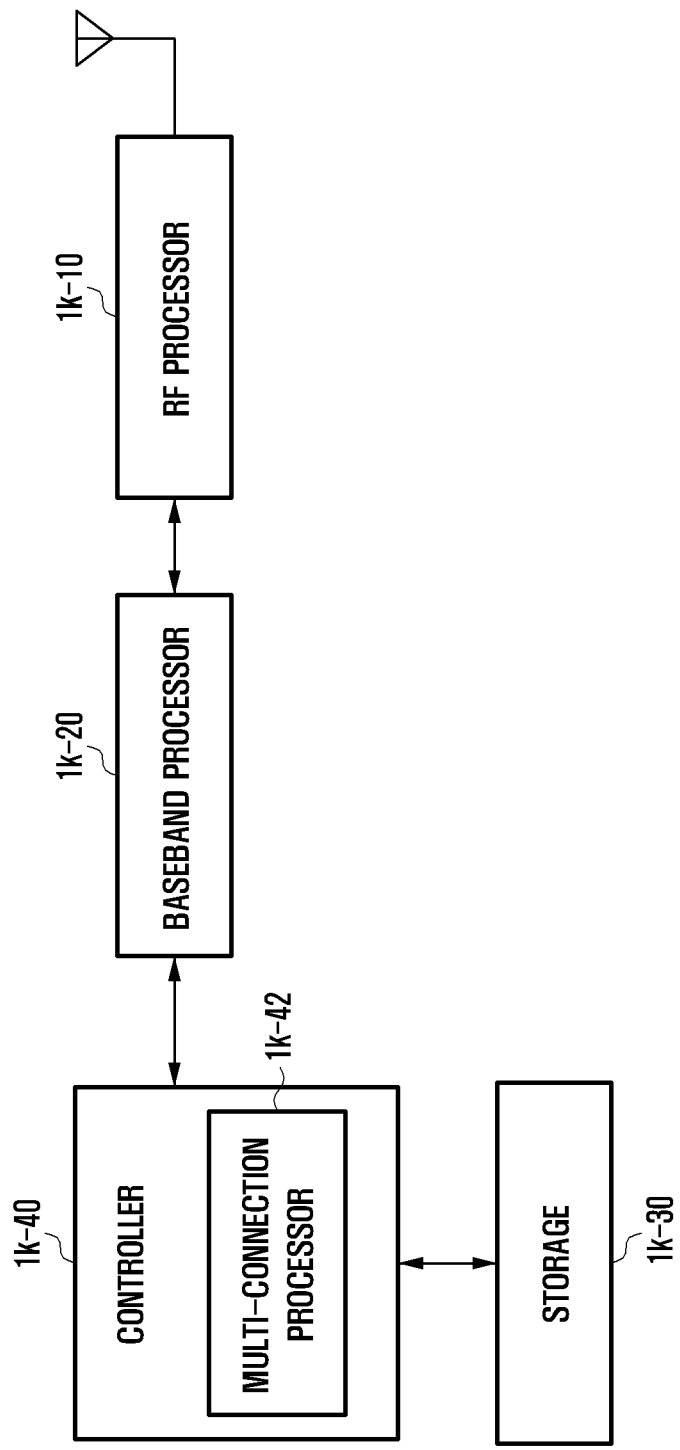
FIG. 1K is a block diagram showing the internal structure of a UE to which the disclosure is applied.

Case 2: When the target cell is an LTE cell, the UE may:
disregard the frequencybandList and/or multiBandInfoList, if received FIG. 1K is a block diagram showing the internal structure of a UE to which the disclosure is applied.

Referring to the figure, the UE may include a radio frequency (RF) processor 1*k*-10, a baseband processor 1*k*-20, a storage 1*k*-30, and a controller 1*k*-40.

The RF processor 1*k*-10 may perform a function of transmitting and receiving a signal through a radio channel, such as band conversion and amplification of a signal. That is, the RF processor 1*k*-10 up-converts a baseband signal provided from the baseband processor 1*k*-20 to an RF band signal to thus transmit the same through an antenna, and down-converts an RF band signal received through the antenna to a baseband signal. For example, the RF processor 1*k*-10 may include a transmission filter, a reception filter, an amplifier, a mixer, an oscillator, a digital-to-analog converter (DAC), an analog-to-digital converter (ADC), and the like. Although only one antenna is illustrated in the above figure, the UE may have a plurality of antennas. In addition, the RF processor 1*k*-10 may include a plurality of RF chains. Further, the RF processor 1*k*-10 may perform beamforming. To perform beamforming, the RF processor 1*k*-10 may adjust the phases and magnitudes of signals transmitted and received through a plurality of antennas or antenna elements. In addition, the RF processor may perform MIMO, and may receive multiple layers when performing the MIMO operation.

The baseband processor 1*k*-20 may perform a function of conversion between a baseband signal and a bit string according to the physical layer specification of the system. For example, in a case of data transmission, the baseband processor 1*k*-20 encodes and modulates transmission bit strings, thereby generating complex symbols. In addition, upon receiving data, the baseband processor 1k-20 demodulates and decodes a baseband signal provided from the RF processor 1k-10 to thus recover reception bit strings. For example, in a case where an orthogonal frequency division multiplexing (OFDM) scheme is applied, when transmitting data, the baseband processor 1k-20 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the baseband processor 1k-20 divides the baseband signal provided from the RF processor 1k-10 into OFDM symbol units, restores the signals mapped to the subcarriers through a fast Fourier transform (FFT) operation, and then restores reception bit strings through demodulation and decoding.

The baseband processor 1k-20 and the RF processor 1k-10 may transmit or receive signals as described above. Accordingly, the baseband processor 1k-20 and the RF processor 1k-10 may be referred to as a "transmitter", a "receiver", a "transceiver", or a "communication unit". Further, at least one of the baseband processor 1k-20 and the RF processor 1k-10 may include a plurality of communication modules in order to support a plurality of different radio access techniques. In addition, at least one of the baseband processor 1k-20 and the RF processor 1k-10 may include different communication modules to process signals in different frequency bands. For example, the different radio access techniques may include a wireless LAN (e.g., IEEE 802.11), a cellular network (e.g., LTE), and the like. In addition, the different frequency bands may include super-high frequency (SHF) (e.g., 2. NRHz or NRhz) bands or millimeter wave (e.g., 60 GHz) bands.

The storage 1k-30 may store data such as fundamental programs, application programs, and configuration information for the operation of the UE. In particular, the storage 1k-30 may store information related to a second access node that performs wireless communication using a second wireless access technology. In addition, the storage 1k-30 provides the stored data in response to a request from the controller 1k-40.

The controller 1k-40 may control the overall operation of the UE. For example, the controller 1k-40 transmits and receives signals through the baseband processor 1k-20 and the RF processor 1k-10. In addition, the controller 1k-40 records and reads data in and from the storage 1k-30. To this end, the controller 1k-40 may include at least one processor. For example, the controller 1k-40 may include a communication processor (CP) for controlling communication and an application processor (AP) for controlling upper layers such as application programs.

Specifically, the controller 1k-40 may control the transceiver to receive, from a source base station, a control message including an indicator indicating whether a dual active protocol stack (DAPS) handover is configured, may obtain a system information block (SIB), may determine whether the obtained SIB is a specific SIB, may identify whether the specific SIB has been received through the control message when the obtained SIB is the specific SIB as a result of determination, and in case that the specific SIB is determined to have been received through the control message, may perform control to perform at least one operation according to the specific SIB when a preconfigured event occurs.

The preconfigured event may include transmission of a radio resource control (RRC) connection reconfiguration complete message to the target base station having performed the DAPS handover based on the control message.

The specific SIB may be SIB1.

The controller 1k-40 may transmit a cell identity to an upper layer device or transmit a tracking area code to an upper layer device by using at least one operation according to the specific SIB.

In addition, when it is determined that the specific SIB is obtained from system information broadcast by the target base station, the controller 1k-40 may perform control to immediately perform at least one operation according to the specific SIB. In addition, the obtained SIB may be obtained when the DPAS handover is configured and the UE is in an RRC connected mode.

Figure 1L:
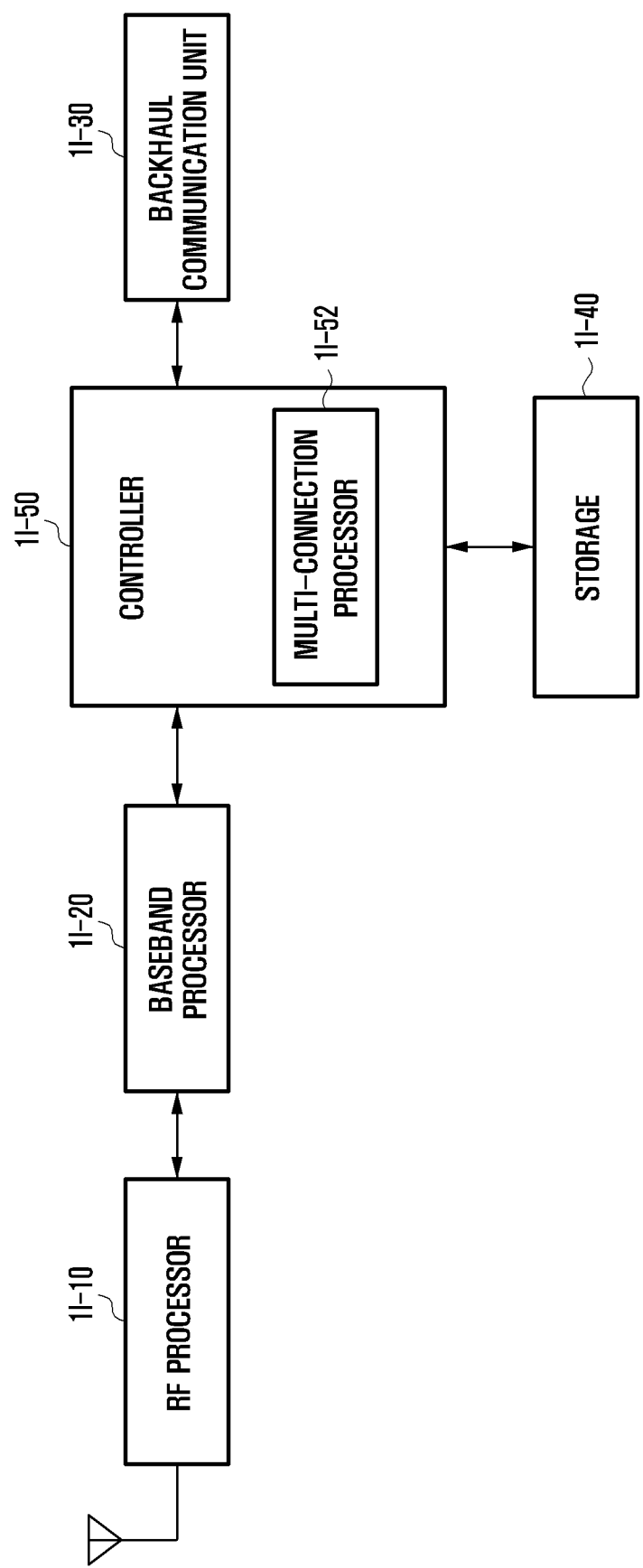
FIG. 1L is a block diagram showing the configuration of a base station according to the disclosure.

FIG. 1L is a block diagram showing the configuration of a base station according to the disclosure.

As shown in the figure, the base station may include a radio frequency (RF) processor 1l-10, a baseband processor 1l-20, a backhaul communication unit 1l-30, a storage 1l-40, and a controller 1l-50.

The RF processor 1l-10 may perform a function of transmitting and receiving a signal through a radio channel, such as band conversion and amplification of a signal. That is, the RF processor 1l-10 up-converts a baseband signal provided from the baseband processor 1l-20 to an RF band signal to thus transmit the same through an antenna, and down-converts an RF band signal received through the antenna to a baseband signal. For example, the RF processor 1l-10 may include a transmission filter, a reception filter, an amplifier, a mixer, an oscillator, a digital-to-analog converter (DAC), an analog-to-digital converter (ADC), and the like. Although only one antenna is illustrated in the above figure, the first access node may have a plurality of antennas. In addition, the RF processor 1l-10 may include a plurality of RF chains. Further, the RF processor 1l-10 may perform beamforming. To perform beamforming, the RF processor 1l-10 may adjust the phases and magnitudes of signals transmitted and received through a plurality of antennas or antenna elements. The RF processor may perform downlink MIMO operation by transmitting one or more layers.

The baseband processor 1l-20 may perform a function of conversion between a baseband signal and a bit string according to the physical layer specification of the system. For example, in a case of data transmission, the baseband processor 1l-20 encodes and modulates transmission bit strings, thereby generating complex symbols. In addition, upon receiving data, the baseband processor 1l-20 demodulates and decodes a baseband signal provided from the RF processor 1l-10 to thus recover reception bit strings. For example, in a case where an orthogonal frequency division multiplexing (OFDM) scheme is applied, when transmitting data, the baseband processor 1l-20 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the baseband processor 1l-20 divides the baseband signal provided from the RF processor 1l-10 into OFDM symbol units, restores the signals mapped to the subcarriers through a fast Fourier transform (FFT) operation, and then restores reception bit strings through demodulation and decoding. The baseband processor 1l-20 and the RF processor 1l-10 may transmit or receive signals as described above. Accordingly, the baseband processor 1l-20 and the RF processor 1l-10 may be referred to as a "transmitter", a "receiver", a "transceiver", a "communication unit", or a "wireless communication unit".

The backhaul communication unit 1*l*-30 provides an interface for communicating with other nodes in the network. That is, the backhaul communication unit 1*l*-30 converts a bit string transmitted from a main base station to another node, for example, an auxiliary base station, a core network, etc. into a physical signal, and converts the physical signal received from the other node into a bit string.

The storage 1*l*-40 stores data such as a basic program, an application program, and configuration information for the operation of the main base station. In particular, the storage 1*l*-40 may store information on a bearer assigned to an accessed UE, a measurement result reported from the accessed UE, and the like. In addition, the storage 1*l*-40 may store information serving as a criterion for determining whether to provide or stop multiple connections to the UE. In addition, the storage 1*l*-40 provides the stored data according to the request of the controller 1*l*-50.

The controller 1*l*-50 controls overall operations of the main base station. For example, the controller 1*l*-50 transmits or receives signals through the baseband processor 1*l*-20 and the RF processor 1*l*-10 or through the backhaul communication unit 1*l*-30. In addition, the controller 1*l*-50 writes and reads data in the storage 1*l*-40. To this end, the controller 1*l*-50 may include at least one processor.

Second Embodiment

The disclosure may provide an apparatus and method capable of effectively supporting a V2X service in a wireless communication system.

Figure 2A:
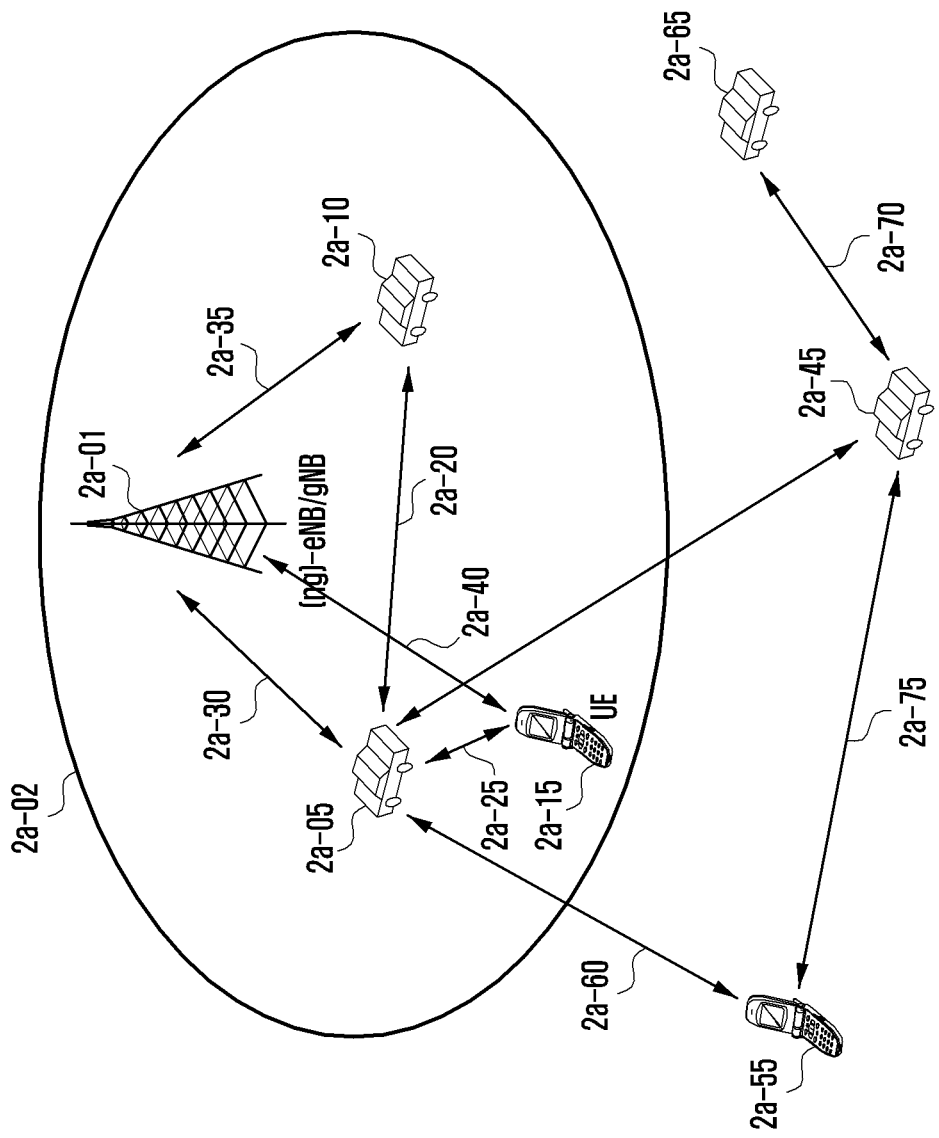
FIG. 2A illustrates V2X communication of a next-generation mobile communication system according to an embodiment of the disclosure.

FIG. 2A illustrates V2X communication of a next-generation mobile communication system according to an embodiment of the disclosure.

Vehicle-to-everything (V2X) according to an embodiment of the disclosure collectively refers to communication technology with a vehicle via all interfaces, and includes vehicle-to-vehicle (V2V), vehicle-to-infrastructure (V2I), vehicle-to-pedestrian (V2P), and vehicle-to-network (V2N) based on a type thereof and elements performing communication.

Referring to FIG. 2A, a base station 2*a*-01 may include at least one vehicle terminal 2*a*-05 or 2*a*-10 or a pedestrian mobile terminal 2*a*-15 located within a cell 2*a*-02 supporting V2X. V2X is supportable via a Uu interface or PC5 interface. When V2X is supported via a Uu interface, for example, the vehicle terminals 2*a*-05 and 2*a*-10 may perform V2X cellular communication with the base station 2*a*-01 by using vehicle terminal-base station uplink/downlink (UL/DL) 2*a*-30 or 2*a*-35, and the pedestrian mobile terminal 2*a*-15 may perform cellular communication by using pedestrian terminal-base station UL/DL 2*a*-40.

When V2X is supported via a PC5 interface, V2X sidelink (SL) communication may be performed by using terminal-terminal sidelink (SL) 2*a*-20 or 2*a*-25. For example, the vehicle terminal 2*a*-05 located in coverage of base station (E-UTRA/NR) may transmit or receive a V2X packet via sidelinks (SLs) 2*a*-20, 2*a*-50, 2*a*-25, or 2*a*-60 that is a transmission channel with another vehicle terminal 2*a*-10 or 2*a*-45 or pedestrian mobile terminal 2*a*-15 or 2*a*-55. V2X packets may be transmitted or received in a broadcast transmission type and/or unicast and/or groupcast transmission type.

A terminal supporting V2X sidelink communication may transmit or receive V2X packets through a resource allocation mode (scheduled resource allocation or UE autonomous resource selection). Scheduled resource assignment (mode 1 or mode 3) may be a mode in which a base station assigns a resource used in sidelink transmission in a dedicated scheduling manner to a terminal in an RRC-connected mode. The scheduled resource assignment mode may be effective in interference management and management of a resource pool (dynamic assignment, semi-persistence transmission, etc.) because the base station can manage sidelink resources. When there is data to be transmitted to other UE(s), a terminal in an RRC connected mode may transmit, to the base station, information indicating that there is data to be transmitted to the other terminal(s) by using an RRC message or an MAC control element (CE). For example, the RRC message may include a SidelinkUEInformation or UEAssistanceInformation message, and the MAC CE may include buffer state report MAC CE of a new format (including at least an indicator notifying a buffer state report for V2X communication and information about a size of data buffered for sidelink communication).

UE autonomous resource selection (mode 2 and/or mode 4) is a mode in which a base station provides sidelink resource information/pool to a terminal supporting V2X SL communication via system information or RRC message and the UE selects a resource pool according to a determined rule. When the base station provides information to the UE using system information, for example, the base station may provide sidelink resource information to the UE by signaling SIB21, SIB26, or SIBx to be newly defined for the NR V2X terminal. When the base station provides information to the UE using the RRC message, for example, the base station may provide signaling of an RRC connection reconfiguration message (RRCReconfiguration message) and/or a connection resumption message (RRCResume message) to the UE to provide sidelink resource information. In addition, UE autonomous resource selection may cause a UE to help other UE(s) to select a resource used for sidelink through a PC5-RRC message and/or MAC CE, or to allocate resources used for sidelink transmission via direct or indirect scheduling. For example, the UE autonomous resource selection mode may include one or more of the following modes.

A UE autonomously selects sidelink resource for transmission

A UE assists sidelink resource selection for other UEs

A UE is configured with NR configured grant for sidelink transmission

A UE schedules sidelink transmission of other UEs

The resource selection method of the UE may include zone mapping, sensing-based resource selection, random selection, configured grant-based resource selection, and the like.

A terminal supporting V2X sidelink communication may transmit and receive V2X packets based on a preconfigured resource pool (preconfiguration resource) included in SL-V2X-Preconfiguration, which is an information element (hereinafter, IE). For example, even when the UE exists in the coverage of the base station, in case that the UE cannot perform V2X sidelink communication based on the UE autonomous resource selection mode and/or scheduled resource allocation for a predetermined reason, the UE may perform V2X sidelink communication through the sidelink transmission/reception resource pool preconfigured in SL-V2X-Preconfiguration which is the IE. In addition, the vehicle terminal 2*a*-45 out-of-coverage of the base station (out-of-coverage of E-UTRA/NR) may perform V2X sidelink communication with another vehicle terminal 2*a*-65 or a pedestrian mobile terminal 2*a*-55 based on the above-described sidelink preconfiguration resource through sidelink (SL) 2*a*-70 or 2*a*-75 which is a transmission channel.

LTE V2X SL communication is designed mainly targeting a basic safety service. For example, a terminal supporting LTE V2X SL communication is designed to provide a basic safety service to all nearby terminals supporting LTE V2X SL communication through a broadcast transmission type. Therefore, there is no need for the UE to perform a process of establishing a session with another specific terminal separately or to perform a sidelink connection establishment procedure.

However, in next-generation mobile communication (NR), V2X SL communication can be designed to provide not only basic safety services but also various and improved services (e.g., autonomous driving service, platooning service, remote driving service, or in-vehicle infotainment). Therefore, NR V2X SL communication may be designed to support not only a broadcast transmission type but also a unicast and/or groupcast transmission type.

Figure 2B:
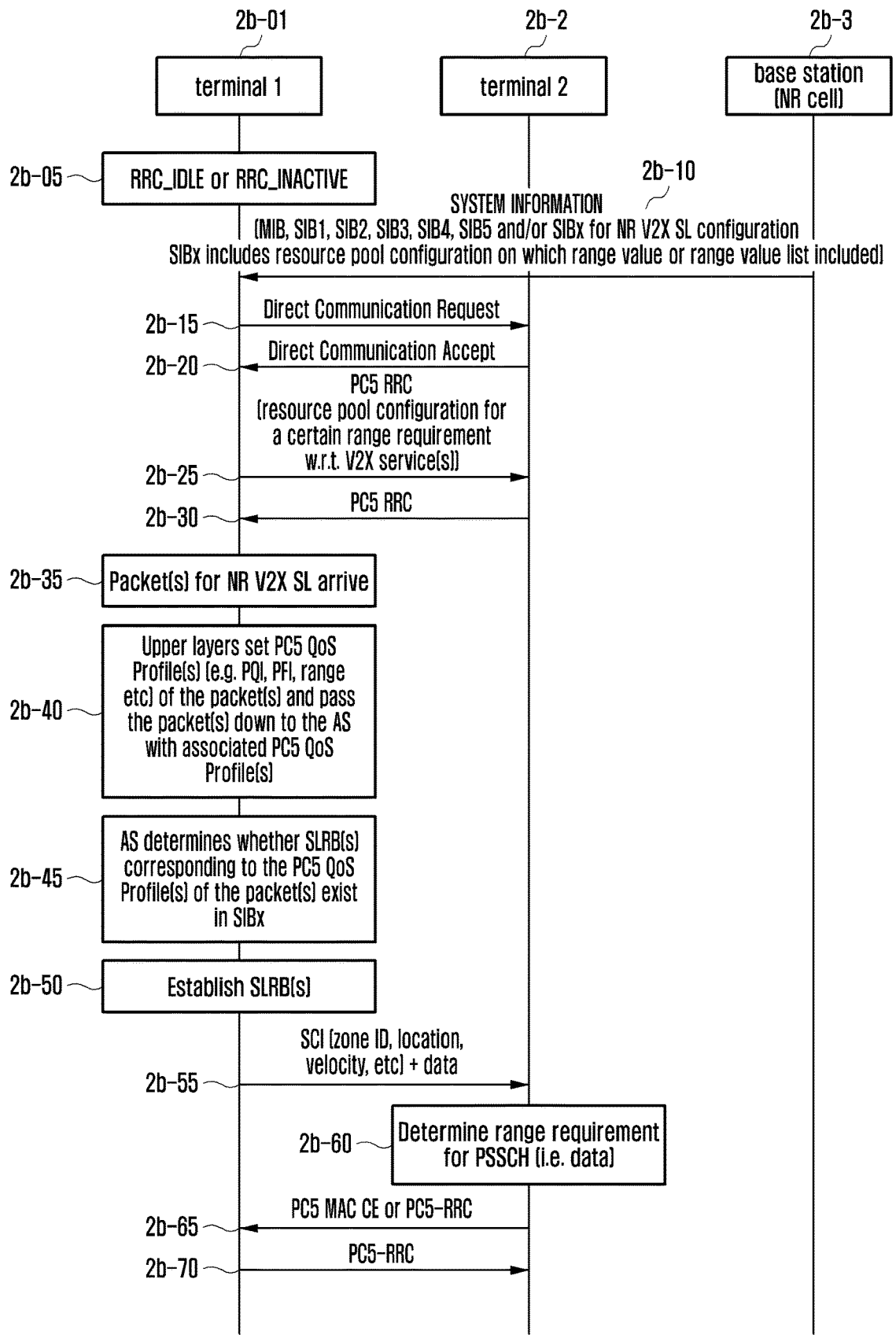
FIG. 2B illustrates operations of a terminal and a base station according to a range requirement when a terminal supporting NR V2X sidelink communication performs NR V2X unicast sidelink communication in an RRC idle mode (RRC_IDLE) or RRC inactive mode (RRC_INACTIVE) according to an embodiment of the disclosure.

FIG. 2B illustrates operations of a terminal and a base station according to a range requirement when a terminal supporting NR V2X sidelink communication performs NR V2X unicast sidelink communication in an RRC idle mode (RRC_IDLE) or RRC inactive mode (RRC_INACTIVE) according to an embodiment of the disclosure.

A terminal according to an embodiment of the disclosure may include a vehicle terminal or a pedestrian terminal. The terminal may support NR V2X sidelink communication. An NR base station according to an embodiment of the disclosure may provide signaling of system information related to NR V2X sidelink configuration information periodically or in an on-demand form.

Referring to FIG. 2B, a first terminal 2b-01 capable of performing NR V2X sidelink communication does not establish an RRC connection with a base station 2b-03, and thus the first terminal may be in an RRC idle mode (RRC_IDLE) or RRC inactive mode (RRC_INACTIVE) (indicated by reference numeral 2b-05).

The first terminal 2b-01 in the RRC idle mode or RRC inactive mode may find and camp on a suitable NR cell 2b-03 through a cell selection procedure or a cell reselection procedure to acquire system information (indicated by reference numeral 2b-10). As an example, the system information may denote MIB1, SIB1, SIB2, SIB3, SIB4, SIB5, or one or multiple SIBx defined/introduced for NR V2X sidelink communication and including NR V2X sidelink configuration information. According to an embodiment, the cell in which the first terminal 2b-01 camps-on may be referred to as a serving cell (hereinafter referred to as SCell) or a primary cell (hereinafter referred to as a PCell).

Specifically, in operation 2b-10, when SIB1 (SystemInformationBlockType1) received from a cell (Scell or PCell) indicates that the above-described SIBx exists through the system information scheduling information list (si-SchedulingInfo), the first terminal 2b-01 in the RRC idle mode or RRC inactive mode may acquire the SIBx. Alternatively, in case that the SIBx in a valid state has not been stored, the first terminal 2b-01 may acquire the SIBx.

According to an embodiment of the disclosure, when the base station 2b-03 broadcasts SIBx, SIBx may optionally include sl-V2X-ConfigCommon. sl-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-pssch-TxConfigList, v2x-packetDuplicationConfig, syncFreqList, slss-TxMultiFreq, v2x-FreqSelectionConfigList, and threshS-RSSI-CBR.

Additionally, SIBx may include sidelink radio bearer (hereinafter SLRB) configuration information for PC5 QOS Profiles. For example, sidelink bearer configuration information for one or multiple PC5 QOS Profiles may include mapping information for one SLRB and/or packet data convergence protocol (PDCP)/radio link control (RLC)/logical channel (LCH) configuration information. The sidelink bearer configuration information is not limited to the above example, or the sidelink bearer configuration information for one PC5 QoS Profile may include mapping information for one or multiple SLRBs and/or PDCP/RLC/LCH configuration information.

The aforementioned PC5 QoS Profile may denote at least one of PC5 QoS parameters/characteristics such as PC5 QoS flow identifier (PFI), range (units of meters) and/or required data rate, and/or PC5 QoS indicator (PQI). (See Table 1). The range may denote a maximum range value that needs to be supported in a specific V2X service.

Further, according to an embodiment of the disclosure, each V2X service may be configured by sets of PFIs, and each PFI corresponds to a QoS parameter. The QoS parameter may denote PQI and/or range. PQI may denote a part of 5QI, and may be a reference indicating PC5 QOS characteristics. PQI may be mapped to QoS characteristics in one-to-one relationship, and each mapping relationship is disclosed in Table 1 below.

TABLE 1

| PQI Value | Resource Type | Default Priority Level | Packet Delay Budget | Packet Error Rate | Default Maximum Data Burst Volume | Default Averaging Window | Example Services |
| --- | --- | --- | --- | --- | --- | --- | --- |
| 1 | GBR | 3 | 20 ms | $10^{-4}$ | N/A | 2000 ms | Platooning between UEs Higher degree of automation; platooning between UE and RSU - Higher degree of automation |
| 2 | | 4 | 50 ms | $10^{-2}$ | N/A | 2000 ms | Sensor sharing higher degree of automation |
| 3 | | 3 | 100 ms | $10^{-4}$ | N/A | 2000 ms | Information sharing for automated driving between UEs or UE and RSU - higher degree of automation |

TABLE 1-continued

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 55 | Non-GBR | 3 | 10 ms | $10^{-4}$ | N/A | N/A | Cooperative lane change - higher degree of automation |
| 56 | | 6 | 20 ms | $10^{-1}$ | N/A | N/A | Platooning informative exchange - low degree of automation; Platooning information sharing with RSU |
| 57 | | 5 | 25 ms | $10^{-1}$ | N/A | N/A | Cooperative lane change - lower degree of automation |
| 58 | | 4 | 100 ms | $10^{-2}$ | N/A | N/A | Sensor information sharing - lower degree of automation |
| 59 | | 6 | 500 ms | $10^{-1}$ | N/A | N/A | Platooning - reporting to an RSU |
| 82 | Delay Critical GBR | 3 | 10 ms | $10^{-4}$ | 2000 bytes | 2000 ms | Cooperative collision avoidance; Sensor sharing - Higher degree of automation; Video sharing - higher degree of automation |
| 83 | | 2 | 3 ms | $10^{-5}$ | 2000 byte | 2000 ms | Emergency trajectory alignment; Sensor sharing - Higher degree of automation |

Alternatively, in operation 2b-10, when the base station 2b-03 broadcasts SIBx to the first terminal 2b-01, the SIBx may include a range value for each resource pool configuration information (e.g., SL-Range in each resource pool). In addition, according to an embodiment of the disclosure, each resource pool configuration information may include one value among a plurality of range values. One value may denote a distance range (e.g., 100 meters or 200 meters) that needs to be supported in a particular V2X service or the range of distance ranges (e.g., [0, 100 meters] or [101, 200 meters]). Alternatively, in operation 2b-10, when the base station 2b-03 broadcasts SIBx to the first terminal 2b-01, the SIBx may include a list of range values for each resource pool configuration information (e.g., SL-Rangelist in each resource pool). According to an embodiment of the disclosure, each resource pool configuration information may include a plurality of values among a plurality of range values. According to one embodiment, the resource pool may include time/frequency resource information for V2X service. In addition, the resource pool may include sensing information (information for determining whether to use a resource before using the resource), Tx/Rx parameters, zone ID, and information indicating whether the channel is busy.

According to an embodiment of the disclosure, the resource pool may include resource information for reception of V2X service, resource information for using V2X service (data transmission and reception for the V2X service) in a general situation, resource information for using V2X service (data transmission and reception for the V2X service) in an exceptional situation (e.g., resource information used only in an exceptional situation when a UE performs RRC connection re-establishment (RRE), when performing handover, when there is no sensing information, etc.), and resource information for data transmission or reception for P2X service (between a mobile terminal and a vehicle or between a vehicle and a mobile terminal). The resource pool according to the disclosure may be configured differently depending on the range.

In operation 2b-15, the first terminal 2b-01 may initiate a unicast layer-2 link establishment process by transmitting a direct communication request message. The direct communication request message may include at least one of source user information (Source User Info) including the application layer ID of the first terminal 2b-01, target user information (Target User Info) including the application layer ID of the second terminal 2b-02, information about one or multiple V2X services (V2X Service Info, i.e., PSID(s) or ITS-AID(s)) requesting the establishment of a layer-2 link, an indicator of whether to use IP communication, IP address configuration information (IP Address Configuration), an indicator (or information) of whether each V2X service supports uni-directional communication or supports bi-directional communication, link local IPV6 address, and QoS information including information on one or multiple PC5 QoS flows (one PC5 QoS flow includes PFI and PC5 QoS parameters (e.g., ranges)). The direct communication request message may be transmitted through PC5 broadcast by using source layer-2 ID and destination layer-2 ID.

In operation 2b-20, when the received direct communication request message includes the target user information of the second terminal 2b-02 or when it is interested in the V2X service, the second terminal 2b-02 may transmit a direct communication accept message to the first terminal 2b-01. The direct communication accept message may include at least one of source user information including the Application Layer 2 ID of the second terminal 2b-02, QOS information including information on one or multiple PC5 QoS flows (one PC5 QoS flow includes PFI and PC5 QoS parameters requested by the terminal 2b-01), IP address configuration information (IP Address Configuration), and link local IPv6 Address.

In operation 2b-25, the first terminal 2b-01 may transmit a PC5-RRC message to the second terminal 2b-02. When two terminals desire to provide one or multiple V2X services through unicast communication, the PC5-RRC message may include resource pool configuration information corresponding to a range that needs to be supported in V2X service(s). The resource pool configuration information corresponding to a range may denote resource pool configuration information for each range value. For example, it may denote that resource pool-specific range may be configured. The resource pool configuration information may include at least one of the following pieces of information. The resource pool configuration information is not limited to the above example.

Resource pool identity corresponding to a range
Resource pool configuration information corresponding to a range
A range value
One or multiple zone IDs or zone configuration information
Physical layer parameters corresponding to range values (e.g., Tx/Rx parameters, MCS values)

In operation 2b-25, the first terminal 2b-01 may include, in the PC5-RRC message, resource pool configuration information corresponding to a plurality of ranges. Resource pool configuration information corresponding to a plurality of ranges may be configured for each resource. The resource pool configuration information may include at least one of the following pieces of information.

Resource pool identity corresponding to a range list
Resource pool configuration information corresponding to a range list
Multiple range values
One or multiple zone IDs or zone configuration information
Physical layer parameters corresponding to multiple range values (e.g., Tx/Rx parameters, MCS values) or physical layer parameters corresponding to each range value In operation 2b-30, the second terminal 2b-01 may transmit a PC5-RRC message to the first terminal 2b-01. The PC5-RRC message may include resource pool configuration information corresponding to range requirements that need to be supported in V2X service(s) when two terminals desire to provide one or multiple V2X services through unicast communication.

In operation 2b-35, a packet to be transmitted using NR V2X sidelink communication may be generated or arrived. The first terminal 2b-01 may be configured to obtain a packet to be transmitted using NR V2X sidelink communication, and to perform NR V2X sidelink communication. In addition, the first terminal 2b-01 may be configured to perform NR V2X sidelink communication at a specific frequency.

In operation 2b-40, the upper layer devices of the first terminal 2b-01 may configure PC5 QoS Profile(s) (e.g., PQI, PFI, or range) for a packet, and may transmit the packet and the PC5 QoS Profile(s) relating thereto to an access stratum (AS) layer device.

In operation 2b-45, the AS layer device of the first terminal 2b-01 may determine whether the sidelink bearer configuration information for the PC5 QoS Profile(s) for the packet received in operation 2b-35 is included in the SIBx received in operation 2b-10.

In operation 2b-50, when the sidelink bearer configuration information for the PC5 QoS Profile(s) for the packet received in operation 2b-35 is included in the SIBx received in operation 2b-10, the first terminal 2b-01 may establish an SLRB.

In operation 2b-55, the first terminal 2b-01 may transmit sidelink control information (SCI) and data in order to provide a unicast V2X service to another terminal 2b-02 through the SLRB established in operation 2b-50. The SCI may include a zone ID, an absolute position, speed, or the like.

In operation 2b-60, for example, the second terminal 2b-02 may determine whether the range requirement is satisfied based on the zone ID, the absolute position, or speed.

In operation 2b-65, when it is determined that the range requirement is not satisfied, the second terminal 2b-02 may transmit a PC5 MAC control element (CE) to the first terminal 2b-01. The PC5 MAC CE may denote an indicator indicating to change the resource pool configuration information. Alternatively, the PC5 MAC CE may indicate that the range requirement is not satisfied. Alternatively, the PC5 MAC CE may refer to requesting resource pool configuration information for which range requirements are supported (e.g., resource pool identity).

In operation 2b-70, the first terminal 2b-01 may apply the resource pool configuration information corresponding to a specific range(s) used when transmitting a packet to the second terminal 2b-02, and may include information relating thereto in the PC5-RRC message and transmit the same to the second terminal 2b-02.

According to an embodiment of the disclosure, in operation 2b-65, when determining that the range requirement is not satisfied, the second terminal 2b-02 may apply resource pool configuration information corresponding to a specific range(s), and may include information relating thereto in the PC5-RRC message and transmit the same to the first terminal 2b-01. Alternatively, the second terminal 2b-02 may transmit the PC5-RRC message to the first terminal 2b-01 in order to request resource pool configuration information corresponding to a specific range(s).

Figure 2C:
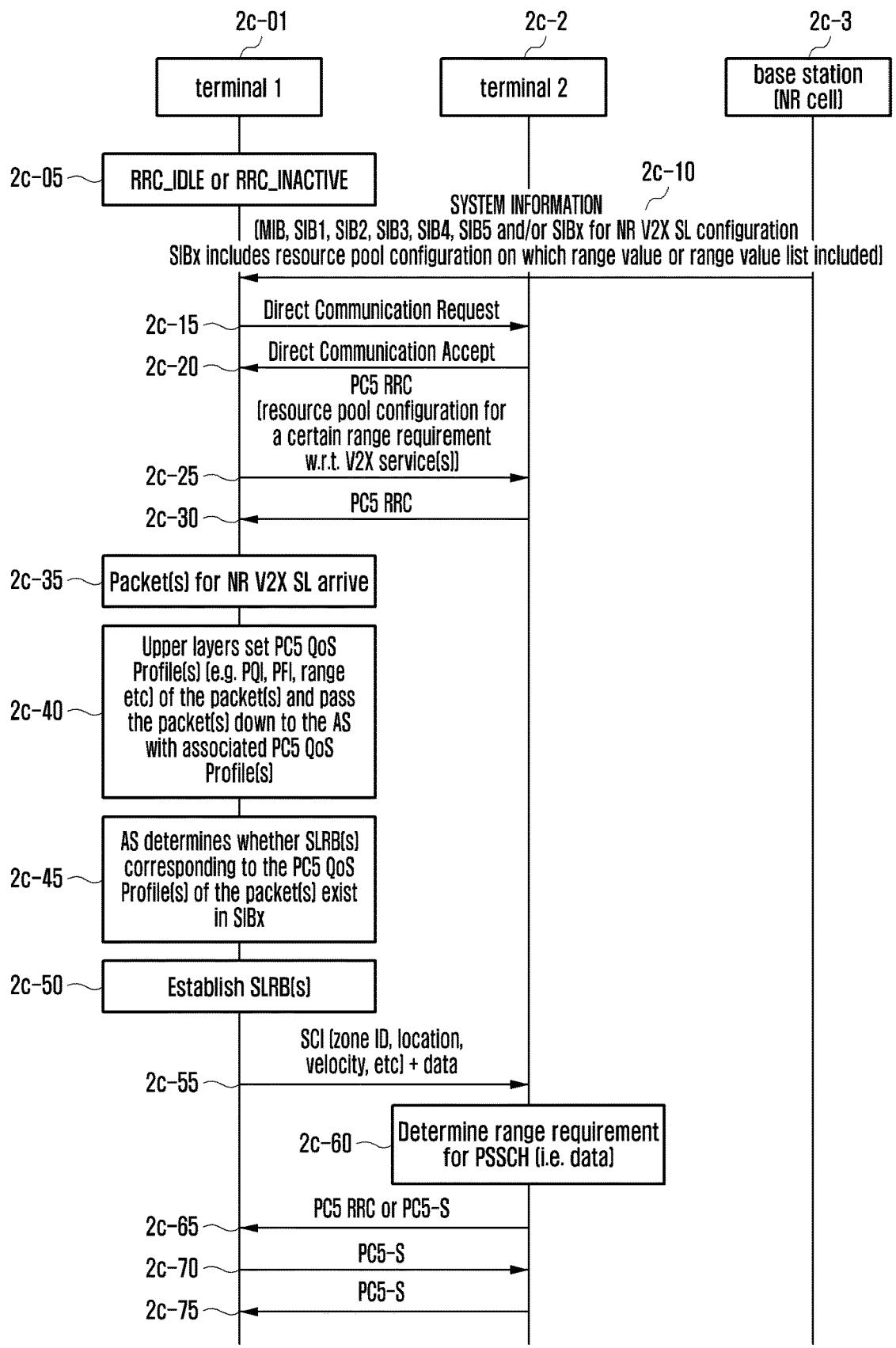
FIG. 2C illustrates operations of a terminal and a base station according to a range requirement when a terminal supporting NR V2X sidelink communication performs NR V2X unicast sidelink communication in an RRC idle mode (RRC_IDLE) or RRC inactive mode (RRC_INACTIVE) according to an embodiment of the disclosure.

FIG. 2C illustrates operations of a terminal and a base station according to a range requirement when a terminal supporting NR V2X sidelink communication performs NR V2X unicast sidelink communication in an RRC idle mode (RRC_IDLE) or RRC inactive mode (RRC_INACTIVE) according to an embodiment of the disclosure.

A terminal according to an embodiment of the disclosure may include a vehicle terminal or a pedestrian terminal. The terminal may support NR V2X sidelink communication. An NR base station according to an embodiment of the disclosure may provide signaling of system information related to NR V2X sidelink configuration information periodically or in an on-demand form.

Referring to FIG. 2C, a first terminal 2c-01 capable of performing NR V2X sidelink communication does not establish an RRC connection with a base station 2c-03, and thus the first terminal may be in an RRC idle mode (RRC_IDLE) or RRC inactive mode (RRC_INACTIVE) (indicated by reference numeral 2c-05).

The first terminal 2c-01 in the RRC idle mode or RRC inactive mode may find and camp on a suitable NR cell through a cell selection procedure or a cell reselection procedure to acquire system information (indicated by reference numeral 2c-10). As an example, the system information may denote MIB1, SIB1, SIB2, SIB3, SIB4, SIB5, or one or multiple SIBx defined/introduced for NR V2X sidelink communication and including NR V2X sidelink configuration information. According to an embodiment, the cell in which the first terminal 2c-01 camps-on may be referred to as a serving cell (hereinafter referred to as SCell) or a primary cell (hereinafter referred to as a PCell).

Specifically, in operation 2c-10, when SIB1 (SystemInformationBlockType1) received from the cell (Scell or PCell) indicates that the above-described SIBx exists through the system information scheduling information list (si-SchedulingInfo), the first terminal 2c-01 in the RRC idle mode or RRC inactive mode may acquire the SIBx. Alternatively, when the SIBx in a valid state has not been stored, the first terminal 2c-01 may acquire the SIBx.

When the base station 2c-03 broadcasts SIBx, SIBx may optionally include sl-V2X-ConfigCommon. sl-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-pssch-TxConfigList, v2x-packetDuplicationConfig, syncFreqList, slss-TxMultiFreq, v2x-FreqSelectionConfigList, and threshS-RSSI-CBR.

Additionally, SIBx may include sidelink radio bearer (hereinafter SLRB) configuration information for PC5 QOS Profiles. For example, sidelink bearer configuration information for one or multiple PC5 QOS Profiles may include mapping information for one SLRB and/or PDCP/RLC/LCH configuration information. The sidelink bearer configuration information is not limited to the above example, or the sidelink bearer configuration information for one PC5 QoS Profile may include mapping information for one or multiple SLRBs and/or PDCP/RLC/LCH configuration information.

The aforementioned PC5 QoS Profile may denote at least one of PC5 QoS parameters/characteristics such as PFI, range (units of meters) and/or required data rate, and/or PQI (See Table 2 below). The range may denote a maximum range value that needs to be supported in a specific V2X service.

TABLE 2

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 1 | GBR (NOTE 1) | 3 | 20 ms | $10^{-4}$ | N/A | 2000 ms | Platooning between UEs - Higher degree of automation; platooning between UE and RSU - Higher degree of automation |
| 2 | | 4 | 50 ms | $10^{-2}$ | N/A | 2000 ms | Sensor sharing - higher degree of automation |
| 3 | | 3 | 100 ms | $10^{-4}$ | N/A | 2000 ms | Information sharing for automated driving between UEs or UE and RSU - higher degree of automation |
| 55 | Non-GBR | 3 | 10 ms | $10^{-4}$ | N/A | N/A | Cooperative lane change - higher degree of automation |
| 56 | | 6 | 20 ms | $10^{-1}$ | N/A | N/A | Platooning informative exchange - low degree of automation; Platooning information sharing with RSU |
| 57 | | 5 | 25 ms | $10^{-1}$ | N/A | N/A | Cooperative lane change - lower degree of automation |
| 58 | | 4 | 100 ms | $10^{-2}$ | N/A | N/A | Sensor information sharing - lower degree of automation |
| 59 | | 6 | 500 ms | $10^{-1}$ | N/A | N/A | Platooning reporting to an RSU |
| 82 | Delay Critical GBR (NOTE 1) | 3 | 10 ms | $10^{-4}$ | 2000 bytes | 2000 ms | Cooperative collision avoidance; Sensor sharing - Higher degree of automation; Video sharing - higher degree of automation |
| 83 | | 2 | 3 ms | $10^{-5}$ | 2000 byte | 2000 ms | Emergency trajectory alignment; Sensor sharing - Higher degree of automation |

Alternatively, in operation 2c-10, when the base station 2c-03 broadcasts SIBx to the first terminal 2c-01, the SIBx may include a range value for each resource pool (e.g., SL-Range in each resource pool). In addition, according to an embodiment of the disclosure, each resource pool may include one value among a plurality of range values. One value may denote a distance range (e.g., 100 meters or 200 meters) that needs to be supported in a particular V2X service or the range of distance ranges (e.g., [0, 100 meters] or [101, 200 meters]). Alternatively, in operation 2c-10, when the base station 2c-03 broadcasts SIBx to the first terminal 2c-01, the SIBx may include a list of range values for each resource pool (e.g., SL-Rangelist in each resource pool). According to an embodiment of the disclosure, each resource pool may include a plurality of values among a plurality of range values.

In operation 2c-15, the first terminal 2c-01 may initiate a unicast layer-2 link establishment process by transmitting a direct communication request message. The direct communication request message may include at least one of source user information (Source User Info) including the application layer ID of the first terminal 2c-01, target user information (Target User Info) including the application layer ID of the second terminal 2c-02, information about one or multiple V2X services (V2X Service Info, i.e., PSID(s) or ITS-AID(s)) requesting the establishment of a layer-2 link, an indicator of whether to use IP communication, IP address configuration information (IP Address Configuration), an indicator (or information) of whether each V2X service supports uni-directional communication or supports bi-directional communication, link local IPV6 address, and QoS information including information on one or multiple PC5 QoS flows (one PC5 QoS flow includes PFI and PC5 QoS parameters (e.g., ranges)). The direct communication request message may be transmitted through PC5 broadcast by using source layer-2 ID and destination layer-2 ID.

In operation 2c-20, when the received direct communication request message includes the target user information of the second terminal 2c-02 or when it is interested in the V2X service, the second terminal 2c-02 may transmit a direct communication accept message to the first terminal 2c-01. The direct communication accept message may include at least one of source user information including the Application Layer 2 ID of the second terminal 2c-02, QoS information including information on one or multiple PC5 QoS flows (one PC5 QoS flow includes PFI and PC5 QoS parameters requested by the first terminal 2c-01), IP address configuration information (IP Address Configuration), and link local IPV6 Address.

In operation 2c-25, the first terminal 2c-01 may transmit a PC5-RRC message to the second terminal 2c-02. When two terminals desire to provide one or multiple V2X services through unicast communication, the PC5-RRC message may include resource pool configuration information corresponding to a range that needs to be supported in V2X service(s). The resource pool configuration information corresponding to a range may denote resource pool configuration information for each range value. For example, it may denote that resource pool-specific range may be configured. The resource pool configuration information may include at least one of the following pieces of information. The resource pool configuration information is not limited to the above example.

Resource pool identity corresponding to a range
    Resource pool configuration information corresponding to a range
    A range value
    One or multiple zone IDs or zone configuration information
    Physical layer parameters corresponding to range values (e.g., Tx/Rx parameters, MCS values)

In operation 2c-25, the first terminal 2c-01 may include, in the PC5-RRC message, resource pool configuration information corresponding to a plurality of ranges. Resource pool configuration information corresponding to a plurality of ranges may be configured for each resource. The resource pool configuration information may include at least one of the following pieces of information.

Resource pool identity corresponding to a range list
    Resource pool configuration information corresponding to a range list
    Multiple range values
    One or multiple zone IDs or zone configuration information
    Physical layer parameters corresponding to multiple range values (e.g., Tx/Rx parameters, MCS values) or physical layer parameters corresponding to each range value In operation 2c-30, the second terminal 2c-01 may transmit a PC5-RRC message to the first terminal 2c-01. The PC5-RRC message may include resource pool configuration information corresponding to range requirements that need to be supported in V2X service(s) when two terminals desire to provide one or multiple V2X services through unicast communication.

In operation 2c-35, a packet to be transmitted using NR V2X sidelink communication may be generated or arrived. The first terminal 2c-01 may be configured to obtain a packet to be transmitted using NR V2X sidelink communication, and to perform NR V2X sidelink communication. In addition, the first terminal 2c-01 may be configured to perform NR V2X sidelink communication at a specific frequency.

In operation 2c-40, the upper layer devices may configure PC5 QoS Profile(s) (e.g., PQI, PFI, or range) for a packet, and may transmit the packet and the PC5 QoS Profile(s) relating thereto to an AS layer device.

In operation 2c-45, the AS layer device may determine whether the sidelink bearer configuration information for the PC5 QoS Profile(s) for the packet received in operation 2c-35 is included in the SIBx received in operation 2c-10.

In operation 2c-50, when the sidelink bearer configuration information for the PC5 QoS Profile(s) for the packet received in operation 2c-35 is included in the SIBx received in operation 2c-10, an SLRB may be established.

In operation 2c-55, the first terminal 2c-01 may transmit SCI and data in order to provide a unicast V2X service to the second terminal 2c-02 through the SLRB established in operation 2c-50. The SCI may include a zone ID, an absolute position, speed, or the like.

In operation 2c-60, the second terminal 2c-02 may determine whether (max or min) range requirement is satisfied. For example, the second terminal 2c-02 may determine whether (max or min) range requirement is satisfied based on the zone ID, the absolute position, or speed.

In operation 2c-65, when it is determined that the range requirement is not satisfied, the second terminal 2c-02 may transmit a PC5-RRC message to the first terminal 2c-01. The PC5-RRC message may be a message indicating releasing the connection because range requirements for one or multiple V2X services are not satisfied. As an example, the PC5-RRC message may denote a PC5-RRC Release message. The PC5-RRC Release message may include a reason for releasing the connection. Upon receiving the PC5-RRC Release message, the terminal 2c-01 may automatically release a layer-2 unicast link and inform the upper layer device or the V2X layer device that the layer-2 unicast link is released.

Alternatively, in operation 2c-70, the first terminal 2c-01 may transmit a PC5-S message to the second terminal 2c-02 to release the layer-2 unicast link. As an example, the PC5-S message may be a disconnect request message. In operation 2c-75, the second terminal 2c-02 may transmit the PC5-S message to the first terminal 2c-01 in response to operation 2c-70. For example, the PC5-S message transmitted in response to operation 2c-70 may be a disconnect response message. Upon receiving the disconnect response message, the first terminal 2c-01 may inform the AS layer device that the layer-2 unicast link is released.

Alternatively, in operation 2c-65, when the second terminal 2c-02 determines that the range requirement is not satisfied, the AS layer device of the second terminal 2c-02 may inform an upper layer device or V2X layer device to release the layer-2 unicast link. In addition, the second terminal 2c-02 may transmit the PC5-S message to the first terminal 2c-01. The PC5-S message is a message for releasing the layer-2 unicast link and may be a disconnect request message. Upon receiving the disconnect request message, the first terminal 2c-01 may transmit a PC5-S message to the other second terminal 2c-02 in response thereto in operation 2c-70. As an example, the PC5-S message may be a disconnect response message. Upon receiving the disconnect response message, the second terminal 2c-02 may automatically release the layer-2 unicast link and inform the upper layer device or the V2X layer device that the layer-2 unicast link is released.

Figure 2D:
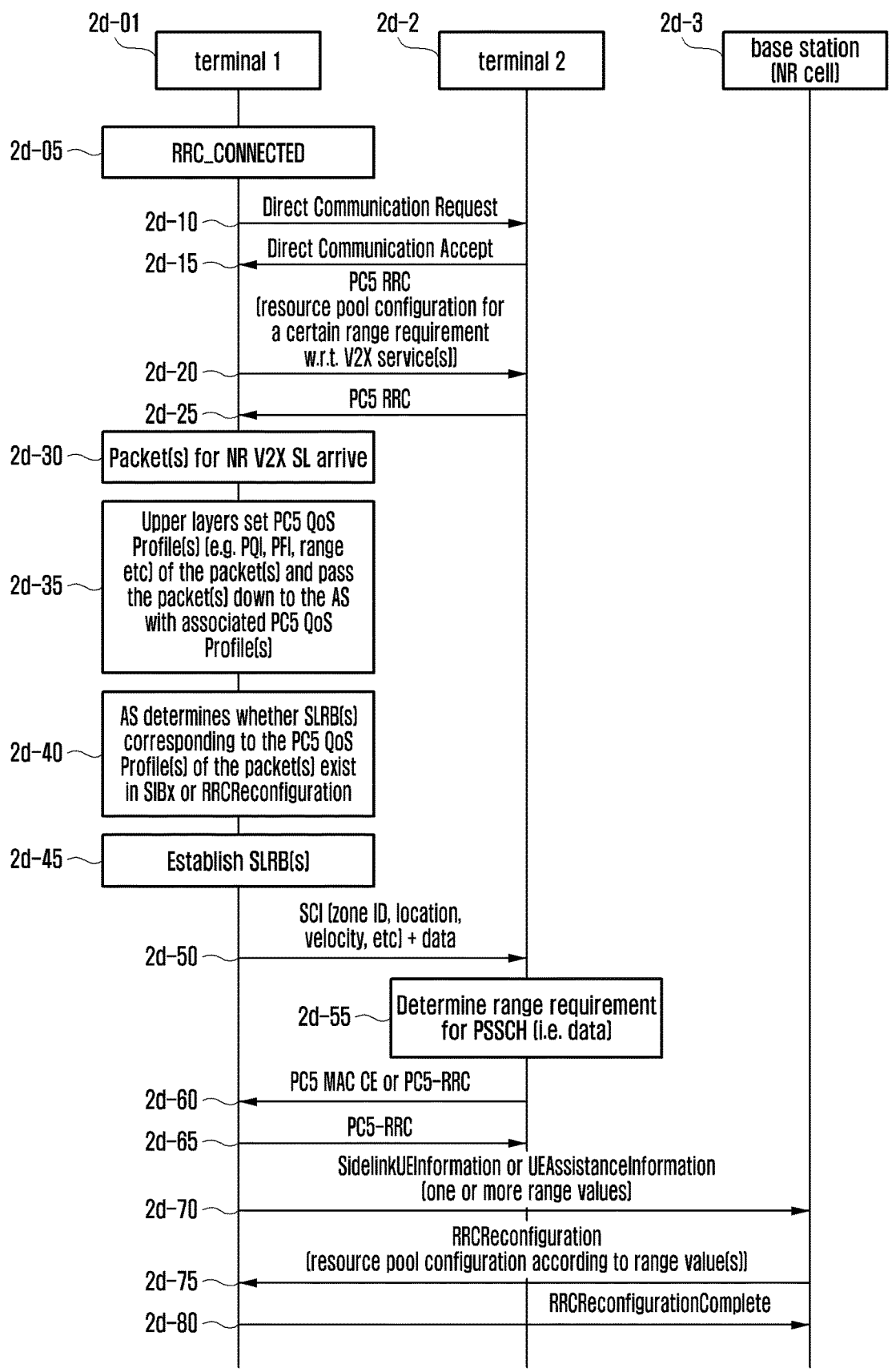
FIG. 2D illustrates operations of a terminal and a base station according to a range requirement when a terminal supporting NR V2X sidelink communication performs NR V2X unicast sidelink communication in an RRC connected mode (RRC_CONNECTED) according to an embodiment of the disclosure.

FIG. 2D illustrates operations of a terminal and a base station according to a range requirement when a terminal supporting NR V2X sidelink communication performs NR V2X unicast sidelink communication in an RRC connected mode (RRC_CONNECTED) according to an embodiment of the disclosure.

Referring to FIG. 2D, a first terminal 2d-01 capable of performing NR V2X sidelink communication establishes an RRC connection with a base station 2d-03, and thus the first terminal may be in an RRC connected mode (RRC_CONNECTED) (indicated by reference numeral 2d-05).

A second terminal 2d-02 capable of performing NR V2X sidelink communication establishes an RRC connection with a base station 2d-03, and thus the second terminal may be in an RRC connected mode (RRC_CONNECTED) (indicated by reference numeral 2d-05).

In operation 2d-10, the first terminal 2d-01 may initiate a unicast layer-2 link establishment process by transmitting a direct communication request message. The direct communication request message may include at least one of source user information (Source User Info) including the application layer ID of the first terminal 2d-01, target user information (Target User Info) including the application layer ID of the second terminal 2d-02, information about one or a plurality of V2X services (V2X Service Info, i.e., PSID(s) or ITS-AID(s)) requesting the establishment of a layer-2 link, an indicator of whether to use IP communication, IP address configuration information (IP Address Configuration), link local IPV6 address, and QoS information including information on one or multiple PC5 QoS flows (one PC5 QoS flow includes PFI and PC5 QoS parameters (e.g., ranges)). The direct communication request message may be transmitted through PC5 broadcast by using source layer-2 ID and destination layer-2 ID.

In operation 2d-15, when the received direct communication request message includes the target user information of the second terminal 2d-02 or when it is interested in the V2X service, the second terminal 2d-02 may transmit a direct communication accept message to the first terminal 2d-01. The direct communication accept message may include at least one of source user information including the Application Layer 2 ID of the second terminal 2d-02, QoS information including information on one or multiple PC5 QOS flows (one PC5 QoS flow includes PFI and PC5 QoS parameters requested by the first terminal 2d-01), IP address configuration information (IP Address Configuration), an indicator (or information) of whether each V2X service supports uni-directional communication or supports bi-directional communication, and link local IPV6 Address.

In operation 2d-20, the first terminal 2d-01 may transmit a PC5-RRC message to the second terminal 2d-02. When two terminals desire to provide one or multiple V2X services through unicast communication, the PC5-RRC message may include resource pool configuration information corresponding to a range that needs to be supported in V2X service(s). The resource pool configuration information corresponding to a range may denote resource pool configuration information for each range value. For example, it may denote that resource pool-specific range may be configured. The resource pool configuration information may include at least one of the following pieces of information.

Resource pool identity corresponding to a range
Resource pool configuration information corresponding to a range
A range value
One or multiple zone IDs or zone configuration information
Physical layer parameters corresponding to range values (e.g., Tx/Rx parameters, MCS values)

In operation 2d-20, the first terminal 2d-01 may include, in the PC5-RRC message, resource pool configuration information corresponding to a plurality of ranges. Resource pool configuration information corresponding to a plurality of ranges may be configured for each resource. The resource pool configuration information may include at least one of the following pieces of information.

Resource pool identity corresponding to a range list
Resource pool configuration information corresponding to a range list
Multiple range values
One or multiple zone IDs or zone configuration information
Physical layer parameters corresponding to multiple range values (e.g., Tx/Rx parameters, MCS values) or physical layer parameters corresponding to each range value In operation 2d-25, the second terminal 2d-02 may transmit a PC5-RRC message to the first terminal 2d-01. The PC5-RRC message may include resource pool configuration information corresponding to range requirements that need to be supported in V2X services when two terminals desire to provide one or multiple V2X services through unicast communication.

In operation 2d-30, a packet to be transmitted using NR V2X sidelink communication may be generated or arrived. The first terminal 2d-01 may be configured to obtain a packet to be transmitted using NR V2X sidelink communication, and to perform NR V2X sidelink communication. In addition, the first terminal 2d-01 may be configured to perform NR V2X sidelink communication at a specific frequency.

In operation 2d-35, the upper layer devices may configure PC5 QoS Profile(s) (e.g., PQI, PFI, or range) for a packet, and may transmit the packet and the PC5 QoS Profile(s) relating thereto to an AS layer device.

In operation 2*d*-40, the AS layer device may determine whether the sidelink bearer configuration information for the PC5 QoS Profile(s) for the packet received in operation 2*d*-30 is included in the SIBx or RRCReconfiguration message provided from the base station.

In operation 2*d*-45, the first terminal 2*d*-01 may establish an SLRB according to the sidelink bearer configuration information for the PC5 QoS Profile(s) for the packet received in operation 2*d*-40.

In operation 2*d*-50, the first terminal 2*d*-01 may transmit SCI and data in order to provide a unicast V2X service to another terminal 2*d*-02 through the SLRB established in operation 2*d*-45. The SCI may include a zone ID, an absolute position, speed, or the like.

In operation 2*d*-55, the second terminal 2*d*-02 may determine whether the (max or min) range requirement is satisfied. For example, the second terminal 2*d*-02 may determine whether the (max or min) range requirement is satisfied based on the zone ID, the absolute position, or speed.

In operation 2*d*-60, when it is determined that the range requirement is not satisfied, the second terminal 2*d*-02 may transmit a PCT MAC CE or PC5-RRC message to the first terminal 2*d*-01. The use of the PCT MAC CE or PC5-RRC message may follow the above-described embodiment (2*b*).

In operation 2*d*-65, in response to the PC5 RRC message, the first terminal 2*d*-01 may transmit the PC5 RRC message to the second terminal 2*d*-02.

Upon receiving the PC5 MAC CE, in operation 2*d*-70, the first terminal 2*d*-01 may transmit a SidelinkUEInformation message to the base station 2*d*-03 in order to receive (re) configuration of resource pool configuration information corresponding to the range requirement. The SidelinkUEInformation message may include at least one of the following pieces of information.

When it is configured to transmit P2X-related V2X sidelink communication from an upper layer device, p2x-CommTxType may be configured to be "TRUE" and included in the SidelinkUEInformation message.

v2x-CommTxResourceReq may be included in the SidelinkUEInformation message. The fields of v2x-CommTxResourceReq may be configured for each frequency, at which the UE is configured to perform V2X sidelink communication transmission from an upper layer, according to the following method.

The UE may indicate a frequency for V2X sidelink communication transmission to carrierFreqCommTx (set carrierFreqCommTx to indicate the frequency for V2X sidelink communication transmission). Specifically, carrierFreqCommTx may be configured in the following manner.

A value of "0" may denote the frequency of PCell.

The value of "k (k>=1)" may denote a frequency in the first entry of v2x-InterFreqInfoList included in SIBx.

The UE may set v2x-TypeTxSync to the current synchronization reference type used on the associated carrierFreqCommTx for V2X sidelink communication transmission The UE may include V2X sidelink communication transmission destination information in order to receive allocation of a dedicated resource to the base station. For example, the destination information may include a destination layer 2 ID or a transmission type (unicast, groupcast, or broadcast) used for the destination layer 2 ID.

One or multiple range values.

In operation 2*d*-75, the base station 2*d*-03 may transmit, to the first terminal 2*d*-01, an RRCReconfiguration message in order to (re) configure the resource pool configuration information based on the information included in the received SidelinkUEInformation message. As an example, the RRCReconfiguration message may include resource pool configuration information according to one or multiple range values included in the SidelinkUEInformation message.

In operation 2*d*-80, the first terminal 2*d*-01 may transmit an RRCReconfigurationComplete message to the base station 2*d*-03.

After operation 2*d*-75, the first terminal 2*d*-01 may transmit some of the information included in the RRCReconfiguration message to the second terminal 2*d*-02. For example, the PC5 RRC message may include some pieces of information among the information included in the RRCReconfiguration message.

In operation 2*d*-70, the first terminal 2*d*-01 may transmit a UEAssistanceInformation message to the base station 2*d*-03. The UEAssistanceInformation message may include one or multiple range values for each traffic or service.

Figure 2E:
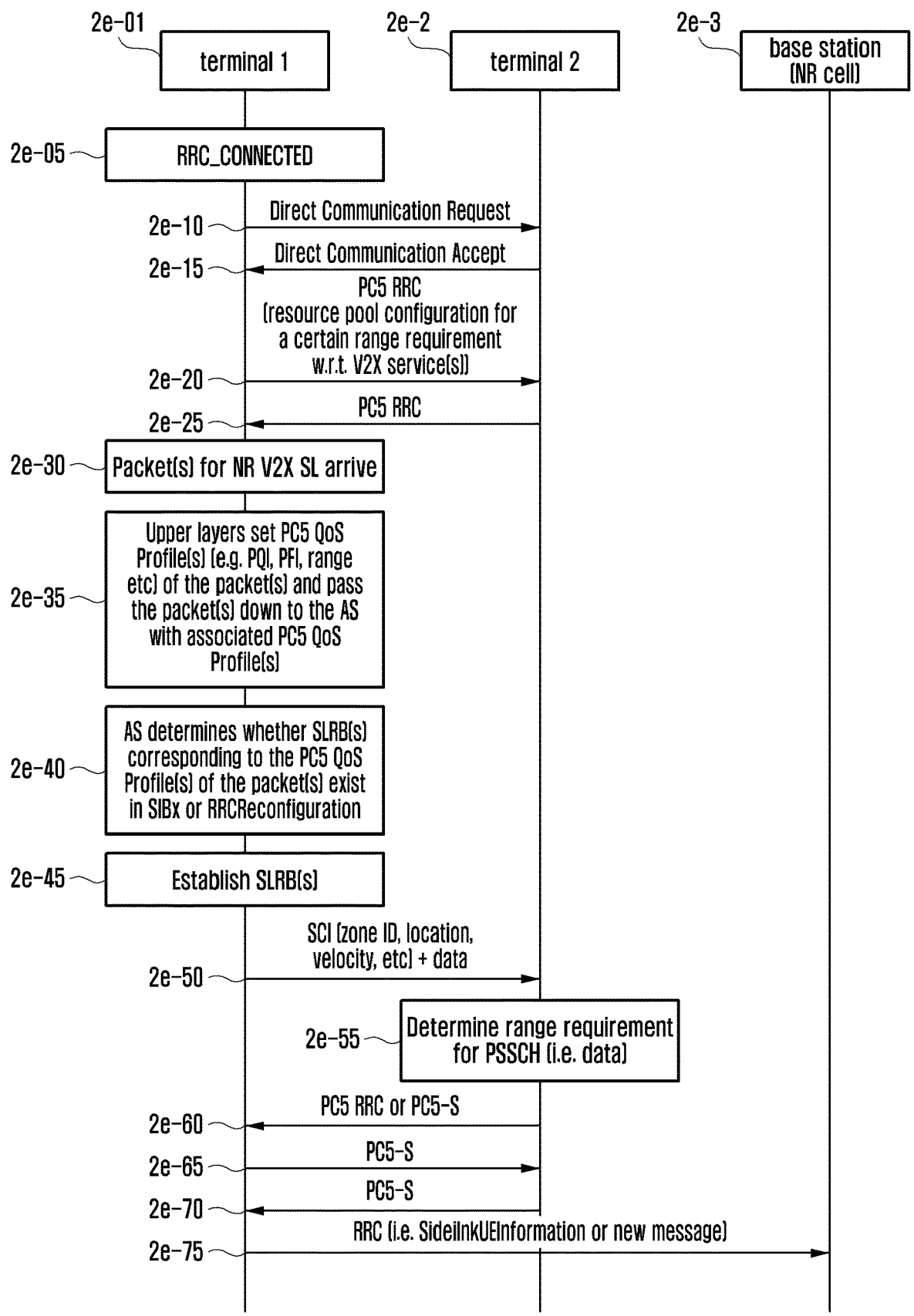
FIG. 2E illustrates operations of a terminal and a base station according to a range requirement when a terminal supporting NR V2X sidelink communication performs NR V2X unicast sidelink communication in an RRC connected mode (RRC_CONNECTED) according to an embodiment of the disclosure.

FIG. 2E illustrates operations of a terminal and a base station according to a range requirement when a terminal supporting NR V2X sidelink communication performs NR V2X unicast sidelink communication in an RRC connected mode (RRC_CONNECTED) according to an embodiment of the disclosure.

Referring to FIG. 2E, a first terminal 2*e*-01 capable of performing NR V2X sidelink communication establishes an RRC connection with a base station 2*e*-03, and thus the first terminal may be in an RRC connected mode (RRC_CONNECTED) (indicated by reference numeral 2*e*-05).

A second terminal 2*e*-02 capable of performing NR V2X sidelink communication establishes an RRC connection with the base station 2*e*-03, and thus the second terminal may be in an RRC connected mode (RRC_CONNECTED) (indicated by reference numeral 2*e*-06).

In operation 2*e*-10, the first terminal 2*e*-01 may initiate a unicast layer-2 link establishment process by transmitting a direct communication request message. The direct communication request message may include at least one of source user information (Source User Info) including the application layer ID of the first terminal 2*e*-01, target user information (Target User Info) including the application layer ID of the second terminal 2*e*-02, information about one or a plurality of V2X services (V2X Service Info, i.e., PSID(s) or ITS-AID(s)) requesting the establishment of a layer-2 link, an indicator of whether to use IP communication, IP address configuration information (IP Address Configuration), link local IPV6 address, and QoS information including information on one or multiple PC5 QoS flows (one PC5 QoS flow includes PFI and PC5 QoS parameters (e.g., ranges)). The direct communication request message may be transmitted through PC5 broadcast by using source layer-2 ID and destination layer-2 ID.

In operation 2*e*-15, when the received direct communication request message includes the target user information of the second terminal 2*e*-02 or when it is interested in the V2X service, the second terminal 2*e*-02 may transmit a direct communication accept message to the first terminal 2*e*-01. The direct communication accept message may include at least one of source user information including the Application Layer 2 ID of the another terminal 2*e*-02, QoS information including information on one or multiple PC5 QoS flows (one PC5 QoS flow includes PFI and PC5 QoS parameters requested by the first terminal 2e-01), IP address configuration information (IP Address Configuration), an indicator (or information) of whether each V2X service supports uni-directional communication or supports bi-directional communication, and link local IPV6 Address.

In operation 2e-20, the first terminal 2e-01 may transmit a PC5-RRC message to the second terminal 2e-02. When two terminals desire to provide one or multiple V2X services through unicast communication, the PC5-RRC message may include resource pool configuration information corresponding to a range that needs to be supported in V2X service(s). The resource pool configuration information corresponding to a range may denote resource pool configuration information for each range value. For example, it may denote that resource pool-specific range may be configured. The resource pool configuration information may include at least one of the following pieces of information.

Resource pool identity corresponding to a range
Resource pool configuration information corresponding to a range
A range value
One or multiple zone IDs or zone configuration information
Physical layer parameters corresponding to range values (e.g., Tx/Rx parameters, MCS values)

In operation 2e-20, the first terminal 2e-01 may include, in the PC5-RRC message, resource pool configuration information corresponding to a plurality of ranges. Resource pool configuration information corresponding to a plurality of ranges may be configured for each resource. The resource pool configuration information may include at least one of the following pieces of information.

Resource pool identity corresponding to a range list
Resource pool configuration information corresponding to a range list
Multiple range values
One or multiple zone IDs or zone configuration information
Physical layer parameters corresponding to multiple range values (e.g., Tx/Rx parameters, MCS values) or physical layer parameters corresponding to each range value In operation 2e-25, the second terminal 2e-01 may transmit a PC5-RRC message to the first terminal 2e-01. The PC5-RRC message may include resource pool configuration information corresponding to range requirements that need to be supported in V2X service(s) when two terminals desire to provide one or multiple V2X services through unicast communication.

In operation 2e-30, a packet to be transmitted using NR V2X sidelink communication may be generated or arrived. The first terminal 2e-01 may be configured to obtain a packet to be transmitted using NR V2X sidelink communication, and to perform NR V2X sidelink communication. In addition, the first terminal 2e-01 may be configured to perform NR V2X sidelink communication at a specific frequency.

In operation 2e-35, the upper layer devices of the first terminal 2e-01 may configure PC5 QoS Profile(s) (e.g., PQI, PFI, or range) for a packet, and may transmit the packet and the PC5 QoS Profile(s) relating thereto to an AS layer device.

In operation 2e-40, the AS layer device of the first terminal 2e-01 may determine whether the sidelink bearer configuration information for the PC5 QoS Profile(s) for the packet received in operation 2e-30 is included in the SIBx or RRCReconfiguration message provided from the base station.

In operation 2e-45, the first terminal 2e-01 may establish an SLRB according to the sidelink bearer configuration information for the PC5 QoS Profile(s) for the packet received in operation 2e-40.

In operation 2e-50, the first terminal 2e-01 may transmit SCI and data in order to provide a unicast V2X service to the second terminal 2e-02 through the SLRB established in operation 2e-45. The SCI may include a zone ID, an absolute position, speed, or the like.

In operation 2e-55, the second terminal 2e-02 may determine whether a range requirement is satisfied. For example, the second terminal may determine whether the range requirement is satisfied based on the zone ID, the absolute position, or speed.

In operation 2e-60, when it is determined that the range requirement is not satisfied, the second terminal 2e-02 may transmit a PC5-RRC message to the first terminal 2e-01. The PC5-RRC message may be a message indicating releasing the connection because range requirements for one or multiple V2X services are not satisfied. As an example, the PC5-RRC message may denote a PC5-RRC Release message. The PC5-RRC Release message may include a reason for releasing the connection. Upon receiving the PC5-RRC Release message, the first terminal 2e-01 may automatically release a layer-2 unicast link and inform the upper layer device or the V2X layer device that the layer-2 unicast link is released. Alternatively, in operation 2e-65, the first terminal 2e-01 may transmit a PC5-S message to the second terminal 2e-02 to release the layer-2 unicast link. As an example, the PC5-S message may be a disconnect request message. In operation 2e-70, the second terminal 2e-02 may transmit the PC5-S message to the first terminal 2e-01 in response to operation 2e-65. For example, the PC5-S message transmitted in response to operation 2e-65 may be a disconnect response message. Upon receiving the disconnect response message, the first terminal 2e-01 may inform the AS layer device that the layer-2 unicast link is released.

Alternatively, in operation 2e-60, when the second terminal 2e-02 determines that the range requirement is not satisfied, the AS layer device of the second terminal 2e-02 may inform an upper layer device or V2X layer device to release the layer-2 unicast link. In addition, the second terminal 2e-02 may transmit the PC5-S message to the first terminal 2e-01. The PC5-S message is a message for releasing the layer-2 unicast link and may be a disconnect request message. Upon receiving the disconnect request message, the first terminal 2e-01 may transmit a PC5-S message to the other second terminal 2e-02 in response thereto in operation 2e-65. As an example, it may be a disconnect response message. Upon receiving the disconnect response message, the second terminal 2e-02 may automatically release the layer-2 unicast link and inform the upper layer device or the V2X layer device that the layer-2 unicast link is released.

In operation 2e-75, the first terminal 2d-01 may inform the base station 2d-03 that the unicast link with the second terminal 2d-02 is released. Here, the terminal may operate in a scheduled mode (mode 1) in connection with the base station. For example, the first terminal 2d-01 may determine that a range requirement is not satisfied and thus, with regard to one or multiple frequencies that are no longer interested in V2X sidelink communication transmission, the first terminal may transmit SidelinkUEInformation message to the base station 2d-03 without including the same in v2x-CommTxResourceReq. Alternatively, the first terminal may report to the base station 2*d*-03 that the unicast link is released, by introducing a new RRC message. Here, it may be understood as that the unicast link corresponding to a specific SLRB(s) is released.

Figure 2F:
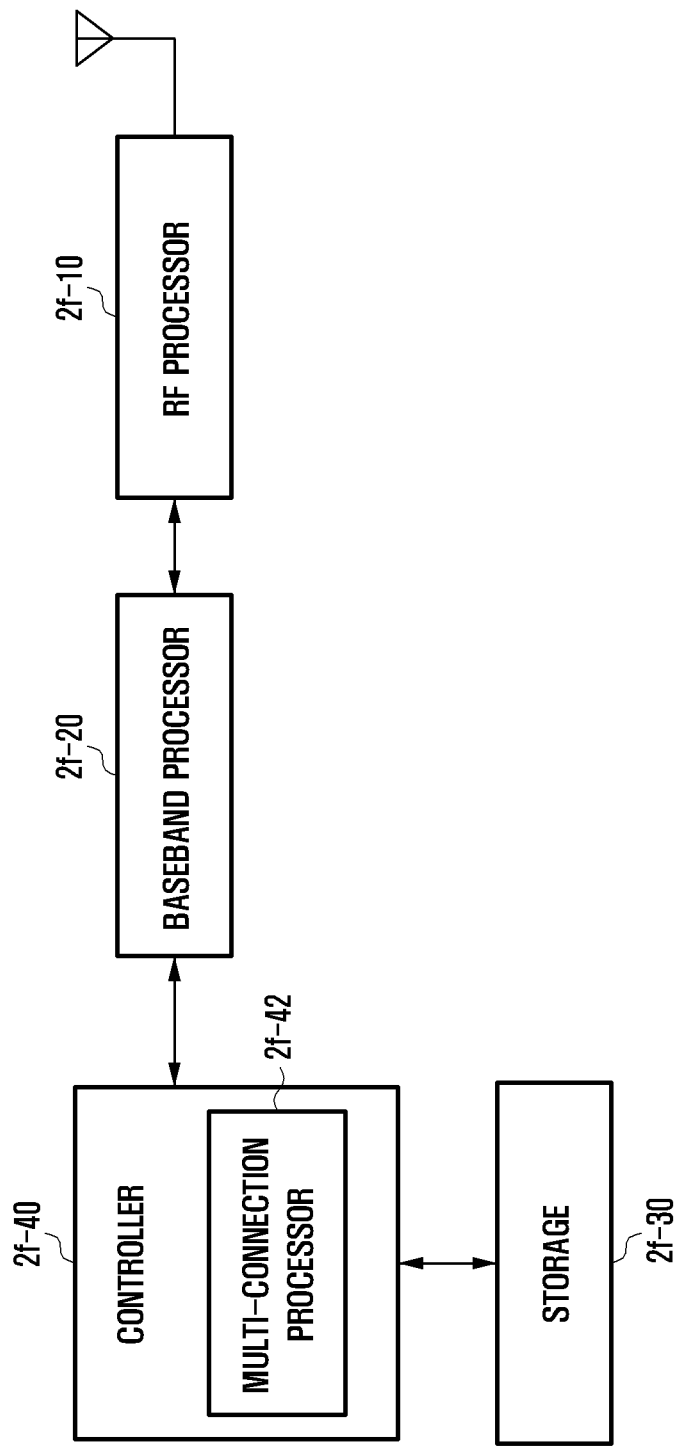
FIG. 2F illustrates the structure of a UE according to an embodiment of the disclosure.

FIG. 2F illustrates the structure of a UE according to an embodiment of the disclosure.

The UE may include a radio frequency (RF) processor 2*f*-10, a baseband processor 2*f*-20, a storage 2*f*-30, and a controller 2*f*-40. The UE is not limited to the above example, and the UE may include fewer or more elements than that shown in FIG. 2F.

The RF processor 2*f*-10 according to an embodiment of the disclosure may perform a function of transmitting and receiving a signal through a radio channel, such as band conversion and amplification of a signal. That is, the RF processor 2*f*-10 may up-convert a baseband signal provided from the baseband processor 2*f*-20 to an RF band signal to thus transmit the same through an antenna, and may down-convert an RF band signal received through the antenna to a baseband signal. For example, the RF processor 2*f*-10 may include a transmission filter, a reception filter, an amplifier, a mixer, an oscillator, a digital-to-analog converter (DAC), an analog-to-digital converter (ADC), and the like.

Although only one antenna is illustrated in FIG. 2F, the UE may have a plurality of antennas.

In addition, the RF processor 2*f*-10 may include a plurality of RF chains. Further, the RF processor 2*f*-10 may perform beamforming. To perform beamforming, the RF processor 2*f*-10 may adjust the phases and magnitudes of signals transmitted and received through a plurality of antennas or antenna elements. In addition, the RF processor 2*f*-10 may perform MIMO, and may receive multiple layers when performing the MIMO operation. The RF processor 2*f*-10 may perform reception beam sweeping by appropriately configuring multiple antennas or antenna elements under the control of the controller 2*f*-40, or may adjust the direction and beam width of the reception beam so that the reception beam is coordinated with the transmission beam. In addition, the RF processor 2*f*-10 may perform MIMO, and may receive multiple layers when performing the MIMO operation.

The baseband processor 2*f*-20 may perform a function of conversion between a baseband signal and a bit string according to the physical layer specification of the system. For example, in a case of data transmission, the baseband processor 2*f*-20 encodes and modulates transmission bit strings, thereby generating complex symbols. In addition, upon receiving data, the baseband processor 2*f*-20 may demodulate and decode a baseband signal provided from the RF processor 2*f*-10 to thus recover reception bit strings. For example, in a case where an orthogonal frequency division multiplexing (OFDM) scheme is applied, when transmitting data, the baseband processor 2*f*-20 may generate complex symbols by encoding and modulating transmission bit strings, map the complex symbols to subcarriers, and then configure OFDM symbols through an inverse fast Fourier transform (IFFT) operation and cyclic prefix (CP) insertion. In addition, when receiving data, the baseband processor 2*f*-20 may divide the baseband signal provided from the RF processor 2*f*-10 into OFDM symbol units, restore the signals mapped to the subcarriers through a fast Fourier transform (FFT) operation, and then restore reception bit strings through demodulation and decoding.

The baseband processor 2*f*-20 and the RF processor 2*f*-10 may transmit or receive signals as described above. Accordingly, the baseband processor 2*f*-20 and the RF processor 2*f*-10 may be referred to as a "transmitter", a "receiver", a "transceiver", or a "communication unit". Further, at least one of the baseband processor 2*f*-20 and the RF processor 2*f*-10 may include a plurality of communication modules in order to support a plurality of different radio access techniques. In addition, at least one of the baseband processor 2*f*-20 and the RF processor 2*f*-10 may include different communication modules to process signals in different frequency bands. For example, the different radio access techniques may include an LTE network, an NR network, and the like. In addition, the different frequency bands may include super-high frequency (SHF) (e.g., 2.2 GHz or 2 Ghz) bands or millimeter wave (e.g., 60 GHz) bands. The UE may transmit/receive signals to or from the base station using the baseband processor 2*f*-20 and the RF processor 2*f*-10, and the signal may include control information and data.

The storage 2*f*-30 may store data such as fundamental programs, application programs, and configuration information for the operation of the UE. The storage 2*f*-30 may provide the stored data in response to a request from the controller 2*f*-40. The storage 2*f*-30 may include a storage medium such as a ROM, a RAM, a hard disk, a CD-ROM, and a DVD, or a combination of storage media. In addition, the storage 2*f*-30 may include a plurality of memories. According to an embodiment, the storage 2*f*-30 may store a program for performing the above-described method for providing vehicle communication.

The controller 2*f*-40 may control the overall operation of the UE. For example, the controller 2*f*-40 transmits and receives signals through the baseband processor 2*f*-20 and the RF processor 2*f*-10. In addition, the controller 2*f*-40 records and reads data in and from the storage 2*f*-30. To this end, the controller 2*f*-40 may include at least one processor. For example, the controller 2*f*-40 may include a communication processor (CP) for controlling communication and an application processor (AP) for controlling upper layers such as application programs. Further, at least one configuration in the UE may be implemented as a single chip. In addition, according to an embodiment of the disclosure, the controller 2*f*-40 may include a multi-connection processor 2*f*-42 configured to perform processing for operating in a multi-connection mode.

According to an embodiment of the disclosure, the controller 2*f*-40 may control each configuration of the UE to perform the above-described method for providing vehicle communication. For example, each configuration of the UE may be operable to perform the above-described embodiments of the disclosure.

Specifically, the controller 2*f*-40 may perform control to transmit resource pool configuration information, which is received from the base station, to another terminal in order to perform vehicle communication. The resource pool configuration information may be resource pool configuration information corresponding to a range, and may denote resource pool configuration information for each range value. For example, the resource pool configuration information may include at least one range value and a physical layer parameter (e.g., Tx/Rx parameter or MCS value) corresponding to the range value.

Figure 2G:
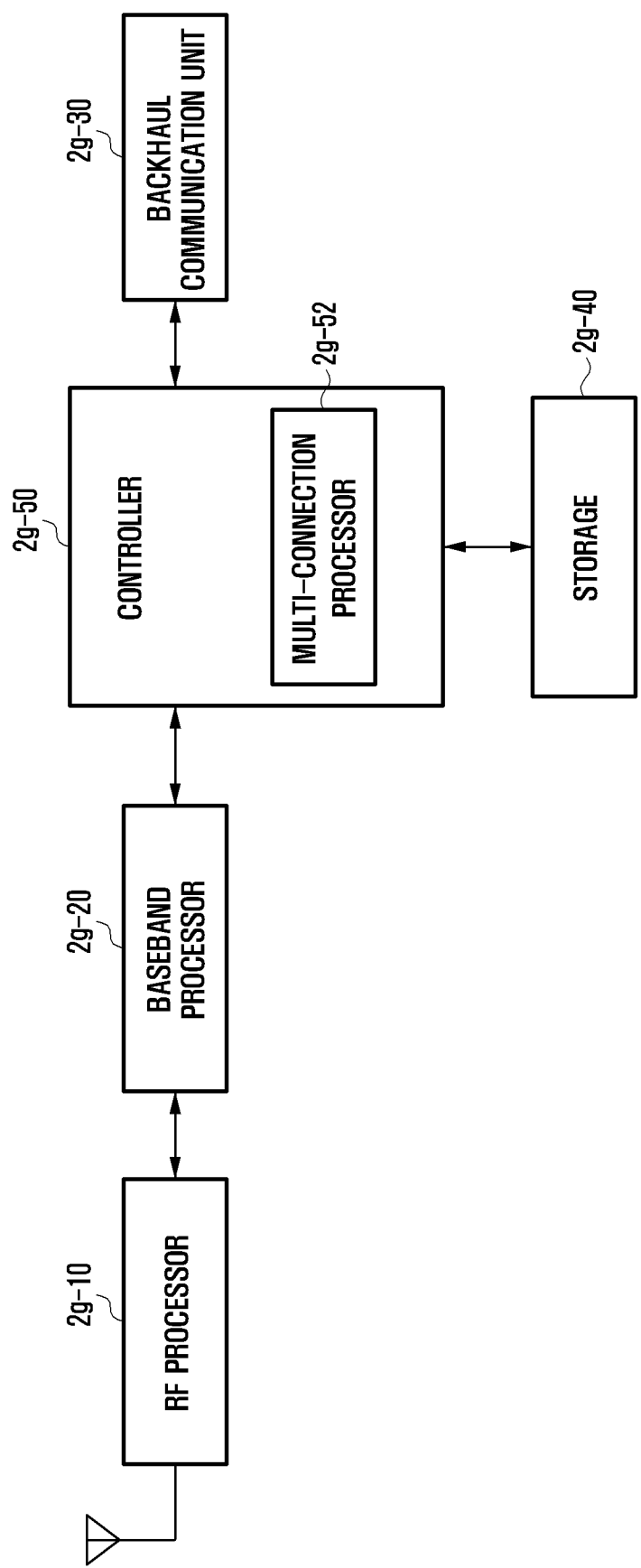
FIG. 2G illustrates the structure of a base station according to an embodiment of the disclosure.

FIG. 2G illustrates the structure of a base station according to the disclosure.

A base station according to an embodiment of the disclosure may include one or more transmission/reception points (TRPs).

A base station according to an embodiment of the disclosure may include an RF processor 2*g*-10, a baseband processor 2*g*-20, a backhaul communication unit 2*g*-30, a storage 2*g*-40, and a controller 2*g*-50. The base station is not limited to the above example, and the base station may include fewer or more elements than that shown in FIG. 2G.

The RF processor 2g-10 may perform a function of transmitting and receiving a signal through a radio channel, such as band conversion and amplification of a signal. That is, the RF processor 2g-10 may up-convert a baseband signal provided from the baseband processor 2g-20 to an RF band signal and then transmit the same through an antenna, and may down-convert an RF band signal received through the antenna to a baseband signal. For example, the RF processor 2g-10 may include a transmission filter, a reception filter, an amplifier, a mixer, an oscillator, a digital-to-analog converter (DAC), an analog-to-digital converter (ADC), and the like.

Although only one antenna is illustrated in FIG. 2G, the UE may have a plurality of antennas.

In addition, the RF processor 2g-10 may include a plurality of RF chains. Further, the RF processor 2g-10 may perform beamforming. To perform beamforming, the RF processor 2g-10 may adjust the phases and magnitudes of signals transmitted and received through a plurality of antennas or antenna elements. The RF processor 2G-10 may perform downlink MIMO operation by transmitting one or more layers.

The baseband processor 2g-20 may perform a function of conversion between a baseband signal and a bit string according to the physical layer specification of the system. For example, in a case of data transmission, the baseband processor 2g-20 may encode and modulate transmission bit strings, thereby generating complex symbols. In addition, upon receiving data, the baseband processor 2g-20 may demodulate and decode a baseband signal provided from the RF processor 2g-10 to thus recover reception bit strings. For example, in a case where an OFDM scheme is applied, when transmitting data, the baseband processor 2g-20 may generate complex symbols by encoding and modulating transmission bit strings, may map the complex symbols to subcarriers, and then may configure OFDM symbols through an IFFT operation and CP insertion. In addition, when receiving data, the baseband processor 2g-20 may divide the baseband signal provided from the RF processor 2g-10 into OFDM symbol units, may restore the signals mapped to the subcarriers through a FFT operation, and then may restore reception bit strings through demodulation and decoding. The baseband processor 2g-20 and the RF processor 2g-10 may transmit or receive signals as described above. Accordingly, the baseband processor 2g-20 and the RF processor 2g-10 may be referred to as a "transmitter", a "receiver", a "transceiver", a "communication unit", or a "wireless communication unit". The base station may transmit/receive signals to or from the UE using the baseband processor 2g-20 and the RF processor 2g-10, and the signal may include control information and data.

The communication unit 2g-30 may provide an interface for communicating with other nodes in the network. That is, the backhaul communication unit 2g-30 may convert a bit string transmitted from a main base station to another node, for example, an auxiliary base station, a core network, etc. into a physical signal, and may convert the physical signal received from the other node into a bit string. The communication unit 2g-30 may be a backhaul communication unit. The storage 2g-40 may store data such as a basic program, an application program, and configuration information for the operation of the main base station. In particular, the storage 2g-40 may store information on a bearer assigned to an accessed UE, a measurement result reported from the accessed UE, and the like. In addition, the storage 2g-40 may store information serving as a criterion for determining whether to provide or stop multiple connections to the UE. Further, the storage 2g-40 may provide the stored data according to the request of the controller 2g-50. In addition, the storage 2g-40 provides the stored data according to the request of the controller 2g-50. The storage 2g-40 may include a storage medium such as a ROM, a RAM, a hard disk, a CD-ROM, and a DVD, or a combination of storage media. In addition, the storage 2g-40 may include a plurality of memories. According to an embodiment, the storage 2g-40 may store a program for performing the above-described method for providing vehicle communication.

The controller 2g-50 may control overall operations of the base station. For example, the controller 2g-50 may transmit or receive signals through the baseband processor 2g-20 and the RF processor 2g-10 or through the communication unit 2g-30. In addition, the controller 2g-50 writes and reads data in the storage 2g-40. To this end, the controller 2g-50 may include at least one processor.

Specifically, the controller 2g-50 may perform control to transmit resource pool configuration information to at least one terminal in order to perform vehicle communication. For example, the controller 2g-50 may perform control to transmit the resource pool configuration information by using a random SIB. The resource pool configuration information may be resource pool configuration information corresponding to a range, and may denote resource pool configuration information for each range value. For example, the resource pool configuration information may include at least one range value and a physical layer parameter (e.g., Tx/Rx parameter or MCS value) corresponding to the range value.

In addition, at least one configuration of the base station may be implemented with one chip. In addition, each configuration of the base station may be operable to perform the above-described embodiments of the disclosure.

As described above, the V2X service can be effectively performed in a wireless communication system according to the embodiments of the disclosure.

Third Embodiment

The disclosure may provide a method and apparatus for measuring and reporting for minimization of drive test in a mobile communication system.

Figure 3A:
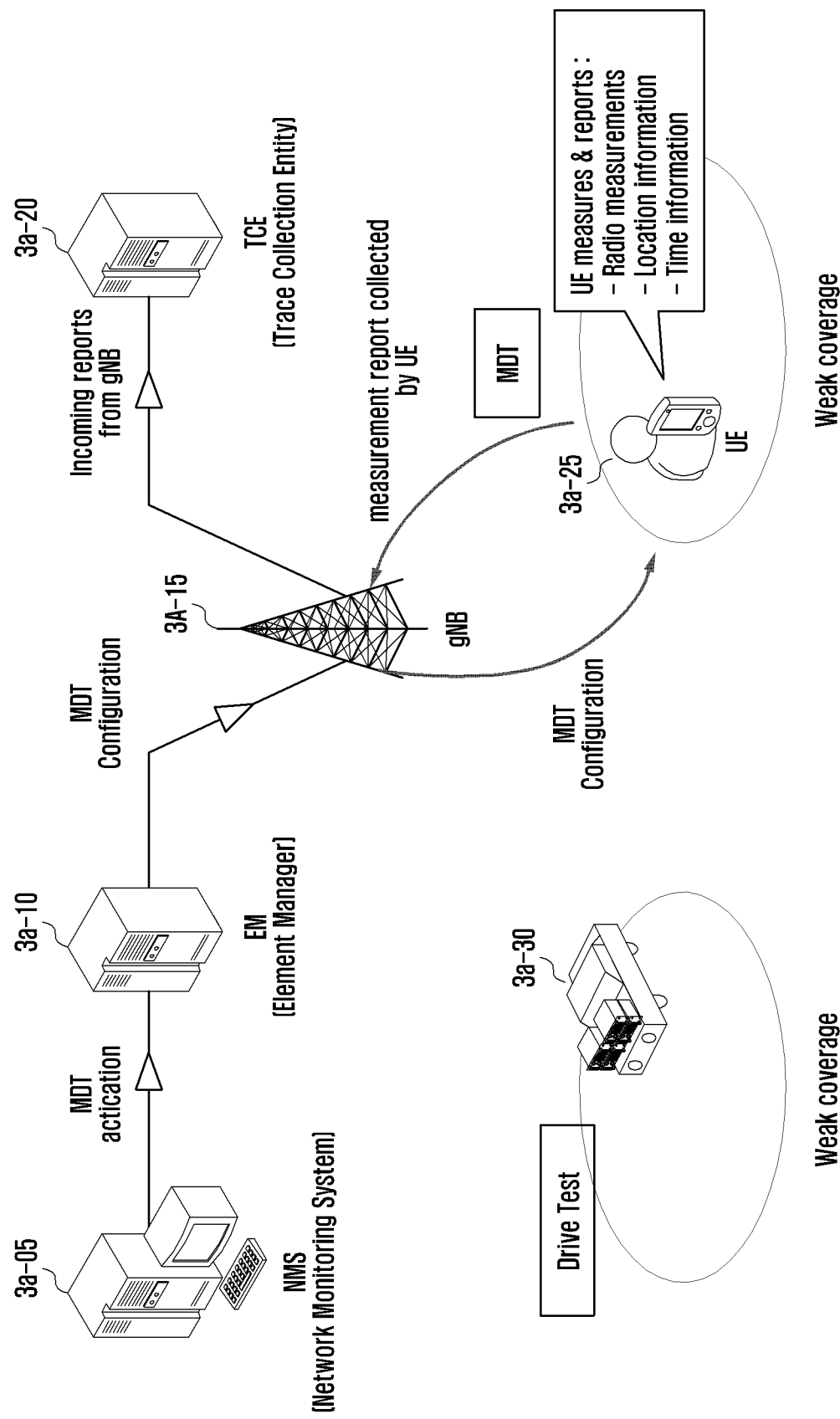
FIG. 3A illustrates a technique for collecting and reporting cell measurement information according to an embodiment of the disclosure.

Specifically, FIG. 3A illustrates a technique for collecting and reporting cell measurement information according to an embodiment of the disclosure.

When constructing or optimizing a network, a mobile communication service provider may typically measure signal strength in an expected service area, and may perform a process of disposing or re-adjusting base stations in the service area based on the measured signal strength. The mobile communication operator loads the signal measurement equipment in a vehicle 3a-30 and collects cell measurement information in the service area, which requires a lot of time and money. The process of collecting the cell measurement information is commonly performed using a vehicle and referred to as a drive test.

A UE 3a-25 has a function capable of measuring a signal and transmitting a report on the measurement result to a base station 3a-15 in order to support operations such as cell reselection, handover, and serving cell addition when moving between cells. Therefore, instead of the drive test, cell measurement information can be collected by using a UE in a service area, and this is called minimization of drive test (MDT). The mobile communication operator may configure MDT operation for specific UEs through various elements 3a-05 and 3a-10 of the network. UEs having configured with MDT operation may collect and store signal strength information from a serving cell and neighboring cells in an RRC connected mode (RRC_CONNECTED), RRC idle mode (RRC_IDLE), or RRC inactive mode (RRC_INACTIVE), and may also store various information such as location information, time information, and signal quality information. The stored information may be reported to the network when the UEs are in the connected mode, and the reported information is transmitted to a specific server 3a-20.

The MDT operation is largely classified into immediate MDT and logged MDT.

Immediate MDT has a characteristic of reporting the collected information directly to the network. Since the collected information needs to be reported immediately, only a UE in the RRC connected mode may perform immediate MDT. In general, a radio resource management (RRM) measurement process for supporting operations such as handover and serving cell addition is recycled, and location information and time information are additionally reported.

Logged MDT has a characteristic of storing the collected information without directly reporting to the network, and thereafter, of reporting the stored information after the UE switches to the RRC connected mode. In general, a UE in an RRC idle mode or RRC inactive mode in which direct report to the network is not possible performs Logged MDT. In the disclosure, the UE in the RRC inactive mode introduced in the next-generation mobile communication system performs Logged MDT. When a specific UE is in the RRC connected mode, the network may provide configuration information for performing the logged MDT operation to the UE. The UE may collect and store configured information after switching to the RRC idle mode or RRC inactive mode.

TABLE 3

| | RRC state |
|---|---|
| Immediate MDT | RRC_CONNECTED |
| Logged MDT | RRC_IDLE, RRC_INACTIVE |

Figure 3B:
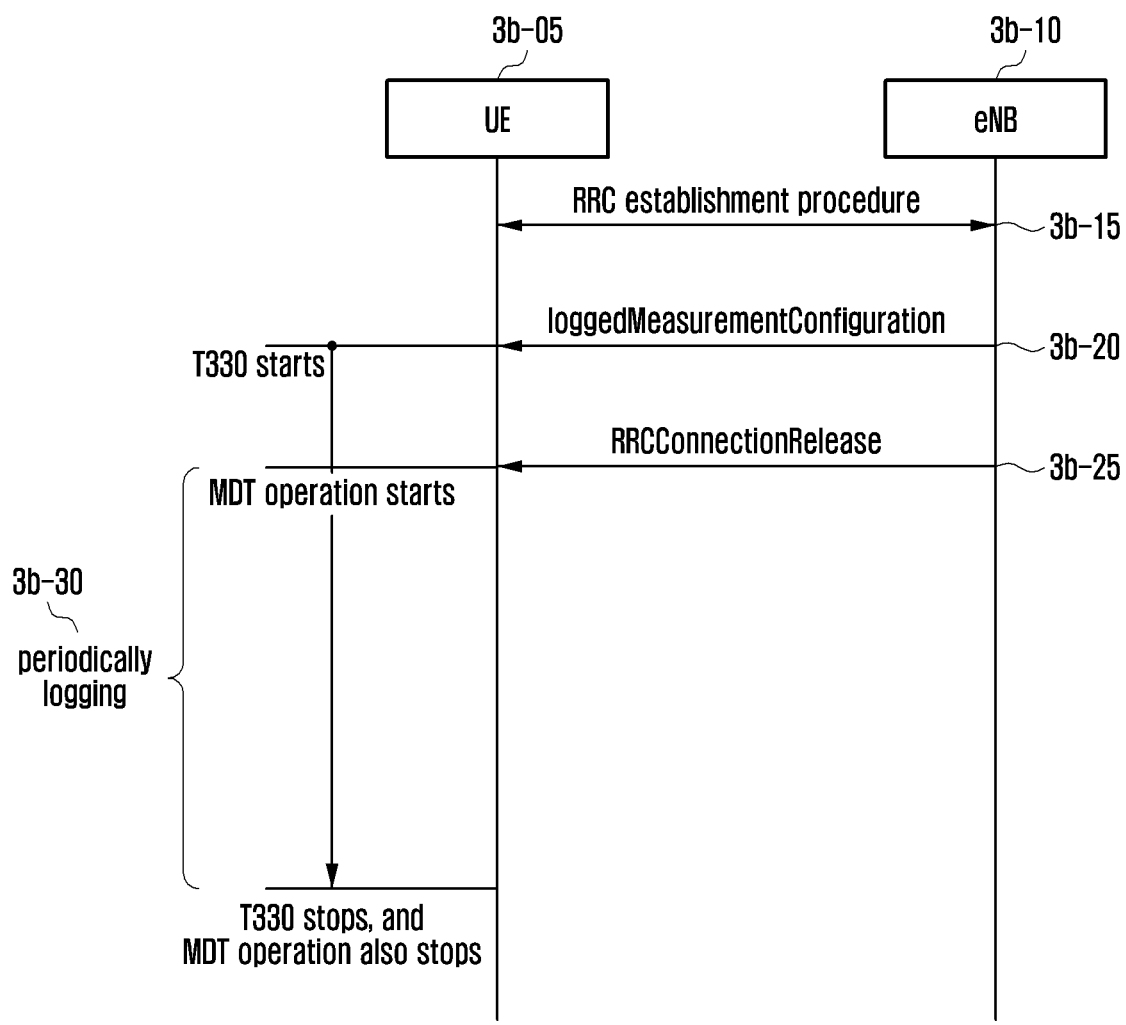
FIG. 3B is a flowchart illustrating a process of collecting and reporting cell measurement information in an LTE system according to an embodiment of the disclosure.

FIG. 3B is a flowchart illustrating a process of collecting and reporting cell measurement information in an LTE system according to an embodiment of the disclosure.

Referring to FIG. 3B, a UE 3b-05 may switch to an RRC connected mode through an RRC establishment process 3b-15 with a base station 3b-10. The base station 3b-10 may configure a logged MDT operation for the UE through loggedMeasurementConfiguration message (indicated by reference numeral 3b-20). Upon receiving the loggedMeasurementConfiguration message, the UE 3b-05 may drive a T330 timer. The base station 3b-10 may switch the UE 3b-05 from the RRC connected mode to an RRC idle mode by using the RRCConnectionRelease message (indicated by reference numeral 3b-25).

When the T330 timer is running, the UE 3b-05 may perform a logged MDT operation by using the received configuration information. For example, the UE 3b-05 may periodically collect and record predetermined measurement information (indicated by reference numeral 3b-30). The UE 3b-05 may perform the logged MDT operation when the T330 timer is running and in the RRC idle mode. The T330 timer may be continuously run regardless of the RRC state of the UE 3b-05.

The UE 3b-05 may stop the logged MDT operation when the UE is switched back to the RRC connected mode while the T330 timer is still running. When the T330 timer expires, the logged MDT operation may be terminated.

Figure 3C:
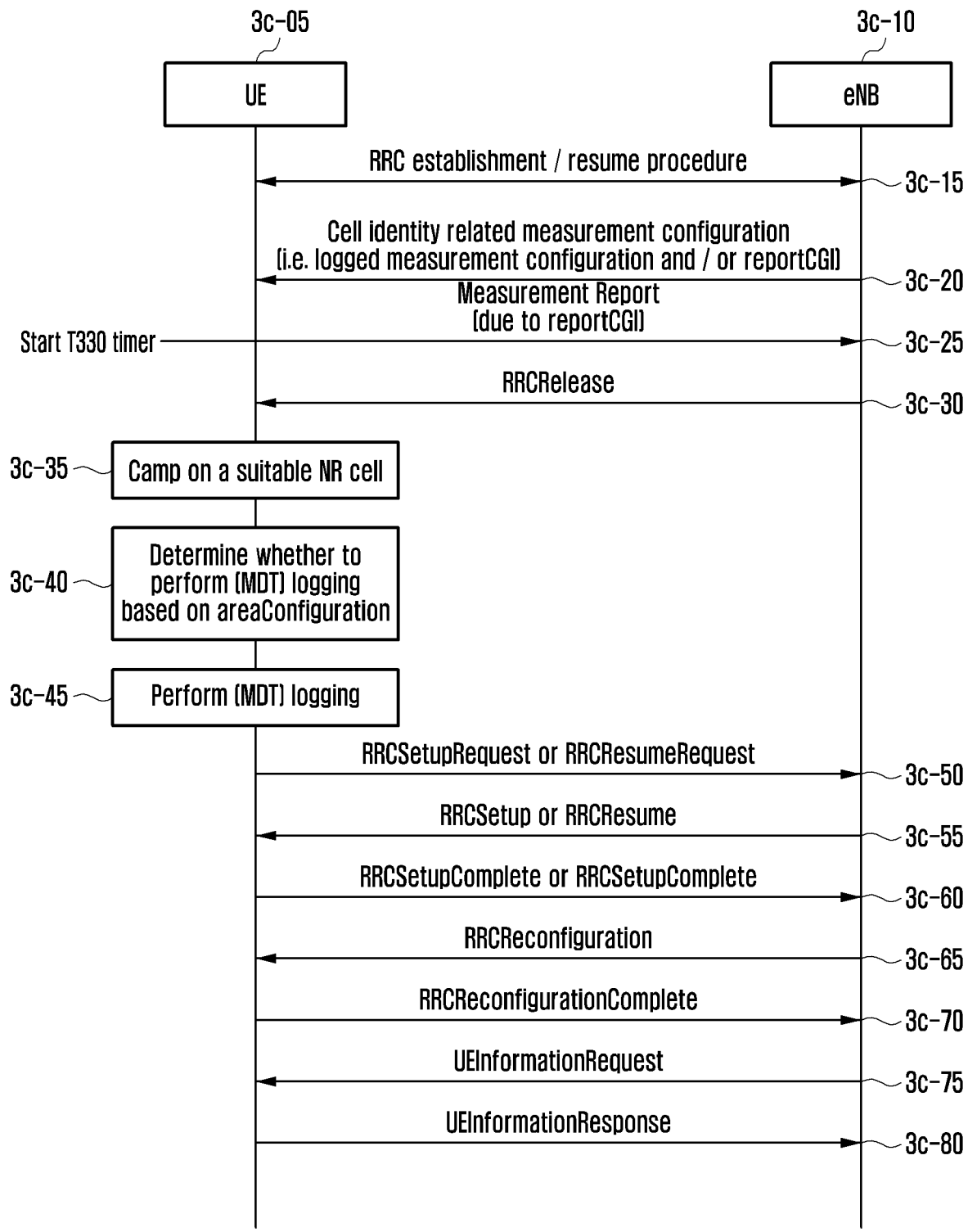
FIG. 3C is a flowchart illustrating a process of collecting and reporting cell measurement information in a next-generation mobile communication system according to an embodiment of the disclosure.

FIG. 3C is a flowchart illustrating a process of collecting and reporting cell measurement information in a mobile communication system according to an embodiment of the disclosure.

Referring to FIG. 3C, a UE 3c-05 may switch from an RRC idle mode (RRC_IDLE) or RRC inactive mode (RRC_INACTIVE) to an RRC connected mode (RRC_CONNECTED) through an RRC establishment or RRC resume process with a base station 3c-10 (indicated by reference numeral 3c-15). The base station 3c-10 may provide cell identity-related measurement configuration information to the UE 3c-05 by using a predetermined RRC message (indicated by reference numeral 3c-20). The cell identity-related measurement configuration information may include configuration information for the following two measurement types.

Type 1 (automatic neighbor relations (ANR))
Type 2 (minimization of drive test (MDT))

Type 1 may include PhysCellId for each radio access technology. Type 2 may include at least one of loggingDuration, loggingInterval, and areaConfiguration. The areaConfiguration may be configured by at least one of the following methods.

Method 1: One or multiple cell identity lists
Method 2: One PLMN Identity and cell identity list
Method 3: One or multiple CellGlobalNRs. CellGlobalNR can be configured by PLMN identity and Cell identity.

Additionally, type 2 may include plmn-IdentityList.

In operation 3c-20, when the cell identity-related measurement configuration information, transmitted to the UE 3c-05 by the base station 3c-10, includes cell identity-related measurement configuration information of type 1, the UE 3c-05 may acquire plmn-IdentityInfoList from SIB1 of a neighboring cell corresponding to the PhysCellID indicated in operation 3c-25. In addition, the UE 3c-05 may report the measurement result of the serving cell and the plmn-IdentityInfoList of the neighboring cell to the base station 3c-10 via a predetermined RRC message. The plmn-IdentityInfoList may include one or a plurality of plmn-IdentityInfo, and each plmn-IdentityInfo may include at least one of one trackingAreaCode, one Cell Identity, plmn-IdentityList associated with the Cell Identity, ranac, and cellReservedForOtherUse indicator values.

In operation 3c-20, when the cell identity-related measurement configuration information, transmitted to the UE 3c-05 by the base station 3c-10, includes cell identity-related measurement configuration information of type 2, the UE 3c-05 may store loggingDuration, loggingInterval, and areaConfiguration in VarMeasConfi, when they are received.

In addition, when plmn-IdentityList is included in the cell identity-related measurement configuration information, the UE 3c-05 may set plmn-IdentityList in VarLogMeasReport to include the registered PLMN (RPLMN) as well as one or multiple PLMNs included in the received plmn-IdentityList. In addition, when the plmn-IdentityList is not included in the cell identity-related measurement configuration information, the UE 3c-05 may set plmn-IdentityList in VarLogMeasReport to include the RPLMN. In addition, when the loggingDuration has been received, the UE 3c-05 may drive the T330 timer with the corresponding value.

In operation 3c-30, the base station 3c-10 may transmit an RRC connection release message (RRCRelease) to the UE 3c-05 in the RRC connected mode. Here, depending on whether the received RRC connection release message includes suspend configuration information (suspendConfig), the UE 3c-05 may transition to the RRC inactive mode (RRC_INACTIVE) or the RRC idle mode (RRC_IDLE).

For example, when the RRC connection release message including the suspend configuration information is successfully received, the UE 3c-05 in the RRC connected mode transitions to the RRC inactive mode. On the other hand, when the RRC connection release message not including the suspend configuration information is successfully received, the UE 3c-05 in the RRC connected mode transitions to the RRC idle mode.

In operation 3c-35, the UE 3c-05 in the RRC idle mode or RRC inactive mode may camp-on a suitable NR cell by performing a cell selection process. When the UE 3c-05 camps on a suitable cell, the UE is in a normally camped state, and the camped-on cell may be regarded as a serving cell. Even when a suitable cell is reselected in the normally camped state, the reselected cell may be considered as a serving cell.

In operation 3c-40, the UE 3c-05 in the normally camped state may determine whether to perform logging when a predetermined condition is satisfied according to areaConfiguration.

In operation 3c-20, when areaConfiguration is configured according to method 1, the UE 3c-05 may compare the cell identity of SIB1 of the current serving cell with the cell identity included in areaConfiguration, and when there is a matching cell identity and the plmn-IdentityInfo including the corresponding cell identity of SIB1 includes the plmn-Identity that matches the RPLMN of the UE, the UE may perform logging. Alternatively, the UE 3c-05 may compare the cell identity of SIB1 of the current serving cell with the cell identity included in areaConfiguration, and when there is a matching cell identity and the plmn-IdentityInfo including the corresponding cell identity of SIB1 includes at least one plmn-Identity that matches the plmn-Identitylist included in VarLogsMeasReport, the UE may perform logging.

In operation 3c-20, when areaConfiguration is configured according to method 2 or method 3, the UE 3c-05 may compare the cell identity of SIB1 of the current serving cell with the cell identity included in areaConfiguration and select plmn-IdentityInfo having a matching cell identity from SIB1, and when plmn-IdentityList of selected plmn-IdentityInfo includes the plmn identity configured in areaConfiguration, the UE may perform logging. Alternatively, the UE 3c-05 may compare the cell identity of SIB1 of the current serving cell with the cell identity included in areaConfiguration to select plmn-IdentityInfo having a matching cell identity from SIB1, and when the plmn-IdentityList of selected plmn-IdentityInfo includes at least one plmn-Identity that matches the plmn-Identitylist included in VarLogsMeasReport, the UE may perform logging.

When determination as to performing logging is made in operation 3c-40, the UE 3c-05 may perform logging in operation 3c-45. For example, the UE 3c-05 may periodically perform logging according to a loggingInterval. In addition, the global cell identity of a cell currently camped on by the UE 3c-05 may be used for logging the servCellIdentity. The servCellIdentity may denote the cell identity of plmn-IdentityInfo including the plmn-Identity that matches the RPLMN of the UE 3c-05 and the first plmn-identity of the plmn-IdentityList. Alternatively, the servCellIdentity may denote the plmn identity and the cell identity configured in areaConfiguration. In addition, the UE 3c-05 may log the measurement value of the cell camped-on by the UE 3c-05. In addition, when it is possible, the UE 3c-05 may also log the measurement value of a neighboring cell.

The UE 3c-05 may transmit an RRCSetupRequest or RRCResumeRequest message to the base station 3c-10 in order to switch from the standby mode or the inactive mode to the connected mode (indicated by reference numeral 3c-50). The UE 3c-05 may receive an RRCSetup or RRCResume message as a response message to the RRCSetupRequest or RRCResumeRequest message from the base station 3c-10 (indicated by reference numeral 3c-55). The UE 3c-05 may transmit an RRCSetupComplete or RRCResumeComplete message to the base station 3c-10 (indicated by reference numeral 3c-60). The RRCSetupComplete or RRCResumeComplete message may include an availability indicator indicating that there is a logged result value.

The base station 3c-10 may transmit an RRCReconfiguration message to the UE in order to reestablish the RRC connection (indicated by reference numeral 3c-65). The UE 3c-05 may transmit an RRCReconfigurationComplete message as a response message to the RRCReconfiguration message to the base station 3c-10 (indicated by reference numeral 3c-70). The RRCReconfigurationComplete message may include an availability indicator indicating that there is a logged result value.

The base station 3c-10 may request retrieval of the stored information by using a UEInformationRequest message based on the availability indicator (indicated by reference numeral 3c-75). Upon receiving the message, the UE 3c-05 may report information (logsMeasReport) stored by the UE 3c-05 to the base station 3c-10 by using UEInformationResponse message (indicated by reference numeral 3c-80).

Figure 3D:
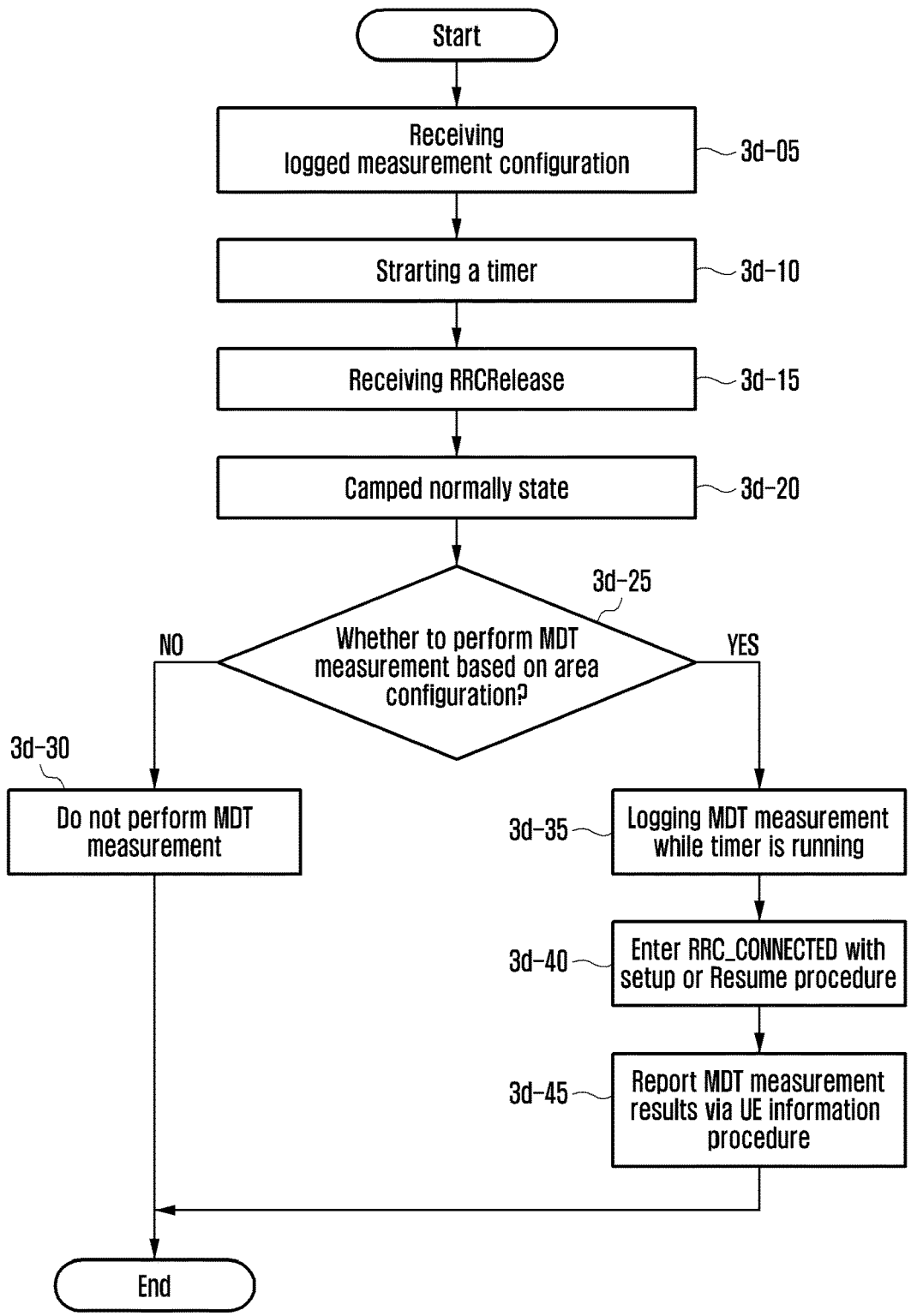
FIG. 3D is a flowchart illustrating a UE operation according to an embodiment of the disclosure.

FIG. 3D is a flowchart of a UE operation according to an embodiment of the disclosure.

Referring to FIG. 3D, in operation 3d-05, the UE receives a loggedMeasurementConfiguration message from the base station. The RRC message includes configuration information required for the logged MDT operation.

In operation 3d-10, upon receiving the loggedMeasurementConfiguration message, the UE may drive a T330 timer.

In operation 3d-15, the UE may receive an RRCRelease message from the base station. The RRCRelease message is used when switching the UE from a connected mode to a standby mode or an inactive mode. Upon receiving the RRCRelease message, the UE may be switched to the RRC state indicated by the RRCRelease message.

In operation 3d-20, the UE may be in a normally camped state.

In operation 3d-25, the UE may determine whether to perform MDT measurement in the current serving cell based on the areaConfiguration configured in operation 3d-05.

In operation 3d-30, based on the determination of whether to perform MDT measurement in operation 3d-25, the UE may not perform MDT measurement in the current serving cell.

In operation 3d-35, the UE may log the MDT measurement result when the T330 timer is continuously running. Here, servCellIdentity may denote the cell identity of plmn-IdentityInfo including plmn-Identity matching the RPLMN of the UE and the first plmn-identity of plmn-IdentityList. The UE may use the global cell identity of a cell, camped on by the UE, for logging the servCellIdentity. Alternatively, the UE may log the cell identity and plmn identity configured in areaConfiguration. For example, this refers to logging only some information of the plmn-IdentityInfoList of SIB1 of the current serving cell. In addition, the UE may log the measurement result of the serving cell and the measurement result of the neighboring cell together.

In operation 3d-40, the UE may be switched from the standby mode or the inactive mode to the connected mode through the RRC setup or resume process. In the switching process, the UE may report to the base station that there is an MDT measurement result. Alternatively, through the RRC reconfiguration process, the UE may report to the base station that there is an MDT measurement result.

In operation 3d-45, the UE may receive a retrieval request for the stored MDT measurement result from the base station through the UEInformationReqeust message, and in response thereto, the UE may report the MDT measurement result through the UEInformationResponse message to the base station.

Figure 3E:
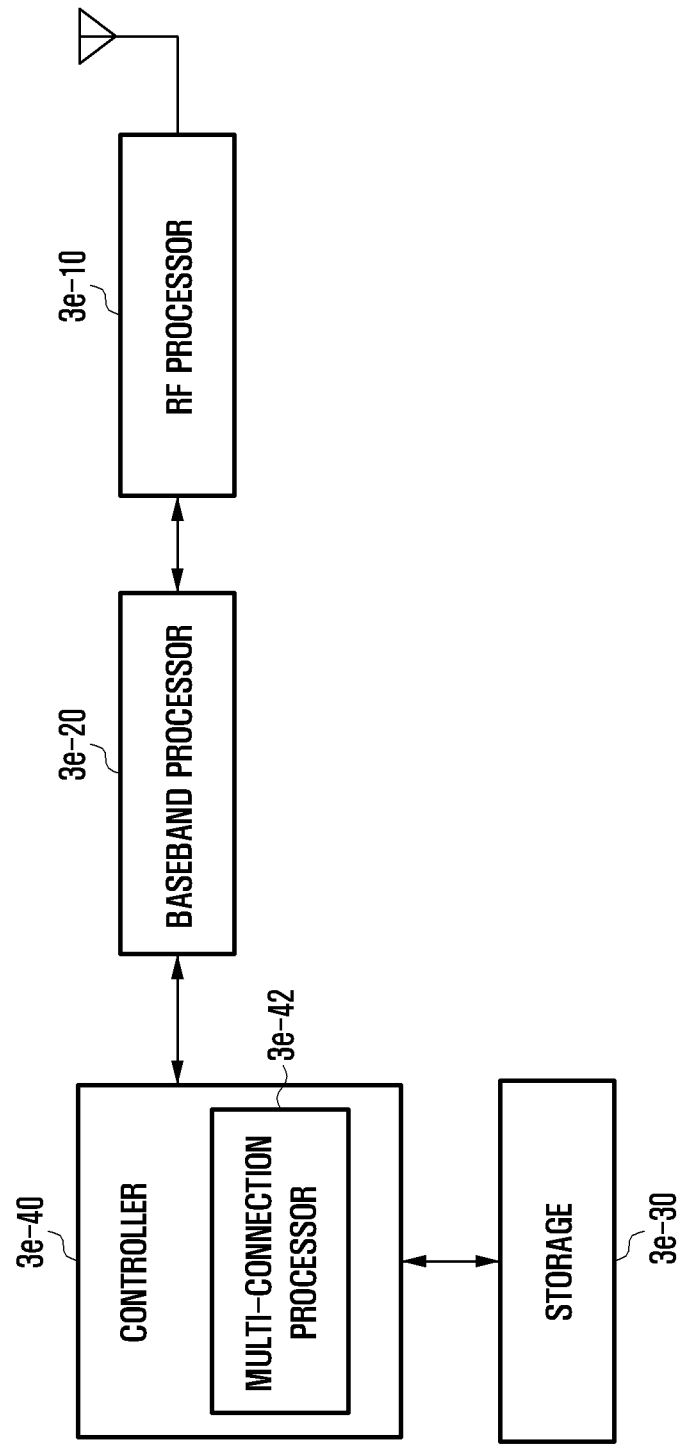
FIG. 3E is a block diagram illustrating an internal structure of a UE according to an embodiment of the disclosure.

FIG. 3E is a block diagram illustrating an internal structure of a UE according to an embodiment of the disclosure.

Referring to the figure, the UE may include a radio frequency (RF) processor 3e-10, a baseband processor 3e-20, a storage 3e-30, and a controller 3e-40.

The RF processor 3e-10 performs a function of transmitting and receiving a signal through a radio channel, such as band conversion and amplification of a signal. That is, the RF processor 3e-10 up-converts a baseband signal provided from the baseband processor 3e-20 to an RF band signal to thus transmit the same through an antenna, and down-converts an RF band signal received through the antenna to a baseband signal. For example, the RF processor 3e-10 may include a transmission filter, a reception filter, an amplifier, a mixer, an oscillator, a digital-to-analog converter (DAC), an analog-to-digital converter (ADC), and the like. Although only one antenna is illustrated in FIG. 1K, the UE may have a plurality of antennas. In addition, the RF processor 3e-10 may include a plurality of RF chains. Further, the RF processor 3e-10 may perform beamforming. To perform beamforming, the RF processor 3e-10 may adjust the phases and magnitudes of signals transmitted and received through a plurality of antennas or antenna elements. In addition, the RF processor may perform MIMO, and may receive multiple layers when performing the MIMO operation.

The baseband processor 3e-20 performs a function of conversion between a baseband signal and a bit string according to the physical layer specification of the system. For example, in a case of data transmission, the baseband processor 3e-20 encodes and modulates transmission bit strings, thereby generating complex symbols. In addition, upon receiving data, the baseband processor 3e-20 demodulates and decodes a baseband signal provided from the RF processor 3e-10 to thus recover reception bit strings. For example, in a case where an orthogonal frequency division multiplexing (OFDM) scheme is applied, when transmitting data, the baseband processor 3e-20 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the baseband processor 3e-20 divides the baseband signal provided from the RF processor 3e-10 into OFDM symbol units, restores the signals mapped to the subcarriers through a fast Fourier transform (FFT) operation, and then restores reception bit strings through demodulation and decoding.

The baseband processor 3e-20 and the RF processor 3e-10 may transmit or receive signals as described above. Accordingly, the baseband processor 3e-20 and the RF processor 3e-10 may be referred to as a "transmitter", a "receiver", a "transceiver", or a "communication unit". Further, at least one of the baseband processor 3e-20 and the RF processor 3e-10 may include a plurality of communication modules in order to support a plurality of different radio access techniques. In addition, at least one of the baseband processor 3e-20 and the RF processor 3e-10 may include different communication modules to process signals in different frequency bands. For example, the different radio access techniques may include a wireless LAN (e.g., IEEE 802.11), a cellular network (e.g., LTE), and the like. In addition, the different frequency bands may include super-high frequency (SHF) (e.g., 2.NRHz or NRhz) bands or millimeter wave (e.g., 60 GHz) bands.

The storage 3e-30 may store data such as fundamental programs, application programs, and configuration information for the operation of the UE. In particular, the storage 3e-30 may store information related to a second access node that performs wireless communication using a second wireless access technology. In addition, the storage 3e-30 provides the stored data in response to a request from the controller 3e-40.

The controller 3e-40 may control the overall operation of the UE. For example, the controller 3e-40 transmits and receives signals through the baseband processor 3e-20 and the RF processor 3e-10. In addition, the controller 3e-40 records and reads data in and from the storage 3e-30. To this end, the controller 3e-40 may include at least one processor. For example, the controller 3e-40 may include a communication processor (CP) for controlling communication and an application processor (AP) for controlling upper layers such as application programs.

Specifically, the controller 3e-40 may control the RF processor 3e-10 to receive cell identity-related measurement configuration information from the base station. For example, CellGlobalNR including PLMN identity and Cell identity may be received as the cell identity-related measurement configuration information. The controller 3e-40 may determine whether to perform logging based on the configuration information, and may control logging to be performed in a corresponding cell.

Figure 3F:
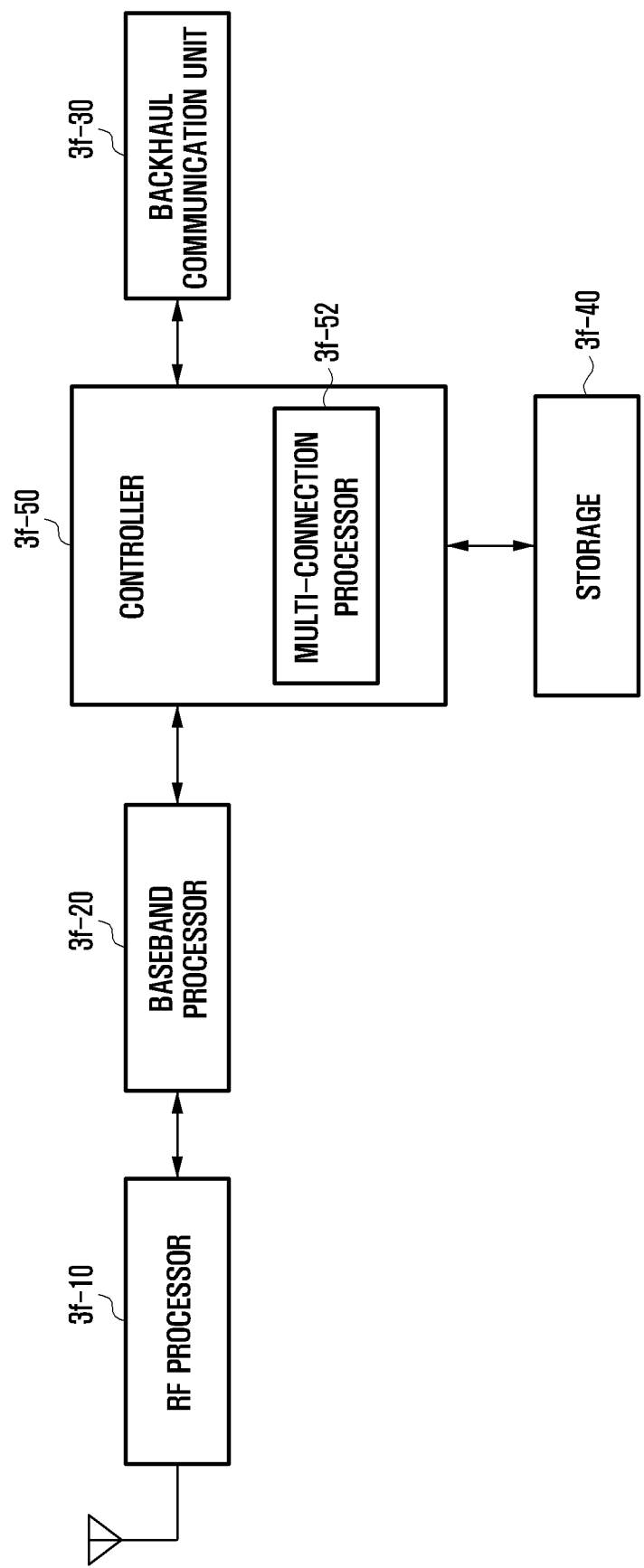
FIG. 3F is a block diagram illustrating the configuration of an NR base station according to an embodiment of the disclosure.

Meanwhile, FIG. 3F is a block diagram showing the configuration of an NR base station according to an embodiment of the disclosure.

As shown in the figure, the base station may include a radio frequency (RF) processor 3f-10, a baseband processor 3f-20, a backhaul communication unit 3f-30, a storage 3f-40, and a controller 3f-50.

The RF processor 3f-10 may perform a function of transmitting and receiving a signal through a radio channel, such as band conversion and amplification of a signal. The RF processor 3f-10 up-converts a baseband signal provided from the baseband processor 3f-20 to an RF band signal to thus transmit the same through an antenna, and down-converts an RF band signal received through the antenna to a baseband signal. For example, the RF processor 3f-10 may include a transmission filter, a reception filter, an amplifier, a mixer, an oscillator, a digital-to-analog converter (DAC), an analog-to-digital converter (ADC), and the like. Although only one antenna is illustrated in FIG. 3F, the first access node may have a plurality of antennas. In addition, the RF processor 3f-10 may include a plurality of RF chains. Further, the RF processor 3f-10 may perform beamforming. To perform beamforming, the RF processor 3f-10 may adjust the phases and magnitudes of signals transmitted and received through a plurality of antennas or antenna elements. The RF processor may perform downlink MIMO operation by transmitting one or more layers.

The baseband processor 3f-20 may perform a function of conversion between a baseband signal and a bit string according to the physical layer standard of the first radio access technology. For example, in a case of data transmission, the baseband processor 3f-20 encodes and modulates transmission bit strings, thereby generating complex symbols. In addition, upon receiving data, the baseband processor 3f-20 demodulates and decodes a baseband signal provided from the RF processor 3f-10 to thus recover reception bit strings. For example, in a case where an OFDM scheme is applied, when transmitting data, the baseband processor 3f-20 generates complex symbols by encoding and modulating transmission bit strings, maps the complex symbols to subcarriers, and then configures OFDM symbols through an IFFT operation and CP insertion. In addition, when receiving data, the baseband processor 3f-20 divides the baseband signal provided from the RF processor 3f-10 into OFDM symbol units, restores the signals mapped to the subcarriers through a fast Fourier transform (FFT) operation, and then restores reception bit strings through demodulation and decoding. The baseband processor 3f-20 and the RF processor 3f-10 may transmit or receive signals as described above. Accordingly, the baseband processor 3f-20 and the RF processor 3f-10 may be referred to as a "transmitter", a "receiver", a "transceiver", a "communication unit", or a "wireless communication unit".

The backhaul communication unit 3f-30 provides an interface for communicating with other nodes in the network. The backhaul communication unit 3f-30 converts a bit string transmitted from a main base station to another node, for example, an auxiliary base station, a core network, etc. into a physical signal, and converts the physical signal received from the other node into a bit string.

The storage 3f-40 stores data such as a basic program, an application program, and configuration information for the operation of the main base station. In particular, the storage 3f-40 may store information on a bearer assigned to an accessed UE, a measurement result reported from the accessed UE, and the like. In addition, the storage 3f-40 may store information serving as a criterion for determining whether to provide or stop multiple connections to the UE. In addition, the storage 3f-40 provides the stored data according to the request of the controller 3f-50.

The controller 3f-50 controls overall operations of the main base station. For example, the controller 3f-50 transmits or receives signals through the baseband processor 3f-20 and the RF processor 3f-10 or through the backhaul communication unit 3f-30. In addition, the controller 3f-50 writes and reads data in the storage 3f-40. To this end, the controller 3f-50 may include at least one processor.

Specifically, the controller 3f-50 may control the RF processor 3e-10 to transmit cell identity-related measurement configuration information to the UE. For example, CellGlobalNR including PLMN identity and Cell identity may be transmitted as the cell identity-related measurement configuration information. The configuration information may be used to determine whether the UE performs logging.

As described above, the minimization of drive test can be effectively performed in a mobile communication system according to embodiments of the disclosure.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method by a terminal in a wireless communication system, the method comprising:
receiving, from a source base station, a dedicated radio resource control (RRC) message including a handover (HO) command;
obtaining a system information block (SIB);
identifying whether a dual active protocol stack (DAPS) HO is configured;
identifying whether the obtained SIB is SIB1;
in case the obtained SIB is SIB1, identifying whether the SIB1 is obtained from the dedicated RRC message;
in case that the DAPS HO is configured and the SIB1 is obtained from the dedicated RRC message, identifying whether a preconfigured event occurs; and
in case that the DAPS HO is configured and the SIB1 is obtained from the dedicated RRC message, performing at least one operation according to the SIB1 after the preconfigured event occurs.

2. The method of claim 1, wherein the preconfigured event comprises transmission of an RRC connection reconfiguration complete message to a target base station having performed the DAPS HO based on the dedicated RRC message.

3. The method of claim 1, wherein the performing of the at least one operation further comprises transmitting a cell identity to an upper layer device.

4. The method of claim 1, wherein the performing of the at least one operation further comprises transmitting a tracking area code to an upper layer device.

5. The method of claim 1, further comprising:
immediately performing at least one operation according to the SIB when the SIB is obtained, in case that the DAPS HO is not configured or the SIB is not obtained from the dedicated RRC message.

6. The method of claim 1, wherein the obtaining of the SIB is performed when the DAPS HO is configured and the terminal is in an RRC connected mode.

7. A terminal in a wireless communication system, the terminal comprising:
a transceiver; and
a controller configured to:
control the transceiver to receive, from a source base station, a dedicated radio resource control (RRC) message including a handover (HO) command,
obtain a system information block (SIB),
identify whether a dual active protocol stack (DAPS) HO is configured,
identify whether the obtained SIB is SIB1,
in case the obtained SIB is SIB1, identify whether the SIB is obtained from the dedicated RRC message,
in case that the DAPS HO is configured and the SIB1 is obtained from the dedicated RRC message, identify whether a preconfigured event occurs; and
in case that the DAPS HO is configured and the SIB1 is obtained from the dedicated RRC message, perform at least one operation according to the SIB1 after the preconfigured event occurs.

8. The terminal of claim 7, wherein the preconfigured event comprises transmission of an RRC connection reconfiguration complete message to a target base station having performed the DAPS HO based on the dedicated RRC message.

9. The terminal of claim 7, wherein the at least one operation according to the SIB is configured to transmit a cell identity to an upper layer device.

10. The terminal of claim 7, wherein the at least one operation according to the SIB is configured to transmit a tracking area code to an upper layer device.

11. The terminal of claim 7, wherein the controller is further configured to immediately perform at least one operation according to the SIB when the SIB is obtained, in case that the DAPS HO is not configured or the SIB is not obtained from the dedicated RRC message.

12. The terminal of claim 7, wherein the obtained SIB is obtained when the DAPS HO is configured and the terminal is in an RRC connected mode.

* * * * *